US012750766B2

(12) United States Patent
Rane et al.

(10) Patent No.: US 12,750,766 B2
(45) Date of Patent: Sep. 29, 2026

(54) CHANNEL RASTER AND SYNCHRONIZATION SIGNAL RASTER FOR OPERATING IN THE 57 GHZ TO 71 GHZ BAND

(71) Applicant: Intel Products IP LLC, Santa Clara, CA (US)

(72) Inventors: Prerana Rane, Newark, CA (US); Daewon Lee, Portland, OR (US); Aida Vera Lopez, Hillsboro, OR (US); Jiwoo Kim, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 18/290,068

(22) PCT Filed: Jul. 26, 2022

(86) PCT No.: PCT/US2022/038382

§ 371 (c)(1),
(2) Date: Nov. 9, 2023

(87) PCT Pub. No.: WO2023/014544

PCT Pub. Date: Feb. 9, 2023

(65) Prior Publication Data

US 2024/0340774 A1 Oct. 10, 2024

Related U.S. Application Data

(60) Provisional application No. 63/334,042, filed on Apr. 22, 2022, provisional application No. 63/308,865, (Continued)

(51) Int. Cl.
*H04W 48/16* (2009.01)
*H04W 74/0833* (2024.01)

(52) U.S. Cl.
CPC ....... *H04W 48/16* (2013.01); *H04W 74/0833* (2013.01)

(58) Field of Classification Search
CPC ............. H04W 48/16; H04W 74/0833; H04W 56/001; H04W 48/10; H04W 72/0453; (Continued)

(56) References Cited

U.S. PATENT DOCUMENTS

| | | | |
|---|---|---|---|
| 2020/0136881 | A1 | 4/2020 | Berggren et al. |
| 2020/0280942 | A1 | 9/2020 | Jung et al. |
| 2021/0153147 | A1 | 5/2021 | Liu et al. |

FOREIGN PATENT DOCUMENTS

| | | |
|---|---|---|
| CN | 117546546 | 2/2024 |
| WO | WO-2023014544 A1 | 2/2023 |

OTHER PUBLICATIONS

"3GPP; TSG RAN; NR; BS radio transmission and reception (Release 17)", 3GPP TS 38.104 V17.2.0, (Jul. 7, 2021).

(Continued)

*Primary Examiner* — Jeanette J Parker
*Assistant Examiner* — Michele C Douglas
(74) *Attorney, Agent, or Firm* — Schwegman Lundberg & Woessner, P.A.

(57) ABSTRACT

A user equipment (UE) configured for operating in a fifth-generation (5G) new radio (NR) system may search for a 5G NR cell at Synchronization Signal (SS) block frequency positions associated with synchronization signal (SS) raster values. The UE may detect a Synchronization Signal Block (SSB) at one of the SS block frequency positions and may derive a cell reference frequency corresponding to a NR Absolute Radio Frequency Channel Number (NR ARFCN) value for the 5G NR cell from system information including a channel bandwidth. The frequency positions associated with the SS raster values are based on one or more Global (Continued)

Synchronization Channel Number (GSCN) values selected for the FR2 operating band n263. The cell reference frequency corresponds to one of a plurality of NR ARFCN values selected for the FR2 operating band n263.

20 Claims, 24 Drawing Sheets

Related U.S. Application Data filed on Feb. 10, 2022, provisional application No. 63/302,498, filed on Jan. 24, 2022, provisional application No. 63/289,561, filed on Dec. 14, 2021, provisional application No. 63/274,472, filed on Nov. 1, 2021, provisional application No. 63/255,852, filed on Oct. 14, 2021, provisional application No. 63/230,558, filed on Aug. 6, 2021.

(58) Field of Classification Search

CPC ............... H04J 11/0073; H04J 11/0076; H04J 11/0079; H04L 5/005; H04L 27/26025; H04L 27/261; H04L 5/0048; H04L 27/2613; H04L 27/2655

See application file for complete search history.

(56) References Cited

OTHER PUBLICATIONS

"U.S. Appl No. 18/290,068, Preliminary Amendment filed Nov. 9, 2023", 10 pages.

"International Application Serial No. PCT US2022 038382, International Preliminary Report on Patentability mailed Feb. 15, 2024", 6 pgs.

"U.S. Appl. No. 18/290,068, Supplemental Preliminary Amendment and Response to Notice of Insufficiency filed Aug. 21, 2024", 9 pages.

"European Application Serial No. 22853712.2, Extended European Search Report mailed Apr. 7, 2025", 6 pgs.

Huawei, "Draft CR to TS 38.104: exemplary implementation of new bands with FR2.1 and FR2.2 frequency ranges", 3GPP DRAFT; R4-2111059, 3rd Generation Partnership Project (3GPP), Mobile Competence Centre ; 650, Route Des Lucioles ; F-06921 Sophia-Antipolis Cedex ; France vol. RAN WG4, No. Electronic Meeting, XP052009420, [Online] Retrieved from the internet:https: ftp.3gpp.org tsg_ran WG4_Radio TSGR4_99-e Docs R4-2111059.zip R4-2111059.docx, (May 11, 2021), 10 pgs.

"International Application Serial No. PCT/US2022/038382, International Search Report mailed Nov. 17, 2022", 3 pgs.

"International Application Serial No. PCT/US2022/038382, Written Opinion mailed Nov. 17, 2022", 4 pgs.

Huawei, "Analysis of the exemplary new band introduction to TS 38.104 specification", R4-2111058, 3GPP TSG-RAN WG4 Meeting #99-e, Electronic Meeting, (May 11, 2021), 8 pgs.

"European Application Serial No. 22853712.2, Response filed Oct. 28, 2025 to Extended European Search Report mailed Apr. 7, 2025", 20 pgs.

CHANNEL RASTER AND SYNCHRONIZATION SIGNAL RASTER FOR OPERATING IN THE 57 GHZ TO 71 GHZ BAND

PRIORITY CLAIMS

This application is a U.S. National Stage Filing under 35 U.S.C. 371 from International Application No. PCT/US2022/038382, filed Jul. 26, 2022 and published in English as WO 2023/014544 on Feb. 9, 2023, which claims the benefit of priority to:

U.S. Provisional Patent Application Ser. No. 63/230,558 filed Aug. 6, 2021 [reference number AD8235-Z];
U.S. Provisional Patent Application Ser. No. 63/255,852 filed Oct. 14, 2021 [reference number AD9585-Z];
U.S. Provisional Patent Application Ser. No. 63/274,472 filed Nov. 1, 2021 [reference number AE0050-Z];
U.S. Provisional Patent Application Ser. No. 63/289,561 filed Dec. 14, 2021 [reference number AE0902-Z];
U.S. Provisional Patent Application Ser. No. 63/302,498 filed Jan. 24, 2022 [reference number AE1558-Z];
U.S. Provisional Patent Application Ser. No. 63/308,865 filed Feb. 10, 2022 [reference number AE1845-Z]; and
U.S. Provisional Patent Application Ser. No. 63/334,042 filed Apr. 22, 2022 [reference number AE3299-Z], which are all incorporated herein by reference in their entireties.

TECHNICAL FIELD

Embodiments pertain to wireless communications. Some embodiments relate to cellular communications in accordance with the 3GPP 5G NR standards. Some embodiments relate to selection of channel raster and synchronization raster positions.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

One issue with operating in higher frequency bands, such as the 57 GHz to 71 GHz band, is selection of channel raster and synchronization raster positions. NR channel raster points are center frequency positions on which wireless system can deploy a cell. RF reference frequencies are designated by an NR Absolute Radio Frequency Channel Number (NR-ARFCN). The synchronization raster indicates the frequency positions of the synchronization block that can be used by a user equipment (UE) for, among other things, system acquisition, when explicit signaling of the synchronization block position is not present.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for operating in a fifth-generation (5G) new radio (NR) system. The UE may search for a 5G NR cell at Synchronization Signal (SS) block frequency positions associated with synchronization signal (SS) raster values, may detect a Synchronization Signal Block (SSB) at one of the SS block frequency positions and may derive a cell reference frequency corresponding to a NR Absolute Radio Frequency Channel Number (NR ARFCN) value for the 5G NR cell from system information including a channel bandwidth. For frequency-range two (FR2) operating band n263, the frequency positions associated with the SS raster values are based on one or more Global Synchronization Channel Number (GSCN) values which may comprise 24156+6*N−3*floor((N+5)/18) where N=0:137, for a 120 KHz subcarrier spacing (SCS), 24162+24*N−12*floor((N+4)/18) where N=0:33, for a 480 KHz SCS, and 24162 to 24954 with a step size of six for a 960 kHz SCS. For the FR2 operating band n263, the cell reference frequency corresponds to one of a plurality of NR ARFCN values comprising one of: 2564083+1680*N for N=0:137, when the channel bandwidth is 100 MHz, 2566603+6720*N for N=0:33, when the channel bandwidth is 400 MHz, 2569963+6720*N for N=0:32, when the channel bandwidth is 800 MHz, 2576683+6720*N for N=0:30 when the channel bandwidth is 1600 MHz, and 2580043+6720*N for N=0:29, and 2585083, 2655643, 2692603, 2764843, when the channel bandwidth is 2000 MHz. These embodiments as well as others are discussed in more detail below.

Figure 1A:
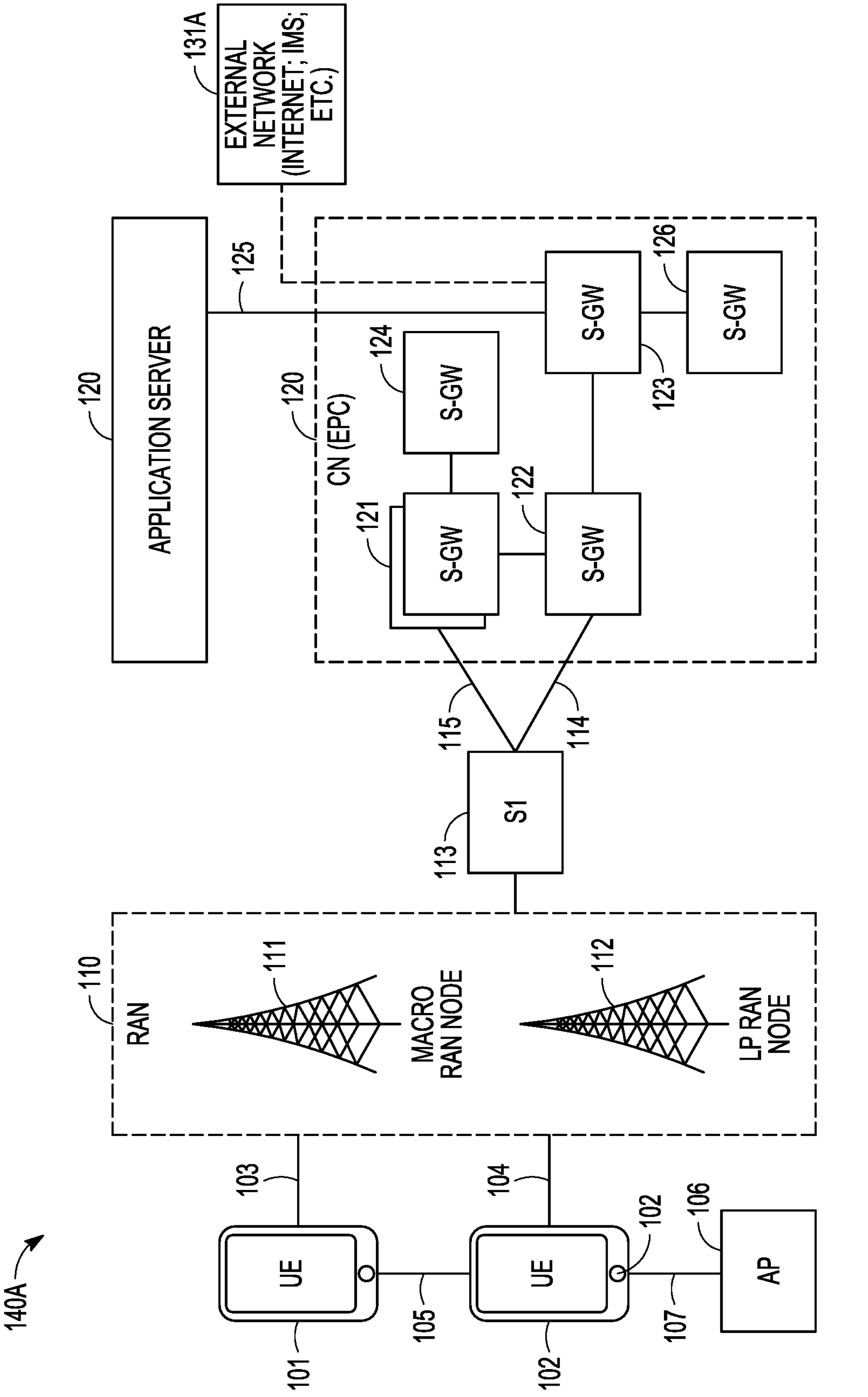
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS)

protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
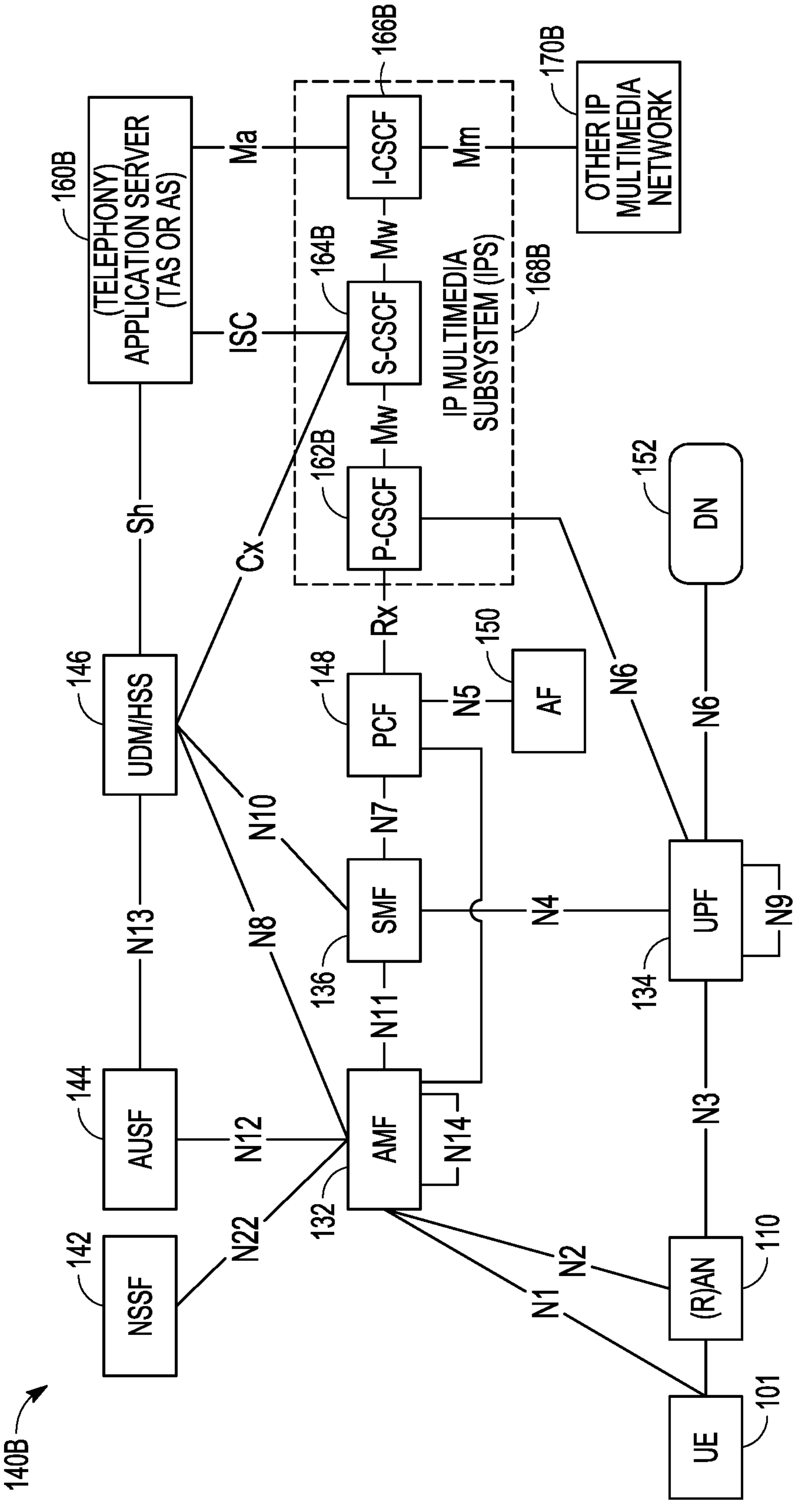
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
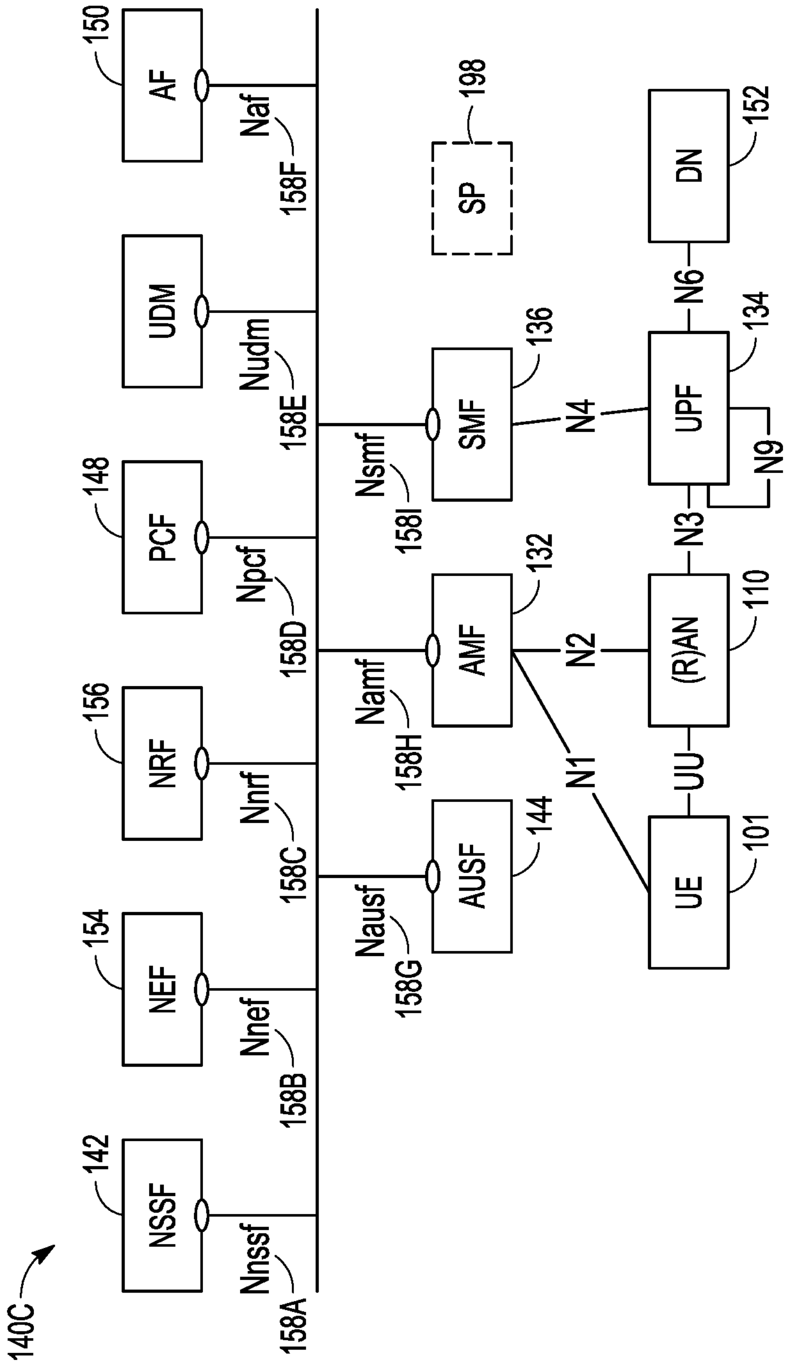

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a short-hand notation of the NR-based access to unlicensed spectrum, is a technology that enables the operation of NR systems on the unlicensed spectrum.

NR channel raster points are center frequency positions on which wireless system can deploy a cell. RF reference frequencies are designated by an NR Absolute Radio Frequency Channel Number (NR-ARFCN) in the range [0 . . . 3279165] on the global frequency raster (i.e. NR channel raster). The relation between the NR-ARFCN and the RF reference frequency $F_{REF}$ in MHz is given by the following equation, where $F_{REF\text{-}Offs}$ and $N_{Ref\text{-}Offs}$ are given in Table 1 and $N_{REF}$ is the NR-ARFCN.

$$F_{REF} = F_{REF\text{-}Offs} + \Delta F_{Global}(N_{REF} - N_{REF\text{-}Offs})$$

TABLE 1

NR-ARFCN parameters for the global frequency raster

| Frequency range (MHz) | $\Delta F_{Global}$ (kHz) | $F_{REF\text{-}Offs}$ (MHz) | $N_{REF\text{-}Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

The synchronization raster indicates the frequency positions of the synchronization block that can be used by the UE for system acquisition when explicit signaling of the synchronization block position is not present. A global synchronization raster is defined for all frequencies. The frequency position of the SS block is defined as $SS_{REF}$ with corresponding number GSCN. The parameters defining the $SS_{REF}$ and GSCN for all the frequency ranges are in Table 2. The synchronization raster and the subcarrier spacing of the synchronization block is defined separately for each band.

TABLE 2

GSCN parameter for global frequency raster

| Frequency range | SS block frequency position $SS_{REF}$ | GSCN | Range of GSCN |
|---|---|---|---|
| 0-3000 MHz | N * 1200 kHz + M * 50 kHz, N = 1:2499, M ϵ {1, 3, 5} (Note) | 3N + (M − 3)/2 | 2-7498 |
| 3000-24250 MHz | 3000 MHz + N * 1.44 MHz N = 0:14756 | 7499 + N | 7499-22255 |
| 24250-100000 MHz | 24250.08 MHz + N * 17.28 MHz N = 0:4383 | 22256 + N | 22256-26639 |

(Note)
The default value for operating bands with SCS spaced channel raster is M = 3.

In the frequency range 57 GHz to 71 GHz, the minimum and maximum channel bandwidth (CBW) for different numerologies have been defined as shown in Table 3.

TABLE 3

Maximum and Minimum Channel Bandwidth for supported numerologies

| SCS [kHz] | Min CBW [MHz] | Max CBW[MHz] |
|---|---|---|
| 120 | 100 | 400 |
| 480 | 400 | 1600 |
| 960 | 400 | 2000 |

In the frequency range 57 GHz to 71 GHz, there are 233334 global channel raster points which are potential channel center frequencies and 810 sync raster points. 802.11ad/ay systems currently support 6 blocks of 2.16 GHz in 57.24 GHz to 70.2 GHz spectrum. In order to reduce cell search complexity, we need to down-select the raster points which defines NR channels. Additionally, selection of the raster points such that coexistence between Wi-Fi system and NR systems is maximized should be considered. Since the supported NR channel bandwidths are smaller than a single 802.11 ad/ay channel, we can use unutilized spectrum to support NR channels of smaller bandwidths. While selecting the NR channel raster points, we need to ensure that the NR cells lie on a subcarrier grid divisible by the largest supported subcarrier spacing i.e., 960 kHz so that the transceiver may not be able to perform a single inverse FFT and FFT operation to process signals across different supported numerologies.

The process of selecting NR channel raster positions also needs to factor into account synchronization signal and physical broadcast channel (SSB) raster entries. SSB raster entries are the center of the SSB that needs to be positioned within the cell. $k_{SSB}$ is the subcarrier offset between the SS block and the common PRB grid. For 60 kHz PRB grid, the $k_{SSB}$ values range from 0-11. Selection of channel raster points should also factor in minimizing $k_{SSB}$ values which will reduce the number of bits required to transmit $k_{SSB}$.

Therefore, the combination of the SSB raster position and NR channel raster position should be selected such that the operating cell align with 802.11 ad/ay channels (to enable efficient coexistence) on a 960 kHz grid and minimize $k_{SSB}$ values. Some embodiments disclosed herein address how NR channel and SS raster entries are defined for NR channels in the 60 GHz band for all supported subcarrier spacings and channel bandwidth. The NR channelization design disclosed herein may help minimize interference and maximize spectrum utilization while ensuring co-existence with 802.11 ad/ay channels.

NR channel raster is given as $F_{REF}=F_{REF\text{-}Offs}+\Delta F_{Global}(N_{REF}-N_{REF\text{-}Offs})$, where the $\Delta F_{Global}=60$ kHz, $F_{REF\text{-}Offs}=24250.08$ MHz, and $N_{REF\text{-}Offs}=2016667$ for the unlicensed spectrum 57 GHz to 71 GHz. This results in 233334 global raster points (ARFCN) which are potential channel center frequencies.

In some embodiments, the NR channel raster entries may be selected such that the channels lie within the bounds of 802.11 ad/ay channels on a 960 kHz grid, although the scope of the embodiments are not limited in this respect. In these embodiments, the network may have the option to select NR channel raster entries within 802.11 ad/ay channel boundaries.

SSB raster is given by "24250.08 MHz+N*17.28 MHz", where N is a value from range 0 to 4383 and GSCN is given as "22256+N". GSCN is selected from a set of 810 sync raster points.

Some of the NR channel and SSB raster entries disclosed herein would allow coexistence with 802.11 ad/ay channels, support smaller NR channels in the unutilized spectrum, allow cells deployed in carrier aggregation to be implemented using a single FFT (and inverse FFT) in the transceivers and potentially reduce number of bits for $k_{SSB}$.

The boundaries and center of 802.11 ad/ay channel are calculated using the formula "Channel center frequency=Channel starting frequency+Channel spacing× Channel number". Table 4 defines the channel starting frequency and the channel set values in the 52.6 GHz to 71 GHz frequency spectrum. Table 5 shows the channel boundaries and center frequency for the 802.11 ad/ay channels.

TABLE 4

802.11 ad/ay channels

| Operating class | Nonglobal operating class(es) | Channel starting frequency (GHz) | Channel spacing (MHz) | Channel set | Channel center frequency index |
|---|---|---|---|---|---|
| 180 | E-1-34, E-2-18, E-3-59 | 56.16 | 2160 | 1, 2, 3, 4, 5, 6 | — |

TABLE 5

802.11 ad/ay channels

| Channel Start [kHz] | Channel Center [kHz] | Channel End [kHz] |
|---|---|---|
| 57240000 | 58320000 | 59400000 |
| 59400000 | 60480000 | 61560000 |
| 61560000 | 62640000 | 63720000 |
| 63720000 | 64800000 | 65880000 |
| 65880000 | 66960000 | 68040000 |
| 68040000 | 69120000 | 70200000 |

Potential channel center frequencies are calculated using NR ARFCN values between 57-71 GHz (Unlicensed Spectrum) using the formula $F_{REF}=F_{REF\text{-}Offs}+\Delta F_{Global}(N_{REF}-N_{REF\text{-}Offs})$. The NR ARFCN values are placed on a 60 kHz grid. The corresponding GSCN values on the 17.28 MHz grid are calculated using the formula, 24250.08 MHz+N*17.28 MHz, where N=0:4383.

The maximum transmission bandwidths and minimum guard band currently supported for Frequency Range 2 (FR2) are shown in Tables 6 and 7.

TABLE 6

Maximum transmission bandwidth configuration NRB for FR2

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

TABLE 7

Minimum guardband (kHz) for FR2

| SCS (kHz) | 50 MHz | 100 MHz | 200 MHz | 400 MHz |
|---|---|---|---|---|
| 60 | 1210 | 2450 | 4930 | N.A |
| 120 | 1900 | 2420 | 4900 | 9860 |
| 240 | — | 3800 | 7720 | 15560 |

The maximum transmission bandwidths and minimum guard band for 480 kHz and 960 kHz are not yet defined. Using Table 6 and Table 7. we have estimated the maximum transmission bandwidth and minimum guardband as shown in Table 8 and Table 9.

TABLE 8

Maximum transmission bandwidth configuration NRB for 57-71 GHz

| Subcarrier Spacing | Max transmission Bandwidth | | | | |
|---|---|---|---|---|---|
| Δf | 100 MHz | 400 MHz | 800 MHz | 1600 MHz | 2000 MHz |
| 120 kHz | 66 | 264 | — | — | — |
| 480 kHz | — | 66 | 132 | 264 | — |
| 960 kHz | — | — | — | — | 166 |

TABLE 9

Minimum guardband (kHz) for 57-71 GHz

| Subcarrier | Guardband | | | | |
|---|---|---|---|---|---|
| Spacing Δf | 100 MHz | 400 MHz | 800 MHz | 1600 MHz | 2000 MHz |
| 120 kHz | 2420 | 9860 | — | — | — |
| 480 kHz | — | 9840 | 19680 | 39600 | — |
| 960 kHz | — | — | — | — | 39600 |

Figure 1D:
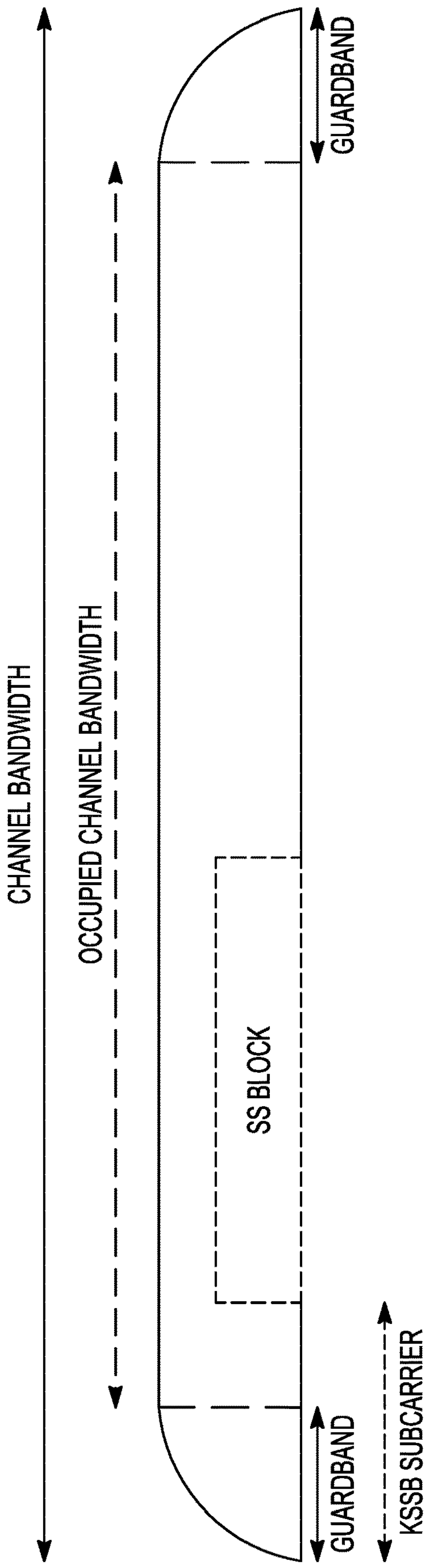
FIG. 1D illustrates channel bandwidth, occupied channel bandwidth and a synchronization signal (SS) block, in accordance with some embodiments.

Based on the subcarrier spacing and channel bandwidth, the maximum transmission bandwidth (number of PRBs) is determined. The minimum guard band required must be met. FIG. 1D illustrates channel bandwidth, occupied channel bandwidth and an SS block, in accordance with some embodiments.

Some embodiments are directed to a fixed channelization approach for unlicensed operation in the 57-71 GHz band and a floating channelization approach in the licensed band, potentially 66-71 GHz. The fixed channelization design will define a single ARFCN and single GSCN for each channel. The floating channelization design will consider each valid ARFCN as a potential channel center frequency with several options for the GSCN raster.

Proposal 1—Fixed Raster

In this proposal, we first define set of non-overlapping 100 MHz CBW within set of frequencies intended for usage, which will be used as building blocks for wider CBW. The wider CBWs of N×100 MHz are defined such that it is located in the center of N bonded 100 MHz CBW. This is essentially using the smaller 100 MHz CBW as building blocks to define larger CBW, such as 400 MHz CBW. The 400 MHz CBW can be further leveraged to define even wider bandwidths as well. The SSB blocked is located at the center of the channel.

In order to provide additional flexibility in deployment, to maximize spectrum usage and to improve coexistence with 802.11 ad/ay channels, the larger CBW are defined by first selecting contiguous blocks of 100 MHz channels. To ensure that each 802.11 ad/ay channel supports channels of larger CBW, a shifted selection of the channels is also supported (shifted by multiples of 100.8 MHz).

Based on the alternative proposal, four 100 MHz channels form a 400 MHz channel, two 400 MHz channels form an 800 MHz channel, four 400 MHz channels form a 1600 MHz channel, and five 400 MHz channels form a 2000 MHz channel.

Process for Selecting the Raster Entries

First non-overlapping 100 MHz channel bandwidth (CBW) were defined for channelization of 100 MHz. Next, 400 MHz, 800 MHz, 1600 MHz, and 2000 MHz CBWs were selected by choosing the center frequency of contiguous 4, 8, 16, and 20 channels of 100 MHz CBW, respectively. Not all possible 400/800/1600/2000 MHz locations were chosen. In general, 400, 800, 1600 MHz were selected among the possible positions such that the channels do not overlap. However, in order to maximize spectrum utilization for various regulatory regions, some overlapping channels were selected. Lastly, only non-overlapping 2000 MHz CBW were selected among the possible positions.

Figure 2:
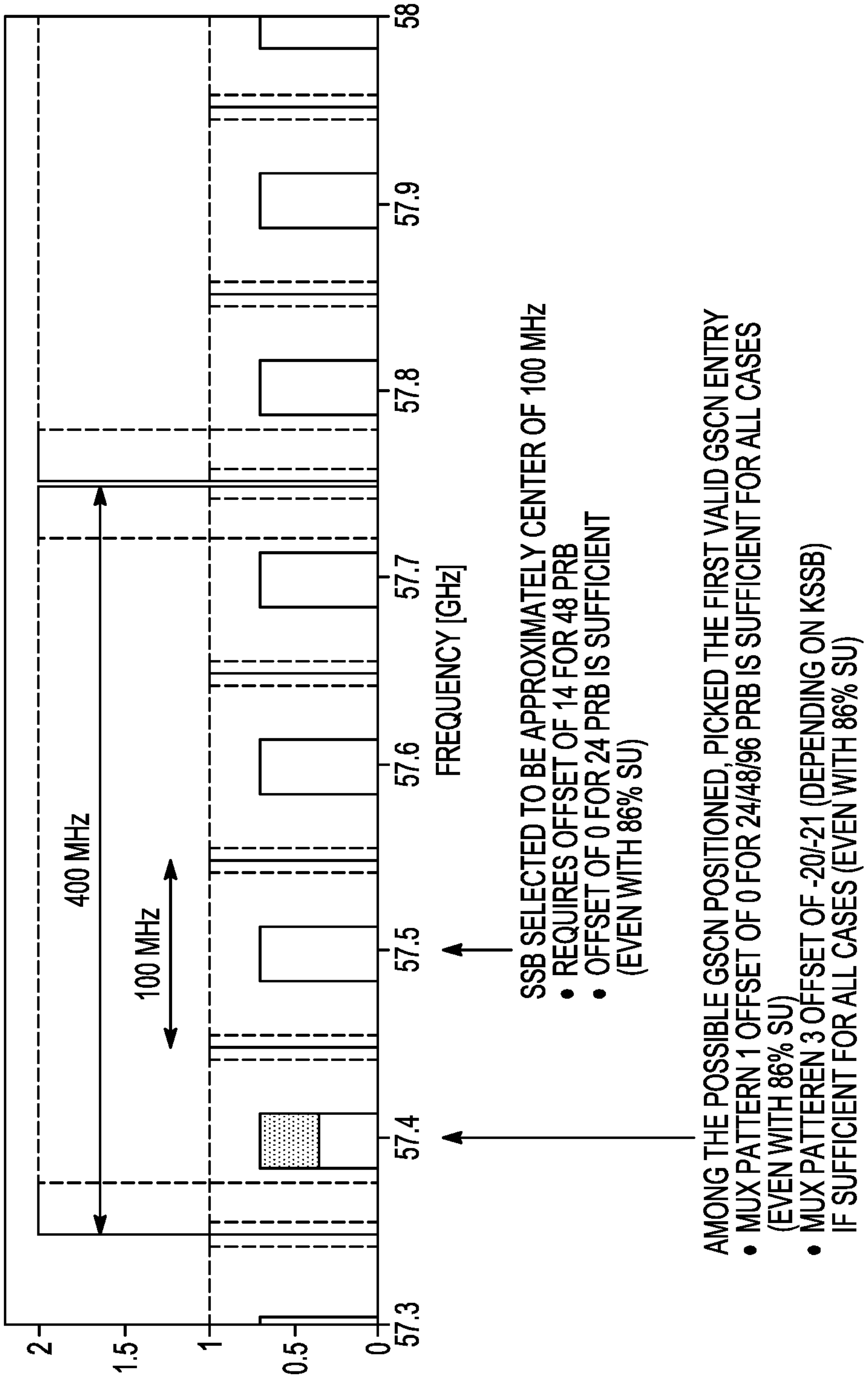
FIG. 2 illustrates the synchronization raster selection process, in accordance with some embodiments.

In order to generally achieve RB offset 0 for majority of the cases, synchronization raster was chosen such that SSB are selected closest to the center of each 100 MHz channel bandwidth (CBW). These selected synchronization raster entries are chosen as valid entries for 120 kHz. From the subset of synchronization raster entries (selected for each 100 MHz CBW), the first raster instance among valid SSB candidate positions within the 400 MHz CBW were selected for valid synchronization raster for 480 kHz. This results in raster entries for 480 kHz to be a subset of the raster entries for 120 kHz. An illustration of the synchronization raster selection process is shown in FIG. 2 below. FIG. 2 illustrates the synchronization raster selection process, in accordance with some embodiments.

120 kHz SCS, 100 MHz CBW

Figure 3:
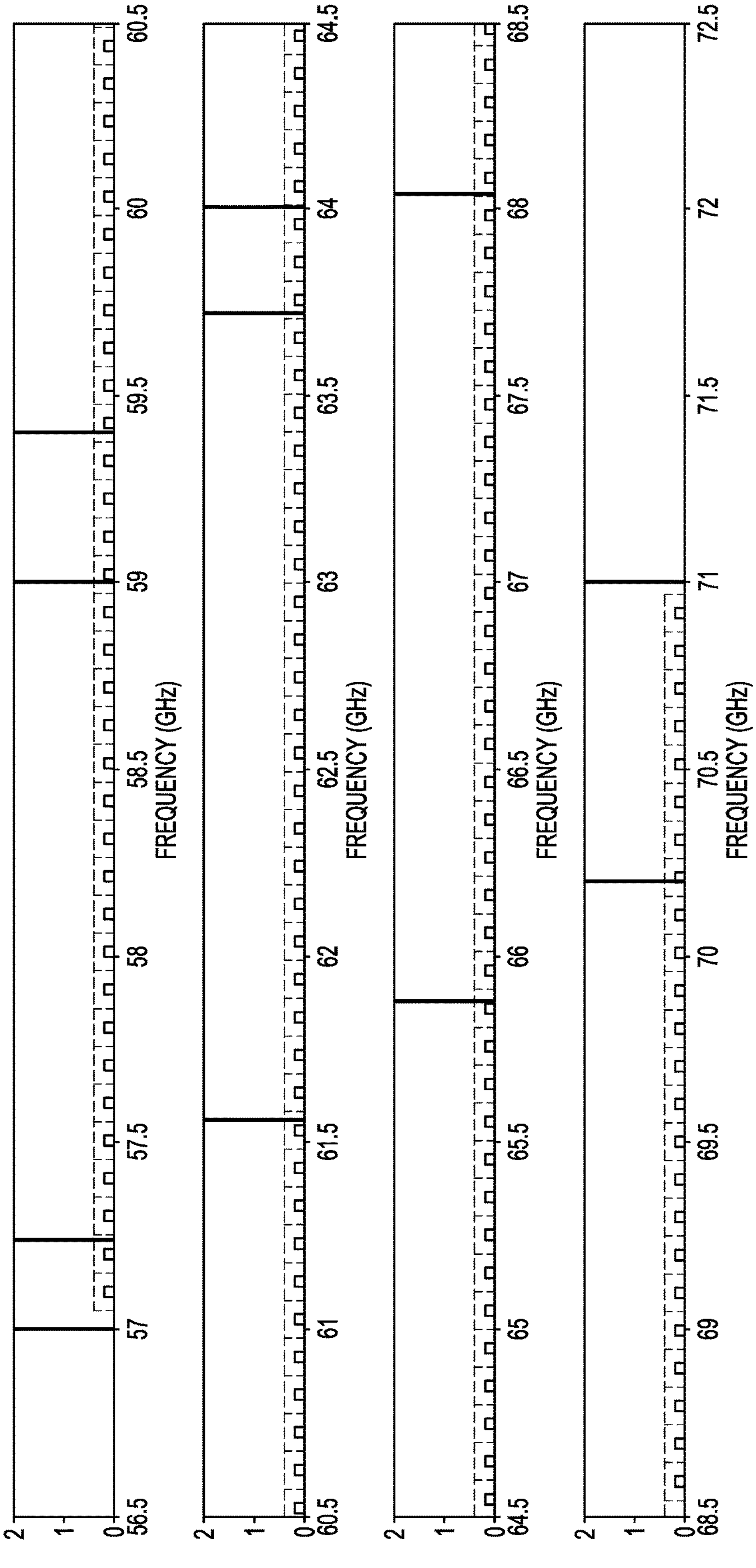
FIG. 3 illustrates supported 100 MHz for a 120 kHz subcarrier spacing (SCS) channels in the 57-71 GHz band, in accordance with some embodiments.

FIG. 3 illustrates supported 100 MHz for 120 kHz SCS channels in the 57-71 GHz band, in accordance with some embodiments. The dotted line represents the CBW of the 100 MHz channel with the SSB placed in the center of the channel. The black lines represent the 802.11 ad/ay channel boundaries. 138 channels of 100 MHz each are supported in the 57-71 GHz range. The placement of the NR channel frequencies are based on the first NR frequency, all channels are placed 100.8 MHz apart.

Example set of channel raster and SS raster entries in the 57-71 GHz band for 120 kHz SCS, 100 MHz CBW, SU=86% is shown in Table 10. The ARFCN and GSCN entries for each of the 100 MHz CBW for 120 kHz SCS can be equivalently expressed as $N_{REF}$={2564083+N*1680, N=0, 1, . . . , 137} and GSCN={24157+N*6−floor((N+4)/6), N=0, 1, . . . , 137}, respectively.

TABLE 10

| Data SCS [kHz] | BW [MHz] | NR Chn Raster [kHz] | NR-ARFCN | N_PRB | SS Raster [kHz] | GSCN |
|---|---|---|---|---|---|---|
| 120 | 100 | 57095040 | 2564083 | 60 | 57099360 | 24157 |
| 120 | 100 | 57195840 | 2565763 | 60 | 57203040 | 24163 |
| 120 | 100 | 57296640 | 2567443 | 60 | 57289440 | 24168 |
| 120 | 100 | 57397440 | 2569123 | 60 | 57393120 | 24174 |
| 120 | 100 | 57498240 | 2570803 | 60 | 57496800 | 24180 |
| 120 | 100 | 57599040 | 2572483 | 60 | 57600480 | 24186 |
| 120 | 100 | 57699840 | 2574163 | 60 | 57704160 | 24192 |
| 120 | 100 | 57800640 | 2575843 | 60 | 57807840 | 24198 |
| 120 | 100 | 57901440 | 2577523 | 60 | 57894240 | 24203 |
| 120 | 100 | 58002240 | 2579203 | 60 | 57997920 | 24209 |
| 120 | 100 | 58103040 | 2580883 | 60 | 58101600 | 24215 |
| 120 | 100 | 58203840 | 2582563 | 60 | 58205280 | 24221 |
| 120 | 100 | 58304640 | 2584243 | 60 | 58308960 | 24227 |
| 120 | 100 | 58405440 | 2585923 | 60 | 58412640 | 24233 |
| 120 | 100 | 58506240 | 2587603 | 60 | 58499040 | 24238 |
| 120 | 100 | 58607040 | 2589283 | 60 | 58602720 | 24244 |
| 120 | 100 | 58707840 | 2590963 | 60 | 58706400 | 24250 |
| 120 | 100 | 58808640 | 2592643 | 60 | 58810080 | 24256 |
| 120 | 100 | 58909440 | 2594323 | 60 | 58913760 | 24262 |
| 120 | 100 | 59010240 | 2596003 | 60 | 59017440 | 24268 |
| 120 | 100 | 59111040 | 2597683 | 60 | 59103840 | 24273 |
| 120 | 100 | 59211840 | 2599363 | 60 | 59207520 | 24279 |
| 120 | 100 | 59312640 | 2601043 | 60 | 59311200 | 24285 |
| 120 | 100 | 59413440 | 2602723 | 60 | 59414880 | 24291 |
| 120 | 100 | 59514240 | 2604403 | 60 | 59518560 | 24297 |
| 120 | 100 | 59615040 | 2606083 | 60 | 59622240 | 24303 |
| 120 | 100 | 59715840 | 2607763 | 60 | 59708640 | 24308 |
| 120 | 100 | 59816640 | 2609443 | 60 | 59812320 | 24314 |
| 120 | 100 | 59917440 | 2611123 | 60 | 59916000 | 24320 |
| 120 | 100 | 60018240 | 2612803 | 60 | 60019680 | 24326 |
| 120 | 100 | 60119040 | 2614483 | 60 | 60123360 | 24332 |
| 120 | 100 | 60219840 | 2616163 | 60 | 60227040 | 24338 |
| 120 | 100 | 60320640 | 2617843 | 60 | 60313440 | 24343 |
| 120 | 100 | 60421440 | 2619523 | 60 | 60417120 | 24349 |
| 120 | 100 | 60522240 | 2621203 | 60 | 60520800 | 24355 |
| 120 | 100 | 60623040 | 2622883 | 60 | 60624480 | 24361 |
| 120 | 100 | 60723840 | 2624563 | 60 | 60728160 | 24367 |
| 120 | 100 | 60824640 | 2626243 | 60 | 60831840 | 24373 |
| 120 | 100 | 60925440 | 2627923 | 60 | 60918240 | 24378 |
| 120 | 100 | 61026240 | 2629603 | 60 | 61021920 | 24384 |
| 120 | 100 | 61127040 | 2631283 | 60 | 61125600 | 24390 |
| 120 | 100 | 61227840 | 2632963 | 60 | 61229280 | 24396 |
| 120 | 100 | 61328640 | 2634643 | 60 | 61332960 | 24402 |
| 120 | 100 | 61429440 | 2636323 | 60 | 61436640 | 24408 |
| 120 | 100 | 61530240 | 2638003 | 60 | 61523040 | 24413 |
| 120 | 100 | 61631040 | 2639683 | 60 | 61626720 | 24419 |
| 120 | 100 | 61731840 | 2641363 | 60 | 61730400 | 24425 |
| 120 | 100 | 61832640 | 2643043 | 60 | 61834080 | 24431 |
| 120 | 100 | 61933440 | 2644723 | 60 | 61937760 | 24437 |
| 120 | 100 | 62034240 | 2646403 | 60 | 62041440 | 24443 |
| 120 | 100 | 62135040 | 2648083 | 60 | 62127840 | 24448 |
| 120 | 100 | 62235840 | 2649763 | 60 | 62231520 | 24454 |
| 120 | 100 | 62336640 | 2651443 | 60 | 62335200 | 24460 |
| 120 | 100 | 62437440 | 2653123 | 60 | 62438880 | 24466 |
| 120 | 100 | 62538240 | 2654803 | 60 | 62542560 | 24472 |
| 120 | 100 | 62639040 | 2656483 | 60 | 62646240 | 24478 |
| 120 | 100 | 62739840 | 2658163 | 60 | 62732640 | 24483 |
| 120 | 100 | 62840640 | 2659843 | 60 | 62836320 | 24489 |
| 120 | 100 | 62941440 | 2661523 | 60 | 62940000 | 24495 |
| 120 | 100 | 63042240 | 2663203 | 60 | 63043680 | 24501 |
| 120 | 100 | 63143040 | 2664883 | 60 | 63147360 | 24507 |
| 120 | 100 | 63243840 | 2666563 | 60 | 63251040 | 24513 |
| 120 | 100 | 63344640 | 2668243 | 60 | 63337440 | 24518 |
| 120 | 100 | 63445440 | 2669923 | 60 | 63441120 | 24524 |
| 120 | 100 | 63546240 | 2671603 | 60 | 63544800 | 24530 |
| 120 | 100 | 63647040 | 2673283 | 60 | 63648480 | 24536 |
| 120 | 100 | 63747840 | 2674963 | 60 | 63752160 | 24542 |
| 120 | 100 | 63848640 | 2676643 | 60 | 63855840 | 24548 |
| 120 | 100 | 63949440 | 2678323 | 60 | 63942240 | 24553 |
| 120 | 100 | 64050240 | 2680003 | 60 | 64045920 | 24559 |
| 120 | 100 | 64151040 | 2681683 | 60 | 64149600 | 24565 |
| 120 | 100 | 64251840 | 2683363 | 60 | 64253280 | 24571 |
| 120 | 100 | 64352640 | 2685043 | 60 | 64356960 | 24577 |
| 120 | 100 | 64453440 | 2686723 | 60 | 64460640 | 24583 |
| 120 | 100 | 64554240 | 2688403 | 60 | 64547040 | 24588 |
| 120 | 100 | 64655040 | 2690083 | 60 | 64650720 | 24594 |

TABLE 10-continued

| Data SCS [kHz] | BW [MHz] | NR Chn Raster [kHz] | NR-ARFCN | N_PRB | SS Raster [kHz] | GSCN |
|---|---|---|---|---|---|---|
| 120 | 100 | 64755840 | 2691763 | 60 | 64754400 | 24600 |
| 120 | 100 | 64856640 | 2693443 | 60 | 64858080 | 24606 |
| 120 | 100 | 64957440 | 2695123 | 60 | 64961760 | 24612 |
| 120 | 100 | 65058240 | 2696803 | 60 | 65065440 | 24618 |
| 120 | 100 | 65159040 | 2698483 | 60 | 65151840 | 24623 |
| 120 | 100 | 65259840 | 2700163 | 60 | 65255520 | 24629 |
| 120 | 100 | 65360640 | 2701843 | 60 | 65359200 | 24635 |
| 120 | 100 | 65461440 | 2703523 | 60 | 65462880 | 24641 |
| 120 | 100 | 65562240 | 2705203 | 60 | 65566560 | 24647 |
| 120 | 100 | 65663040 | 2706883 | 60 | 65670240 | 24653 |
| 120 | 100 | 65763840 | 2708563 | 60 | 65756640 | 24658 |
| 120 | 100 | 65864640 | 2710243 | 60 | 65860320 | 24664 |
| 120 | 100 | 65965440 | 2711923 | 60 | 65964000 | 24670 |
| 120 | 100 | 66066240 | 2713603 | 60 | 66067680 | 24676 |
| 120 | 100 | 66167040 | 2715283 | 60 | 66171360 | 24682 |
| 120 | 100 | 66267840 | 2716963 | 60 | 66275040 | 24688 |
| 120 | 100 | 66368640 | 2718643 | 60 | 66361440 | 24693 |
| 120 | 100 | 66469440 | 2720323 | 60 | 66465120 | 24699 |
| 120 | 100 | 66570240 | 2722003 | 60 | 66568800 | 24705 |
| 120 | 100 | 66671040 | 2723683 | 60 | 66672480 | 24711 |
| 120 | 100 | 66771840 | 2725363 | 60 | 66776160 | 24717 |
| 120 | 100 | 66872640 | 2727043 | 60 | 66879840 | 24723 |
| 120 | 100 | 66973440 | 2728723 | 60 | 66966240 | 24728 |
| 120 | 100 | 67074240 | 2730403 | 60 | 67069920 | 24734 |
| 120 | 100 | 67175040 | 2732083 | 60 | 67173600 | 24740 |
| 120 | 100 | 67275840 | 2733763 | 60 | 67277280 | 24746 |
| 120 | 100 | 67376640 | 2735443 | 60 | 67380960 | 24752 |
| 120 | 100 | 67477440 | 2737123 | 60 | 67484640 | 24758 |
| 120 | 100 | 67578240 | 2738803 | 60 | 67571040 | 24763 |
| 120 | 100 | 67679040 | 2740483 | 60 | 67674720 | 24769 |
| 120 | 100 | 67779840 | 2742163 | 60 | 67778400 | 24775 |
| 120 | 100 | 67880640 | 2743843 | 60 | 67882080 | 24781 |
| 120 | 100 | 67981440 | 2745523 | 60 | 67985760 | 24787 |
| 120 | 100 | 68082240 | 2747203 | 60 | 68089440 | 24793 |
| 120 | 100 | 68183040 | 2748883 | 60 | 68175840 | 24798 |
| 120 | 100 | 68283840 | 2750563 | 60 | 68279520 | 24804 |
| 120 | 100 | 68384640 | 2752243 | 60 | 68383200 | 24810 |
| 120 | 100 | 68485440 | 2753923 | 60 | 68486880 | 24816 |
| 120 | 100 | 68586240 | 2755603 | 60 | 68590560 | 24822 |
| 120 | 100 | 68687040 | 2757283 | 60 | 68694240 | 24828 |
| 120 | 100 | 68787840 | 2758963 | 60 | 68780640 | 24833 |
| 120 | 100 | 68888640 | 2760643 | 60 | 68884320 | 24839 |
| 120 | 100 | 68989440 | 2762323 | 60 | 68988000 | 24845 |
| 120 | 100 | 69090240 | 2764003 | 60 | 69091680 | 24851 |
| 120 | 100 | 69191040 | 2765683 | 60 | 69195360 | 24857 |
| 120 | 100 | 69291840 | 2767363 | 60 | 69299040 | 24863 |
| 120 | 100 | 69392640 | 2769043 | 60 | 69385440 | 24868 |
| 120 | 100 | 69493440 | 2770723 | 60 | 69489120 | 24874 |
| 120 | 100 | 69594240 | 2772403 | 60 | 69592800 | 24880 |
| 120 | 100 | 69695040 | 2774083 | 60 | 69696480 | 24886 |
| 120 | 100 | 69795840 | 2775763 | 60 | 69800160 | 24892 |
| 120 | 100 | 69896640 | 2777443 | 60 | 69903840 | 24898 |
| 120 | 100 | 69997440 | 2779123 | 60 | 69990240 | 24903 |
| 120 | 100 | 70098240 | 2780803 | 60 | 70093920 | 24909 |
| 120 | 100 | 70199040 | 2782483 | 60 | 70197600 | 24915 |
| 120 | 100 | 70299840 | 2784163 | 60 | 70301280 | 24921 |
| 120 | 100 | 70400640 | 2785843 | 60 | 70404960 | 24927 |
| 120 | 100 | 70501440 | 2787523 | 60 | 70508640 | 24933 |
| 120 | 100 | 70602240 | 2789203 | 60 | 70595040 | 24938 |
| 120 | 100 | 70703040 | 2790883 | 60 | 70698720 | 24944 |
| 120 | 100 | 70803840 | 2792563 | 60 | 70802400 | 24950 |
| 120 | 100 | 70904640 | 2794243 | 60 | 70906080 | 24956 |

Example set of channel raster and SS raster entries in the 57-71 GHz band for 120 kHz SCS, 100 MHz CBW, SU=89% is shown in Table 11. The ARFCN and GSCN entries for each of the 100 MHz CBW for 120 kHz SCS can be equivalently expressed as $N_{REF}$={2564083+N*1680, N=0, 1, . . . , 137} and GSCN={24157+N*6−floor((N+4)/6), N=0, 1, . . . , 137}, respectively.

TABLE 11

| Data SCS [kHz] | BW [MHz] | NR Chn Raster [kHz] | NR-ARFCN | N_PRB | SS Raster [kHz] | GSCN |
|---|---|---|---|---|---|---|
| 120 | 100 | 57095040 | 2564083 | 62 | 57099360 | 24157 |
| 120 | 100 | 57195840 | 2565763 | 62 | 57203040 | 24163 |
| 120 | 100 | 57296640 | 2567443 | 62 | 57289440 | 24168 |
| 120 | 100 | 57397440 | 2569123 | 62 | 57393120 | 24174 |
| 120 | 100 | 57498240 | 2570803 | 62 | 57496800 | 24180 |
| 120 | 100 | 57599040 | 2572483 | 62 | 57600480 | 24186 |
| 120 | 100 | 57699840 | 2574163 | 62 | 57704160 | 24192 |
| 120 | 100 | 57800640 | 2575843 | 62 | 57807840 | 24198 |
| 120 | 100 | 57901440 | 2577523 | 62 | 57894240 | 24203 |
| 120 | 100 | 58002240 | 2579203 | 62 | 57997920 | 24209 |
| 120 | 100 | 58103040 | 2580883 | 62 | 58101600 | 24215 |
| 120 | 100 | 58203840 | 2582563 | 62 | 58205280 | 24221 |
| 120 | 100 | 58304640 | 2584243 | 62 | 58308960 | 24227 |
| 120 | 100 | 58405440 | 2585923 | 62 | 58412640 | 24233 |
| 120 | 100 | 58506240 | 2587603 | 62 | 58499040 | 24238 |
| 120 | 100 | 58607040 | 2589283 | 62 | 58602720 | 24244 |
| 120 | 100 | 58707840 | 2590963 | 62 | 58706400 | 24250 |
| 120 | 100 | 58808640 | 2592643 | 62 | 58810080 | 24256 |
| 120 | 100 | 58909440 | 2594323 | 62 | 58913760 | 24262 |
| 120 | 100 | 59010240 | 2596003 | 62 | 59017440 | 24268 |
| 120 | 100 | 59111040 | 2597683 | 62 | 59103840 | 24273 |
| 120 | 100 | 59211840 | 2599363 | 62 | 59207520 | 24279 |
| 120 | 100 | 59312640 | 2601043 | 62 | 59311200 | 24285 |
| 120 | 100 | 59413440 | 2602723 | 62 | 59414880 | 24291 |
| 120 | 100 | 59514240 | 2604403 | 62 | 59518560 | 24297 |
| 120 | 100 | 59615040 | 2606083 | 62 | 59622240 | 24303 |
| 120 | 100 | 59715840 | 2607763 | 62 | 59708640 | 24308 |
| 120 | 100 | 59816640 | 2609443 | 62 | 59812320 | 24314 |
| 120 | 100 | 59917440 | 2611123 | 62 | 59916000 | 24320 |
| 120 | 100 | 60018240 | 2612803 | 62 | 60019680 | 24326 |
| 120 | 100 | 60119040 | 2614483 | 62 | 60123360 | 24332 |
| 120 | 100 | 60219840 | 2616163 | 62 | 60227040 | 24338 |
| 120 | 100 | 60320640 | 2617843 | 62 | 60313440 | 24343 |
| 120 | 100 | 60421440 | 2619523 | 62 | 60417120 | 24349 |
| 120 | 100 | 60522240 | 2621203 | 62 | 60520800 | 24355 |
| 120 | 100 | 60623040 | 2622883 | 62 | 60624480 | 24361 |
| 120 | 100 | 60723840 | 2624563 | 62 | 60728160 | 24367 |
| 120 | 100 | 60824640 | 2626243 | 62 | 60831840 | 24373 |
| 120 | 100 | 60925440 | 2627923 | 62 | 60918240 | 24378 |
| 120 | 100 | 61026240 | 2629603 | 62 | 61021920 | 24384 |
| 120 | 100 | 61127040 | 2631283 | 62 | 61125600 | 24390 |
| 120 | 100 | 61227840 | 2632963 | 62 | 61229280 | 24396 |
| 120 | 100 | 61328640 | 2634643 | 62 | 61332960 | 24402 |
| 120 | 100 | 61429440 | 2636323 | 62 | 61436640 | 24408 |
| 120 | 100 | 61530240 | 2638003 | 62 | 61523040 | 24413 |
| 120 | 100 | 61631040 | 2639683 | 62 | 61626720 | 24419 |
| 120 | 100 | 61731840 | 2641363 | 62 | 61730400 | 24425 |
| 120 | 100 | 61832640 | 2643043 | 62 | 61834080 | 24431 |
| 120 | 100 | 61933440 | 2644723 | 62 | 61937760 | 24437 |
| 120 | 100 | 62034240 | 2646403 | 62 | 62041440 | 24443 |
| 120 | 100 | 62135040 | 2648083 | 62 | 62127840 | 24448 |
| 120 | 100 | 62235840 | 2649763 | 62 | 62231520 | 24454 |
| 120 | 100 | 62336640 | 2651443 | 62 | 62335200 | 24460 |
| 120 | 100 | 62437440 | 2653123 | 62 | 62438880 | 24466 |
| 120 | 100 | 62538240 | 2654803 | 62 | 62542560 | 24472 |
| 120 | 100 | 62639040 | 2656483 | 62 | 62646240 | 24478 |
| 120 | 100 | 62739840 | 2658163 | 62 | 62732640 | 24483 |
| 120 | 100 | 62840640 | 2659843 | 62 | 62836320 | 24489 |
| 120 | 100 | 62941440 | 2661523 | 62 | 62940000 | 24495 |
| 120 | 100 | 63042240 | 2663203 | 62 | 63043680 | 24501 |
| 120 | 100 | 63143040 | 2664883 | 62 | 63147360 | 24507 |
| 120 | 100 | 63243840 | 2666563 | 62 | 63251040 | 24513 |
| 120 | 100 | 63344640 | 2668243 | 62 | 63337440 | 24518 |
| 120 | 100 | 63445440 | 2669923 | 62 | 63441120 | 24524 |
| 120 | 100 | 63546240 | 2671603 | 62 | 63544800 | 24530 |
| 120 | 100 | 63647040 | 2673283 | 62 | 63648480 | 24536 |
| 120 | 100 | 63747840 | 2674963 | 62 | 63752160 | 24542 |
| 120 | 100 | 63848640 | 2676643 | 62 | 63855840 | 24548 |
| 120 | 100 | 63949440 | 2678323 | 62 | 63942240 | 24553 |
| 120 | 100 | 64050240 | 2680003 | 62 | 64045920 | 24559 |
| 120 | 100 | 64151040 | 2681683 | 62 | 64149600 | 24565 |
| 120 | 100 | 64251840 | 2683363 | 62 | 64253280 | 24571 |
| 120 | 100 | 64352640 | 2685043 | 62 | 64356960 | 24577 |
| 120 | 100 | 64453440 | 2686723 | 62 | 64460640 | 24583 |
| 120 | 100 | 64554240 | 2688403 | 62 | 64547040 | 24588 |
| 120 | 100 | 64655040 | 2690083 | 62 | 64650720 | 24594 |

TABLE 11-continued

| Data SCS [kHz] | BW [MHz] | NR Chn Raster [kHz] | NR-ARFCN | N_PRB | SS Raster [kHz] | GSCN |
|---|---|---|---|---|---|---|
| 120 | 100 | 64755840 | 2691763 | 62 | 64754400 | 24600 |
| 120 | 100 | 64856640 | 2693443 | 62 | 64858080 | 24606 |
| 120 | 100 | 64957440 | 2695123 | 62 | 64961760 | 24612 |
| 120 | 100 | 65058240 | 2696803 | 62 | 65065440 | 24618 |
| 120 | 100 | 65159040 | 2698483 | 62 | 65151840 | 24623 |
| 120 | 100 | 65259840 | 2700163 | 62 | 65255520 | 24629 |
| 120 | 100 | 65360640 | 2701843 | 62 | 65359200 | 24635 |
| 120 | 100 | 65461440 | 2703523 | 62 | 65462880 | 24641 |
| 120 | 100 | 65562240 | 2705203 | 62 | 65566560 | 24647 |
| 120 | 100 | 65663040 | 2706883 | 62 | 65670240 | 24653 |
| 120 | 100 | 65763840 | 2708563 | 62 | 65756640 | 24658 |
| 120 | 100 | 65864640 | 2710243 | 62 | 65860320 | 24664 |
| 120 | 100 | 65965440 | 2711923 | 62 | 65964000 | 24670 |
| 120 | 100 | 66066240 | 2713603 | 62 | 66067680 | 24676 |
| 120 | 100 | 66167040 | 2715283 | 62 | 66171360 | 24682 |
| 120 | 100 | 66267840 | 2716963 | 62 | 66275040 | 24688 |
| 120 | 100 | 66368640 | 2718643 | 62 | 66361440 | 24693 |
| 120 | 100 | 66469440 | 2720323 | 62 | 66465120 | 24699 |
| 120 | 100 | 66570240 | 2722003 | 62 | 66568800 | 24705 |
| 120 | 100 | 66671040 | 2723683 | 62 | 66672480 | 24711 |
| 120 | 100 | 66771840 | 2725363 | 62 | 66776160 | 24717 |
| 120 | 100 | 66872640 | 2727043 | 62 | 66879840 | 24723 |
| 120 | 100 | 66973440 | 2728723 | 62 | 66966240 | 24728 |
| 120 | 100 | 67074240 | 2730403 | 62 | 67069920 | 24734 |
| 120 | 100 | 67175040 | 2732083 | 62 | 67173600 | 24740 |
| 120 | 100 | 67275840 | 2733763 | 62 | 67277280 | 24746 |
| 120 | 100 | 67376640 | 2735443 | 62 | 67380960 | 24752 |
| 120 | 100 | 67477440 | 2737123 | 62 | 67484640 | 24758 |
| 120 | 100 | 67578240 | 2738803 | 62 | 67571040 | 24763 |
| 120 | 100 | 67679040 | 2740483 | 62 | 67674720 | 24769 |
| 120 | 100 | 67779840 | 2742163 | 62 | 67778400 | 24775 |
| 120 | 100 | 67880640 | 2743843 | 62 | 67882080 | 24781 |
| 120 | 100 | 67981440 | 2745523 | 62 | 67985760 | 24787 |
| 120 | 100 | 68082240 | 2747203 | 62 | 68089440 | 24793 |
| 120 | 100 | 68183040 | 2748883 | 62 | 68175840 | 24798 |
| 120 | 100 | 68283840 | 2750563 | 62 | 68279520 | 24804 |
| 120 | 100 | 68384640 | 2752243 | 62 | 68383200 | 24810 |
| 120 | 100 | 68485440 | 2753923 | 62 | 68486880 | 24816 |
| 120 | 100 | 68586240 | 2755603 | 62 | 68590560 | 24822 |
| 120 | 100 | 68687040 | 2757283 | 62 | 68694240 | 24828 |
| 120 | 100 | 68787840 | 2758963 | 62 | 68780640 | 24833 |
| 120 | 100 | 68888640 | 2760643 | 62 | 68884320 | 24839 |
| 120 | 100 | 68989440 | 2762323 | 62 | 68988000 | 24845 |
| 120 | 100 | 69090240 | 2764003 | 62 | 69091680 | 24851 |
| 120 | 100 | 69191040 | 2765683 | 62 | 69195360 | 24857 |
| 120 | 100 | 69291840 | 2767363 | 62 | 69299040 | 24863 |
| 120 | 100 | 69392640 | 2769043 | 62 | 69385440 | 24868 |
| 120 | 100 | 69493440 | 2770723 | 62 | 69489120 | 24874 |
| 120 | 100 | 69594240 | 2772403 | 62 | 69592800 | 24880 |
| 120 | 100 | 69695040 | 2774083 | 62 | 69696480 | 24886 |
| 120 | 100 | 69795840 | 2775763 | 62 | 69800160 | 24892 |
| 120 | 100 | 69896640 | 2777443 | 62 | 69903840 | 24898 |
| 120 | 100 | 69997440 | 2779123 | 62 | 69990240 | 24903 |
| 120 | 100 | 70098240 | 2780803 | 62 | 70093920 | 24909 |
| 120 | 100 | 70199040 | 2782483 | 62 | 70197600 | 24915 |
| 120 | 100 | 70299840 | 2784163 | 62 | 70301280 | 24921 |
| 120 | 100 | 70400640 | 2785843 | 62 | 70404960 | 24927 |
| 120 | 100 | 70501440 | 2787523 | 62 | 70508640 | 24933 |
| 120 | 100 | 70602240 | 2789203 | 62 | 70595040 | 24938 |
| 120 | 100 | 70703040 | 2790883 | 62 | 70698720 | 24944 |
| 120 | 100 | 70803840 | 2792563 | 62 | 70802400 | 24950 |
| 120 | 100 | 70904640 | 2794243 | 62 | 70906080 | 24956 |

120 kHz SCS, 400 MHz CBW

Figure 4:
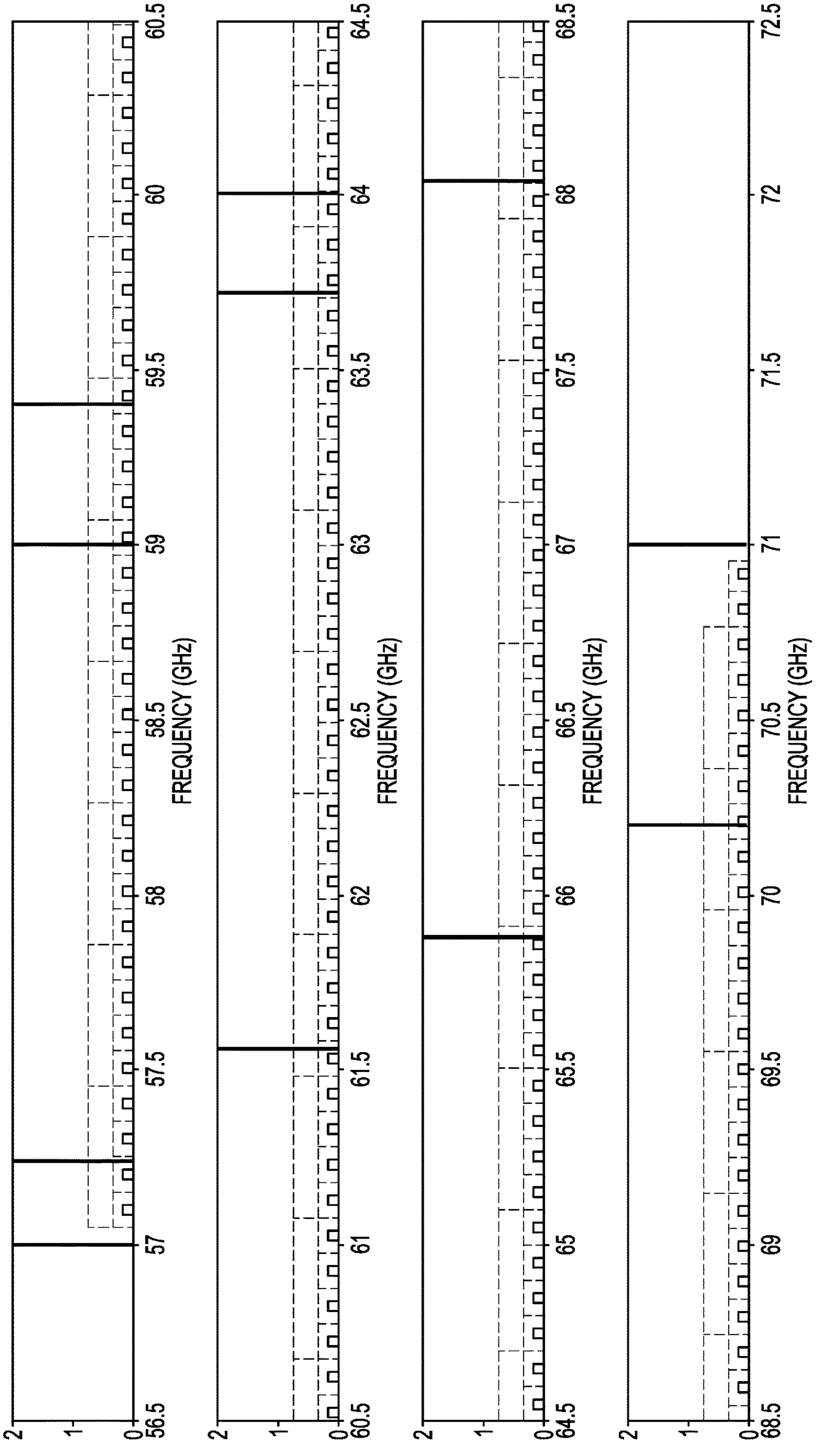
FIG. 4 illustrates supported 400 MHz channels for 120 kHz SCS in the 57-71 GHz band which are optimized for spectrum utilization, in accordance with some embodiments.

FIG. 4 illustrates supported 400 MHz channels for 120 kHz SCS in the 57-71 GHz band which are optimized for spectrum utilization, in accordance with some embodiments. The large, dotted blocks represent the CBW of the 400 MHz channel consisting of four 100 MHz channels. 34 channels of 400 MHz can be accommodated in the 57-71 GHz spectrum and 11 channels of 400 MHz in the 59-64 GHz band. The selected 400 MHz blocks in the figure is one example of potential grouping of 100 MHz channels. Different combinations of 100 MHz channels can be selected to further optimize the number of 400 MHz channels available in the boundaries defined by 802.11 channels or for better spectrum utilization in 59-64 GHz (China spectrum).

Example set of channel raster and SS raster entries in the 57-71 GHz band for 120 kHz SCS, 400 MHz CBW, SU=86% is shown in Table 12. The ARFCN and GSCN entries for each of the 400 MHz CBW for 120 kHz SCS can be equivalently expressed as $N_{REF}$={2566603+N*1680*4, N=0, 1, . . . , 33} and GSCN={24157+N*23+floor(N/3), N=0, 1, . . . , 33}, respectively.

TABLE 12

| Data SCS [kHz] | BW [MHz] | NR Chn Raster [kHz] | NR-ARFCN | N_PRB | SS Raster [kHz] | GSCN |
|---|---|---|---|---|---|---|
| 120 | 400 | 57246240 | 2566603 | 240 | 57099360 | 24157 |
| 120 | 400 | 57649440 | 2573323 | 240 | 57496800 | 24180 |
| 120 | 400 | 58052640 | 2580043 | 240 | 57894240 | 24203 |
| 120 | 400 | 58455840 | 2586763 | 240 | 58308960 | 24227 |
| 120 | 400 | 58859040 | 2593483 | 240 | 58706400 | 24250 |
| 120 | 400 | 59262240 | 2600203 | 240 | 59103840 | 24273 |
| 120 | 400 | 59665440 | 2606923 | 240 | 59518560 | 24297 |
| 120 | 400 | 60068640 | 2613643 | 240 | 59916000 | 24320 |
| 120 | 400 | 60471840 | 2620363 | 240 | 60313440 | 24343 |
| 120 | 400 | 60875040 | 2627083 | 240 | 60728160 | 24367 |
| 120 | 400 | 61278240 | 2633803 | 240 | 61125600 | 24390 |
| 120 | 400 | 61681440 | 2640523 | 240 | 61523040 | 24413 |
| 120 | 400 | 62084640 | 2647243 | 240 | 61937760 | 24437 |
| 120 | 400 | 62487840 | 2653963 | 240 | 62335200 | 24460 |
| 120 | 400 | 62891040 | 2660683 | 240 | 62732640 | 24483 |
| 120 | 400 | 63294240 | 2667403 | 240 | 63147360 | 24507 |
| 120 | 400 | 63697440 | 2674123 | 240 | 63544800 | 24530 |
| 120 | 400 | 64100640 | 2680843 | 240 | 63942240 | 24553 |
| 120 | 400 | 64503840 | 2687563 | 240 | 64356960 | 24577 |
| 120 | 400 | 64907040 | 2694283 | 240 | 64754400 | 24600 |
| 120 | 400 | 65310240 | 2701003 | 240 | 65151840 | 24623 |
| 120 | 400 | 65713440 | 2707723 | 240 | 65566560 | 24647 |
| 120 | 400 | 66116640 | 2714443 | 240 | 65964000 | 24670 |
| 120 | 400 | 66519840 | 2721163 | 240 | 66361440 | 24693 |
| 120 | 400 | 66923040 | 2727883 | 240 | 66776160 | 24717 |
| 120 | 400 | 67326240 | 2734603 | 240 | 67173600 | 24740 |
| 120 | 400 | 67729440 | 2741323 | 240 | 67571040 | 24763 |
| 120 | 400 | 68132640 | 2748043 | 240 | 67985760 | 24787 |
| 120 | 400 | 68535840 | 2754763 | 240 | 68383200 | 24810 |
| 120 | 400 | 68939040 | 2761483 | 240 | 68780640 | 24833 |
| 120 | 400 | 69342240 | 2768203 | 240 | 69195360 | 24857 |
| 120 | 400 | 69745440 | 2774923 | 240 | 69592800 | 24880 |
| 120 | 400 | 70148640 | 2781643 | 240 | 69990240 | 24903 |
| 120 | 400 | 70551840 | 2788363 | 240 | 70404960 | 24927 |

Example set of channel raster and SS raster entries in the 57-71 GHz band for 120 kHz SCS, 400 MHz CBW, SU=89% is shown in Table 13. The ARFCN and GSCN entries for each of the 400 MHz CBW for 120 kHz SCS can be equivalently expressed as $N_{REF}$={2566603+N*1680*4, N=0, 1, . . . , 33} and GSCN={124157+N*23+floor(N/3), N=0, 1, . . . , 33}, respectively.

TABLE 13

| Data SCS [kHz] | BW [MHz] | NR Chn Raster [kHz] | NR-ARFCN | N_PRB | SS Raster [kHz] | GSCN |
|---|---|---|---|---|---|---|
| 120 | 400 | 57246240 | 2566603 | 248 | 57099360 | 24157 |
| 120 | 400 | 57649440 | 2573323 | 248 | 57496800 | 24180 |
| 120 | 400 | 58052640 | 2580043 | 248 | 57894240 | 24203 |
| 120 | 400 | 58455840 | 2586763 | 248 | 58308960 | 24227 |
| 120 | 400 | 58859040 | 2593483 | 248 | 58706400 | 24250 |
| 120 | 400 | 59262240 | 2600203 | 248 | 59103840 | 24273 |
| 120 | 400 | 59665440 | 2606923 | 248 | 59518560 | 24297 |
| 120 | 400 | 60068640 | 2613643 | 248 | 59916000 | 24320 |
| 120 | 400 | 60471840 | 2620363 | 248 | 60313440 | 24343 |
| 120 | 400 | 60875040 | 2627083 | 248 | 60728160 | 24367 |

TABLE 13-continued

| Data SCS [kHz] | BW [MHz] | NR Chn Raster [kHz] | NR-ARFCN | N_PRB | SS Raster [kHz] | GSCN |
|---|---|---|---|---|---|---|
| 120 | 400 | 61278240 | 2633803 | 248 | 61125600 | 24390 |
| 120 | 400 | 61681440 | 2640523 | 248 | 61523040 | 24413 |
| 120 | 400 | 62084640 | 2647243 | 248 | 61937760 | 24437 |
| 120 | 400 | 62487840 | 2653963 | 248 | 62335200 | 24460 |
| 120 | 400 | 62891040 | 2660683 | 248 | 62732640 | 24483 |
| 120 | 400 | 63294240 | 2667403 | 248 | 63147360 | 24507 |
| 120 | 400 | 63697440 | 2674123 | 248 | 63544800 | 24530 |
| 120 | 400 | 64100640 | 2680843 | 248 | 63942240 | 24553 |
| 120 | 400 | 64503840 | 2687563 | 248 | 64356960 | 24577 |
| 120 | 400 | 64907040 | 2694283 | 248 | 64754400 | 24600 |
| 120 | 400 | 65310240 | 2701003 | 248 | 65151840 | 24623 |
| 120 | 400 | 65713440 | 2707723 | 248 | 65566560 | 24647 |
| 120 | 400 | 66116640 | 2714443 | 248 | 65964000 | 24670 |
| 120 | 400 | 66519840 | 2721163 | 248 | 66361440 | 24693 |
| 120 | 400 | 66923040 | 2727883 | 248 | 66776160 | 24717 |
| 120 | 400 | 67326240 | 2734603 | 248 | 67173600 | 24740 |
| 120 | 400 | 67729440 | 2741323 | 248 | 67571040 | 24763 |
| 120 | 400 | 68132640 | 2748043 | 248 | 67985760 | 24787 |
| 120 | 400 | 68535840 | 2754763 | 248 | 68383200 | 24810 |
| 120 | 400 | 68939040 | 2761483 | 248 | 68780640 | 24833 |
| 120 | 400 | 69342240 | 2768203 | 248 | 69195360 | 24857 |
| 120 | 400 | 69745440 | 2774923 | 248 | 69592800 | 24880 |
| 120 | 400 | 70148640 | 2781643 | 248 | 69990240 | 24903 |
| 120 | 400 | 70551840 | 2788363 | 248 | 70404960 | 24927 |

480 kHz SCS, 400 MHz CBW

Figure 5:
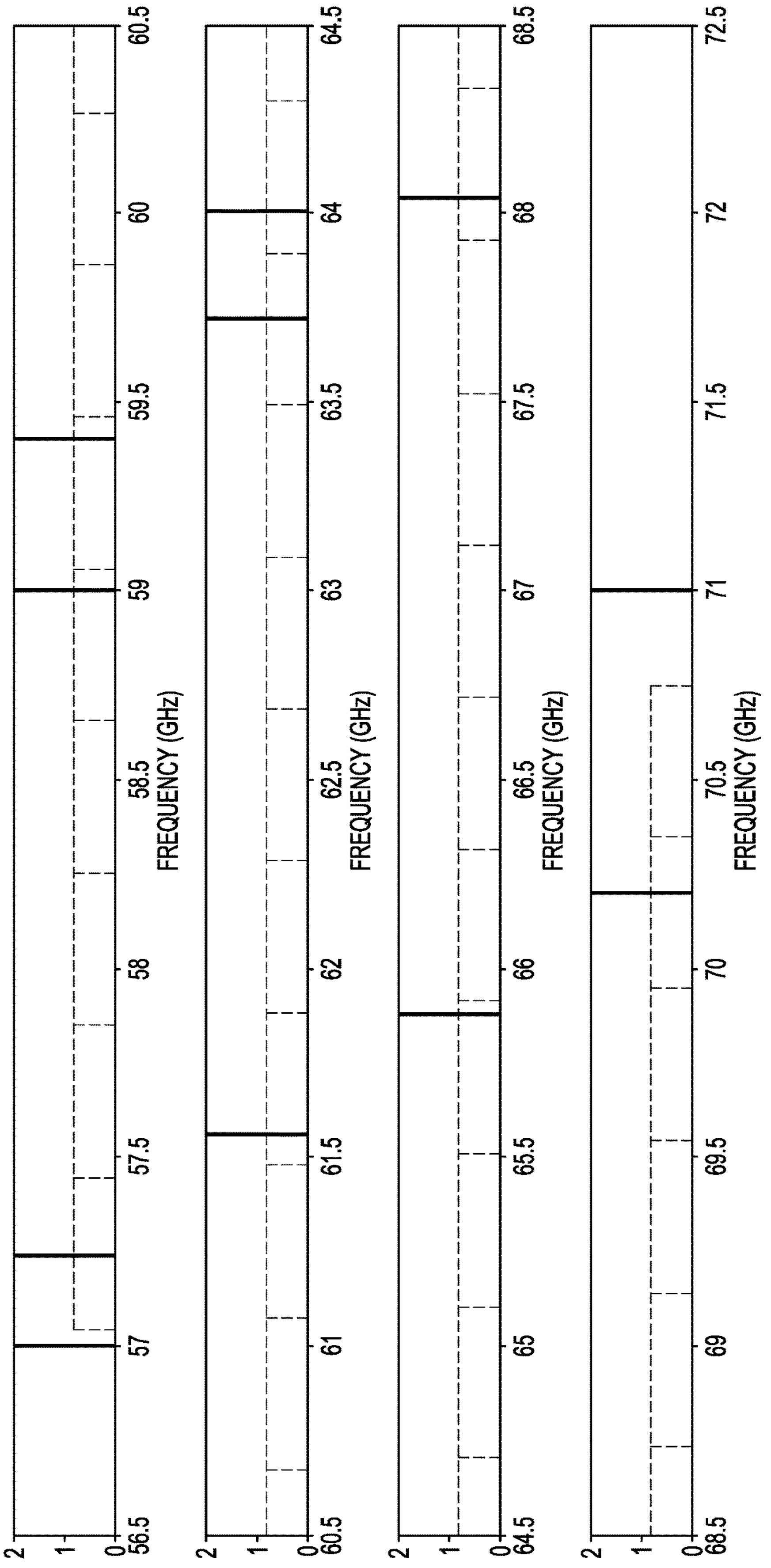
FIG. 5 illustrates supported 400 MHz channels for 480 kHz SCS in the 57-71 GHz band which are optimized for spectrum utilization, in accordance with some embodiments.

FIG. 5 illustrates supported 400 MHz channels for 480 kHz SCS in the 57-71 GHz band which are optimized for spectrum utilization, in accordance with some embodiments. The dotted blocks represent the CBW of the 400 MHz channel consisting of four 100 MHz channels. 34 channels of 400 MHz can be accommodated in the 57-71 GHz spectrum and 11 channels of 400 MHz in the 59-64 GHz band. The selected 400 MHz blocks in the figure is one example of potential grouping of 100 MHz channels. Different combinations of 100 MHz channels can be selected to further optimize the number of 400 MHz channels available in the boundaries defined by 802.11 channels or for better spectrum utilization in 59-64 GHz (China spectrum).

Example set of channel raster and SS raster entries in the 57-71 GHz band for 480 kHz SCS, 400 MHz CBW, SU=86% is shown in Table 14. The ARFCN and GSCN entries for each of the 400 MHz CBW for 480 kHz SCS can be equivalently expressed as $N_{REF}$={2566603+N*1680*4, N=0, 1, . . . , 33} and GSCN={24168+N*23+floor(N+2/3), N=0, 1, . . . , 33}, respectively.

TABLE 14

| Data SCS [kHz] | BW [MHz] | NR Chn Raster [kHz] | NR-ARFCN | N_PRB | SS Raster [kHz] | GSCN |
|---|---|---|---|---|---|---|
| 480 | 400 | 57649440 | 2573323 | 60 | 57704160 | 24192 |
| 480 | 400 | 58052640 | 2580043 | 60 | 58101600 | 24215 |
| 480 | 400 | 58455840 | 2586763 | 60 | 58499040 | 24238 |
| 480 | 400 | 58859040 | 2593483 | 60 | 58913760 | 24262 |
| 480 | 400 | 59262240 | 2600203 | 60 | 59311200 | 24285 |
| 480 | 400 | 59665440 | 2606923 | 60 | 59708640 | 24308 |
| 480 | 400 | 60068640 | 2613643 | 60 | 60123360 | 24332 |
| 480 | 400 | 60471840 | 2620363 | 60 | 60520800 | 24355 |
| 480 | 400 | 60875040 | 2627083 | 60 | 60918240 | 24378 |
| 480 | 400 | 61278240 | 2633803 | 60 | 61332960 | 24402 |
| 480 | 400 | 61681440 | 2640523 | 60 | 61730400 | 24425 |
| 480 | 400 | 62084640 | 2647243 | 60 | 62127840 | 24448 |
| 480 | 400 | 62487840 | 2653963 | 60 | 62542560 | 24472 |
| 480 | 400 | 62891040 | 2660683 | 60 | 62940000 | 24495 |
| 480 | 400 | 63294240 | 2667403 | 60 | 63337440 | 24518 |
| 480 | 400 | 63697440 | 2674123 | 60 | 63752160 | 24542 |

TABLE 14-continued

| Data SCS [kHz] | BW [MHz] | NR Chn Raster [kHz] | NR-ARFCN | N_PRB | SS Raster [kHz] | GSCN |
|---|---|---|---|---|---|---|
| 480 | 400 | 64100640 | 2680843 | 60 | 64149600 | 24565 |
| 480 | 400 | 64503840 | 2687563 | 60 | 64547040 | 24588 |
| 480 | 400 | 64907040 | 2694283 | 60 | 64961760 | 24612 |
| 480 | 400 | 65310240 | 2701003 | 60 | 65359200 | 24635 |
| 480 | 400 | 65713440 | 2707723 | 60 | 65756640 | 24658 |
| 480 | 400 | 66116640 | 2714443 | 60 | 66171360 | 24682 |
| 480 | 400 | 66519840 | 2721163 | 60 | 66568800 | 24705 |
| 480 | 400 | 66923040 | 2727883 | 60 | 66966240 | 24728 |
| 480 | 400 | 67326240 | 2734603 | 60 | 67380960 | 24752 |
| 480 | 400 | 67729440 | 2741323 | 60 | 67778400 | 24775 |
| 480 | 400 | 68132640 | 2748043 | 60 | 68175840 | 24798 |
| 480 | 400 | 68535840 | 2754763 | 60 | 68590560 | 24822 |
| 480 | 400 | 68939040 | 2761483 | 60 | 68988000 | 24845 |
| 480 | 400 | 69342240 | 2768203 | 60 | 69385440 | 24868 |
| 480 | 400 | 69745440 | 2774923 | 60 | 69800160 | 24892 |
| 480 | 400 | 70148640 | 2781643 | 60 | 70197600 | 24915 |
| 480 | 400 | 70551840 | 2788363 | 60 | 70595040 | 24938 |

Example set of channel raster and SS raster entries in the 57-71 GHz band for 480 kHz SCS, 400 MHz CBW, SU=89% is shown in Table 15. The ARFCN and GSCN entries for each of the 400 MHz CBW for 480 kHz SCS can be equivalently expressed as $N_{REF}$={2566603+N*1680*4, N=0, 1, 33} and GSCN={24168+N*23+floor(N+2/3), N=0, 1 . . . , 33}, respectively.

TABLE 15

| Data SCS [kHz] | BW [MHz] | NR Chn Raster [kHz] | NR-ARFCN | N_PRB | SS Raster [kHz] | GSCN |
|---|---|---|---|---|---|---|
| 480 | 400 | 57246240 | 2566603 | 62 | 57289440 | 24168 |
| 480 | 400 | 57649440 | 2573323 | 62 | 57704160 | 24192 |
| 480 | 400 | 58052640 | 2580043 | 62 | 58101600 | 24215 |
| 480 | 400 | 58455840 | 2586763 | 62 | 58499040 | 24238 |
| 480 | 400 | 58859040 | 2593483 | 62 | 58913760 | 24262 |
| 480 | 400 | 59262240 | 2600203 | 62 | 59311200 | 24285 |
| 480 | 400 | 59665440 | 2606923 | 62 | 59708640 | 24308 |
| 480 | 400 | 60068640 | 2613643 | 62 | 60123360 | 24332 |
| 480 | 400 | 60471840 | 2620363 | 62 | 60520800 | 24355 |
| 480 | 400 | 60875040 | 2627083 | 62 | 60918240 | 24378 |
| 480 | 400 | 61278240 | 2633803 | 62 | 61332960 | 24402 |
| 480 | 400 | 61681440 | 2640523 | 62 | 61730400 | 24425 |
| 480 | 400 | 62084640 | 2647243 | 62 | 62127840 | 24448 |
| 480 | 400 | 62487840 | 2653963 | 62 | 62542560 | 24472 |
| 480 | 400 | 62891040 | 2660683 | 62 | 62940000 | 24495 |
| 480 | 400 | 63294240 | 2667403 | 62 | 63337440 | 24518 |
| 480 | 400 | 63697440 | 2674123 | 62 | 63752160 | 24542 |
| 480 | 400 | 64100640 | 2680843 | 62 | 64149600 | 24565 |
| 480 | 400 | 64503840 | 2687563 | 62 | 64547040 | 24588 |
| 480 | 400 | 64907040 | 2694283 | 62 | 64961760 | 24612 |
| 480 | 400 | 65310240 | 2701003 | 62 | 65359200 | 24635 |
| 480 | 400 | 65713440 | 2707723 | 62 | 65756640 | 24658 |
| 480 | 400 | 66116640 | 2714443 | 62 | 66171360 | 24682 |
| 480 | 400 | 66519840 | 2721163 | 62 | 66568800 | 24705 |
| 480 | 400 | 66923040 | 2727883 | 62 | 66966240 | 24728 |
| 480 | 400 | 67326240 | 2734603 | 62 | 67380960 | 24752 |
| 480 | 400 | 67729440 | 2741323 | 62 | 67778400 | 24775 |
| 480 | 400 | 68132640 | 2748043 | 62 | 68175840 | 24798 |
| 480 | 400 | 68535840 | 2754763 | 62 | 68590560 | 24822 |
| 480 | 400 | 68939040 | 2761483 | 62 | 68988000 | 24845 |
| 480 | 400 | 69342240 | 2768203 | 62 | 69385440 | 24868 |
| 480 | 400 | 69745440 | 2774923 | 62 | 69800160 | 24892 |
| 480 | 400 | 70148640 | 2781643 | 62 | 70197600 | 24915 |
| 480 | 400 | 70551840 | 2788363 | 62 | 70595040 | 24938 |

480 kHz SCS, 800 MHz CBW

Figure 6A:
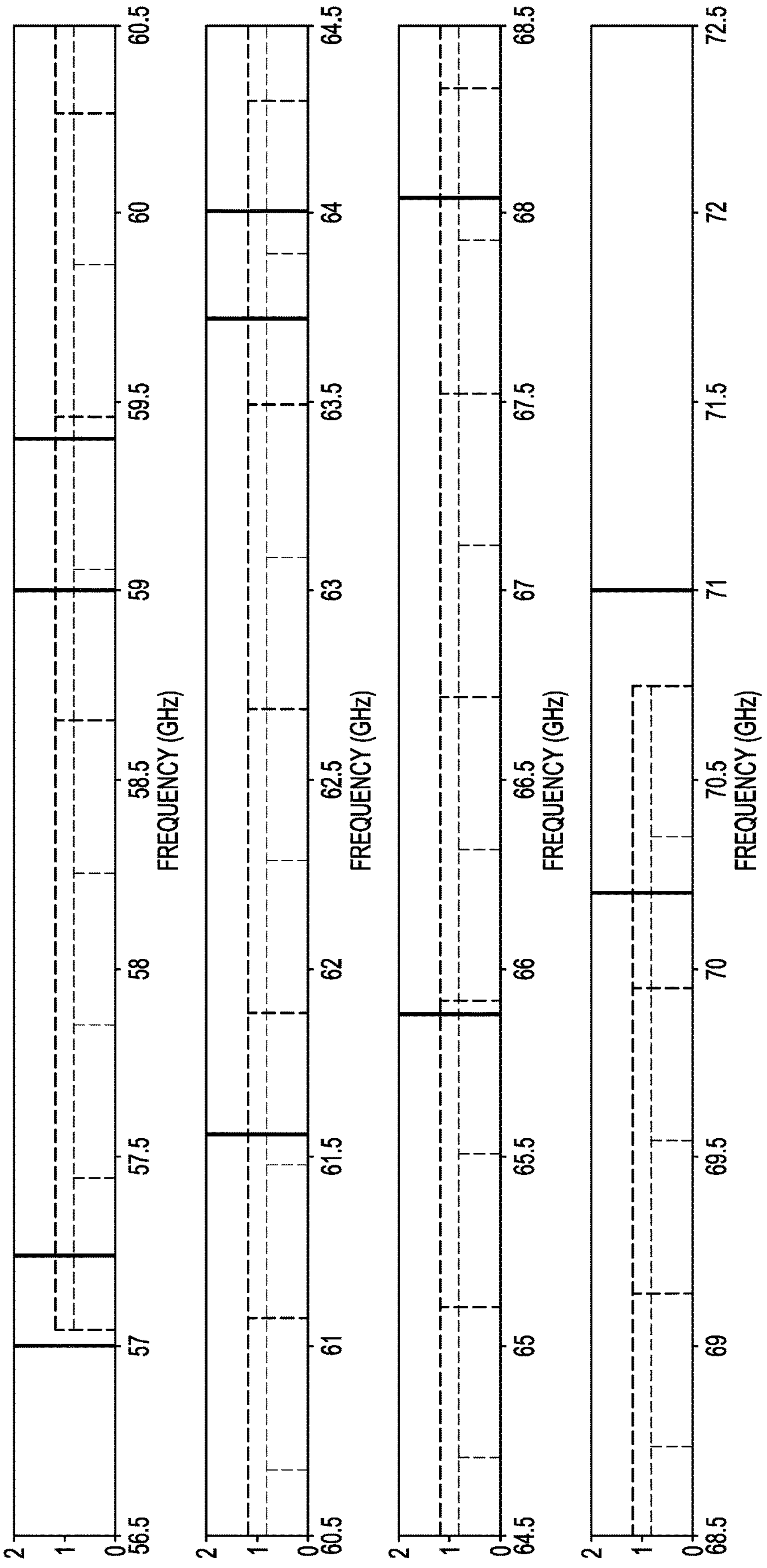
FIG. 6A illustrates supported 800 MHz channels for 480 kHz SCS in the 57-71 GHz band which are optimized for spectrum utilization, in accordance with some embodiments.

FIG. 6A illustrates supported 800 MHz channels for 480 kHz SCS in the 57-71 GHz band which are optimized for spectrum utilization, in accordance with some embodiments. The large, dotted block represents the CBW of the 800 MHz channel consisting of two 400 MHz channels. 17 channels of 800 MHz can be accommodated in the 57-71 GHz spectrum and 5 channels of 800 MHz in the 59-64 GHz band.

Example set of channel raster and SS raster entries in the 57-71 GHz band for 480 kHz SCS, 800 MHz CBW, SU=86% is shown in Table 16. The ARFCN and GSCN entries for each of the 800 MHz CBW for 480 kHz SCS can be equivalently expressed as $N_{REF}$={2569963+N*1680*8, N=0, 1, . . . , 16} and GSCN={24168+N*47−floor(N/3), N=0, 1, . . . , 16}, respectively.

TABLE 16

| Data SCS [kHz] | BW [MHz] | NR Chn Raster [kHz] | NR-ARFCN | N_PRB | SS Raster [kHz] | GSCN |
|---|---|---|---|---|---|---|
| 480 | 800 | 57447840 | 2569963 | 120 | 57289440 | 24168 |
| 480 | 800 | 58254240 | 2583403 | 120 | 58101600 | 24215 |
| 480 | 800 | 59060640 | 2596843 | 120 | 58913760 | 24262 |
| 480 | 800 | 59867040 | 2610283 | 120 | 59708640 | 24308 |
| 480 | 800 | 60673440 | 2623723 | 120 | 60520800 | 24355 |
| 480 | 800 | 61479840 | 2637163 | 120 | 61332960 | 24402 |
| 480 | 800 | 62286240 | 2650603 | 120 | 62127840 | 24448 |
| 480 | 800 | 63092640 | 2664043 | 120 | 62940000 | 24495 |
| 480 | 800 | 63899040 | 2677483 | 120 | 63752160 | 24542 |
| 480 | 800 | 64705440 | 2690923 | 120 | 64547040 | 24588 |
| 480 | 800 | 65511840 | 2704363 | 120 | 65359200 | 24635 |
| 480 | 800 | 66318240 | 2717803 | 120 | 66171360 | 24682 |
| 480 | 800 | 67124640 | 2731243 | 120 | 66966240 | 24728 |
| 480 | 800 | 67931040 | 2744683 | 120 | 67778400 | 24775 |
| 480 | 800 | 68737440 | 2758123 | 120 | 68590560 | 24822 |
| 480 | 800 | 69543840 | 2771563 | 120 | 69385440 | 24868 |
| 480 | 800 | 70350240 | 2785003 | 120 | 70197600 | 24915 |

Example set of channel raster and SS raster entries in the 57-71 GHz band D for 480 kHz SCS, 800 MHz CBW, SU=89% is shown in Table 17. The ARFCN and GSCN entries for each of the 800 MHz CBW for 480 kHz SCS can be equivalently expressed as $N_{RFF}$={2569963+N*1680*8, N=0, 1, . . . , 16} and GSCN={24168+N*47−floor(N/3), N=0, 1, . . . , 16}, respectively.

TABLE 17

| Data SCS [kHz] | BW [MHz] | NR Chn Raster [kHz] | NR-ARFCN | N_PRB | SS Raster [kHz] | GSCN |
|---|---|---|---|---|---|---|
| 480 | 800 | 57447840 | 2569963 | 124 | 57289440 | 24168 |
| 480 | 800 | 58254240 | 2583403 | 124 | 58101600 | 24215 |
| 480 | 800 | 59060640 | 2596843 | 124 | 58913760 | 24262 |
| 480 | 800 | 59867040 | 2610283 | 124 | 59708640 | 24308 |
| 480 | 800 | 60673440 | 2623723 | 124 | 60520800 | 24355 |
| 480 | 800 | 61479840 | 2637163 | 124 | 61332960 | 24402 |
| 480 | 800 | 62286240 | 2650603 | 124 | 62127840 | 24448 |
| 480 | 800 | 63092640 | 2664043 | 124 | 62940000 | 24495 |
| 480 | 800 | 63899040 | 2677483 | 124 | 63752160 | 24542 |
| 480 | 800 | 64705440 | 2690923 | 124 | 64547040 | 24588 |
| 480 | 800 | 65511840 | 2704363 | 124 | 65359200 | 24635 |
| 480 | 800 | 66318240 | 2717803 | 124 | 66171360 | 24682 |
| 480 | 800 | 67124640 | 2731243 | 124 | 66966240 | 24728 |
| 480 | 800 | 67931040 | 2744683 | 124 | 67778400 | 24775 |
| 480 | 800 | 68737440 | 2758123 | 124 | 68590560 | 24822 |
| 480 | 800 | 69543840 | 2771563 | 124 | 69385440 | 24868 |
| 480 | 800 | 70350240 | 2785003 | 124 | 70197600 | 24915 |

Figure 6B:
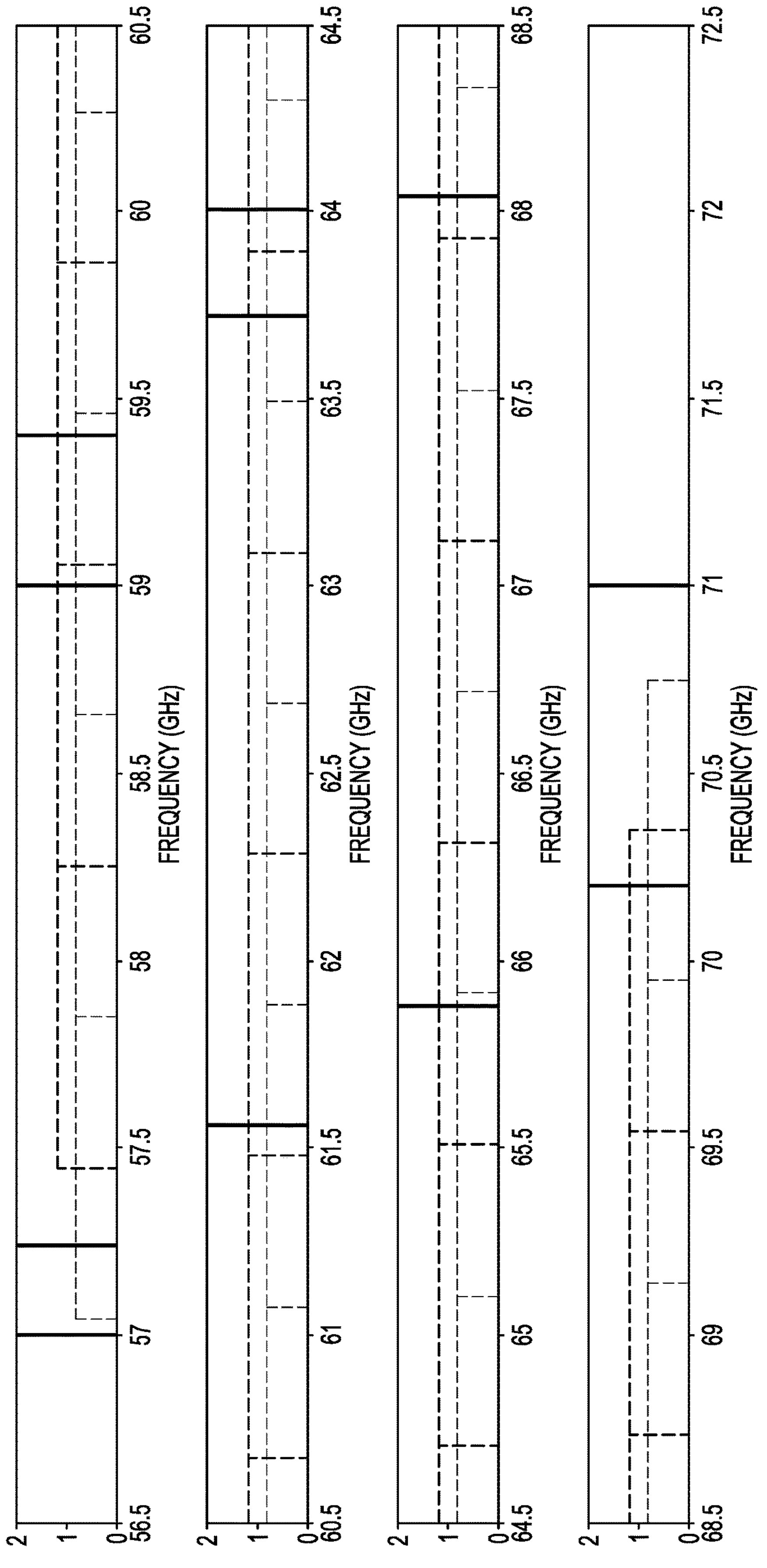
FIG. 6B illustrates supported additional 800 MHz channels for 480 kHz SCS in the 57-71 GHz band which are optimized for co-existence represented by the larger blocks, in accordance with some embodiments.

FIG. 6B illustrates supported additional 800 MHz channels for 480 kHz SCS in the 57-71 GHz band which are optimized for co-existence represented by the larger blocks, in accordance with some embodiments. The smaller blocks represent the CBW of the 400 MHz channel. The selection of the 800 MHz channels is shifted by 403.2 MHz (four 100 MHz channels) to maximize the spectrum utilization in the 59-64 GHz band and to improve coexistence and ensure each 802.11 ad/ay channels can support at least 2 channels of 800 MHz.

Example set of channel raster and SS raster entries in the 57-71 GHz band for 480 kHz SCS, 800 MHz CBW, SU=86% that are shifted by 403.2 MHz is shown in Table 18. The ARFCN and GSCN entries for each of the 800 MHz CBW for 480 kHz SCS can be equivalently expressed as $N_{REF}$={2576683+N*1680*8, N=0, 1, . . . , 15} and GSCN={24192+N*47−floor((N+2)/3), N=0, 1, . . . , 15}, respectively.

TABLE 18

| Data SCS [kHz] | BW [MHz] | NR Chn Raster [kHz] | NR-ARFCN | N_PRB | SS Raster [kHz] | GSCN |
|---|---|---|---|---|---|---|
| 480 | 800 | 57851040 | 2576683 | 120 | 57704160 | 24192 |
| 480 | 800 | 58657440 | 2590123 | 120 | 58499040 | 24238 |
| 480 | 800 | 59463840 | 2603563 | 120 | 59311200 | 24285 |
| 480 | 800 | 60270240 | 2617003 | 120 | 60123360 | 24332 |
| 480 | 800 | 61076640 | 2630443 | 120 | 60918240 | 24378 |
| 480 | 800 | 61883040 | 2643883 | 120 | 61730400 | 24425 |
| 480 | 800 | 62689440 | 2657323 | 120 | 62542560 | 24472 |
| 480 | 800 | 63495840 | 2670763 | 120 | 63337440 | 24518 |
| 480 | 800 | 64302240 | 2684203 | 120 | 64149600 | 24565 |
| 480 | 800 | 65108640 | 2697643 | 120 | 64961760 | 24612 |
| 480 | 800 | 65915040 | 2711083 | 120 | 65756640 | 24658 |
| 480 | 800 | 66721440 | 2724523 | 120 | 66568800 | 24705 |
| 480 | 800 | 67527840 | 2737963 | 120 | 67380960 | 24752 |
| 480 | 800 | 68334240 | 2751403 | 120 | 68175840 | 24798 |
| 480 | 800 | 69140640 | 2764843 | 120 | 68988000 | 24845 |
| 480 | 800 | 69947040 | 2778283 | 120 | 69800160 | 24892 |

Example set of channel raster and SS raster entries in the 57-71 GHz band for 480 kHz SCS, 800 MHz CBW, SU=89% that are shifted by 403.2 MHz is shown in Table 19. The ARFCN and GSCN entries for each of the 800 MHz CBW for 480 kHz SCS can be equivalently expressed as $N_{REF}$={2576683+N*1680*8, N=0, 1, . . . , 15} and GSCN={24192+N*47−floor((N+2)/3), N=0, 1, . . . , 15}, respectively.

TABLE 19

| Data SCS [kHz] | BW [MHz] | NR Chn Raster [kHz] | NR-ARFCN | N_PRB | SS Raster [kHz] | GSCN |
|---|---|---|---|---|---|---|
| 480 | 800 | 57851040 | 2576683 | 120 | 57704160 | 24192 |
| 480 | 800 | 58657440 | 2590123 | 124 | 58499040 | 24238 |
| 480 | 800 | 59463840 | 2603563 | 124 | 59311200 | 24285 |
| 480 | 800 | 60270240 | 2617003 | 124 | 60123360 | 24332 |
| 480 | 800 | 61076640 | 2630443 | 124 | 60918240 | 24378 |
| 480 | 800 | 61883040 | 2643883 | 124 | 61730400 | 24425 |
| 480 | 800 | 62689440 | 2657323 | 124 | 62542560 | 24472 |
| 480 | 800 | 63495840 | 2670763 | 124 | 63337440 | 24518 |
| 480 | 800 | 64302240 | 2684203 | 124 | 64149600 | 24565 |
| 480 | 800 | 65108640 | 2697643 | 124 | 64961760 | 24612 |
| 480 | 800 | 65915040 | 2711083 | 124 | 65756640 | 24658 |
| 480 | 800 | 66721440 | 2724523 | 124 | 66568800 | 24705 |
| 480 | 800 | 67527840 | 2737963 | 124 | 67380960 | 24752 |
| 480 | 800 | 68334240 | 2751403 | 124 | 68175840 | 24798 |
| 480 | 800 | 69140640 | 2764843 | 124 | 68988000 | 24845 |
| 480 | 800 | 69947040 | 2778283 | 124 | 69800160 | 24892 |

480 kHz SCS, 1600 MHz CBW

Figure 7A:
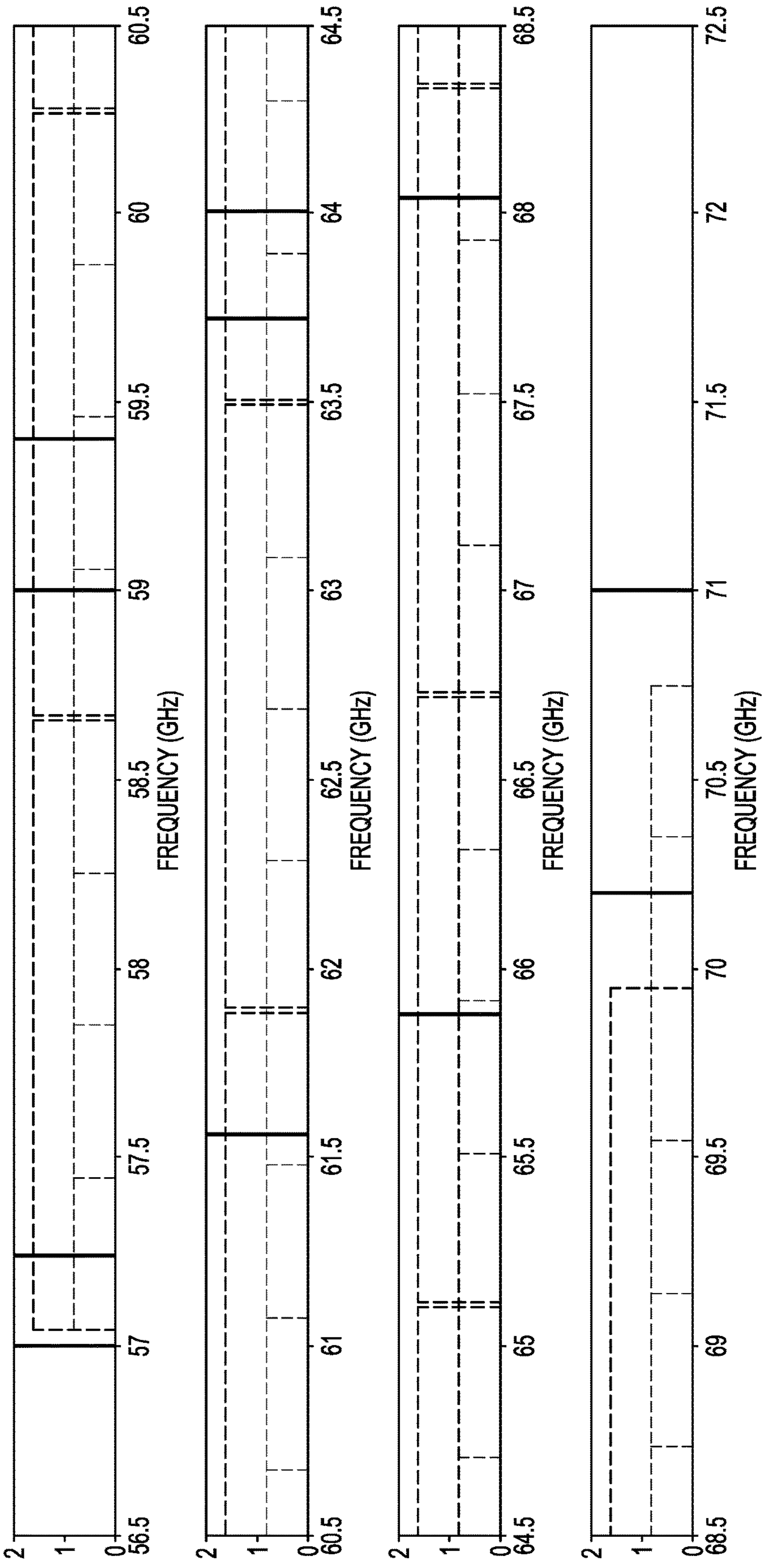
FIG. 7A illustrates supported 1600 MHz channels for 480 kHz SCS in the 57-71 GHz band which are optimized for spectrum utilization, in accordance with some embodiments.

FIG. 7A illustrates supported 1600 MHz channels for 480 kHz SCS in the 57-71 GHz band which are optimized for spectrum utilization, in accordance with some embodiments. The large, dashed block represents the CBW of the 1600 MHz channel consisting of four 400 MHz channels. 8 channels of 1600 MHz can be accommodated in the 57-71 GHz spectrum.

Example set of channel raster and SS raster entries in the 57-71 GHz band for 480 kHz SCS, 1600 MHz CBW, SU=86% is shown in Table 20. The ARFCN and GSCN entries for each of the 1600 MHz CBW for 480 kHz SCS can be equivalently expressed as $N_{REF}$={2576683+N*1680*16, N=0, 1, . . . , 7} and GSCN={24168+N*93+floor((N+2)/3), N=0, 1, . . . , 7}, respectively.

TABLE 20

| Data SCS [kHz] | BW [MHz] | NR Chn Raster [kHz] | NR-ARFCN | N_PRB | SS Raster [kHz] | GSCN |
|---|---|---|---|---|---|---|
| 480 | 1600 | 57851040 | 2576683 | 240 | 57289440 | 24168 |
| 480 | 1600 | 59463840 | 2603563 | 240 | 58913760 | 24262 |
| 480 | 1600 | 61076640 | 2630443 | 240 | 60520800 | 24355 |
| 480 | 1600 | 62689440 | 2657323 | 240 | 62127840 | 24448 |
| 480 | 1600 | 64302240 | 2684203 | 240 | 63752160 | 24542 |
| 480 | 1600 | 65915040 | 2711083 | 240 | 65359200 | 24635 |
| 480 | 1600 | 67527840 | 2737963 | 240 | 66966240 | 24728 |
| 480 | 1600 | 69140640 | 2764843 | 240 | 68590560 | 24822 |

Example set of channel raster and SS raster entries in the 57-71 GHz band for 480 kHz SCS, 1600 MHz CBW, SU=89% is shown in Table 21. The ARFCN and GSCN entries for each of the 1600 MHz CBW for 480 kHz SCS can be equivalently expressed as $N_{REF}$={2576683+N*1680*16, N=0, 1, . . . , 7} and GSCN={24168+N*93+floor((N+2)/3), N=0, 1, . . . , 7}, respectively.

TABLE 21

| Data SCS [kHz] | BW [MHz] | NR Chn Raster [kHz] | NR-ARFCN | N_PRB | SS Raster [kHz] | GSCN |
|---|---|---|---|---|---|---|
| 480 | 1600 | 57851040 | 2576683 | 248 | 57289440 | 24168 |
| 480 | 1600 | 59463840 | 2603563 | 248 | 58913760 | 24262 |
| 480 | 1600 | 61076640 | 2630443 | 248 | 60520800 | 24355 |
| 480 | 1600 | 62689440 | 2657323 | 248 | 62127840 | 24448 |
| 480 | 1600 | 64302240 | 2684203 | 248 | 63752160 | 24542 |
| 480 | 1600 | 65915040 | 2711083 | 248 | 65359200 | 24635 |
| 480 | 1600 | 67527840 | 2737963 | 248 | 66966240 | 24728 |
| 480 | 1600 | 69140640 | 2764843 | 248 | 68590560 | 24822 |

Figure 7B:
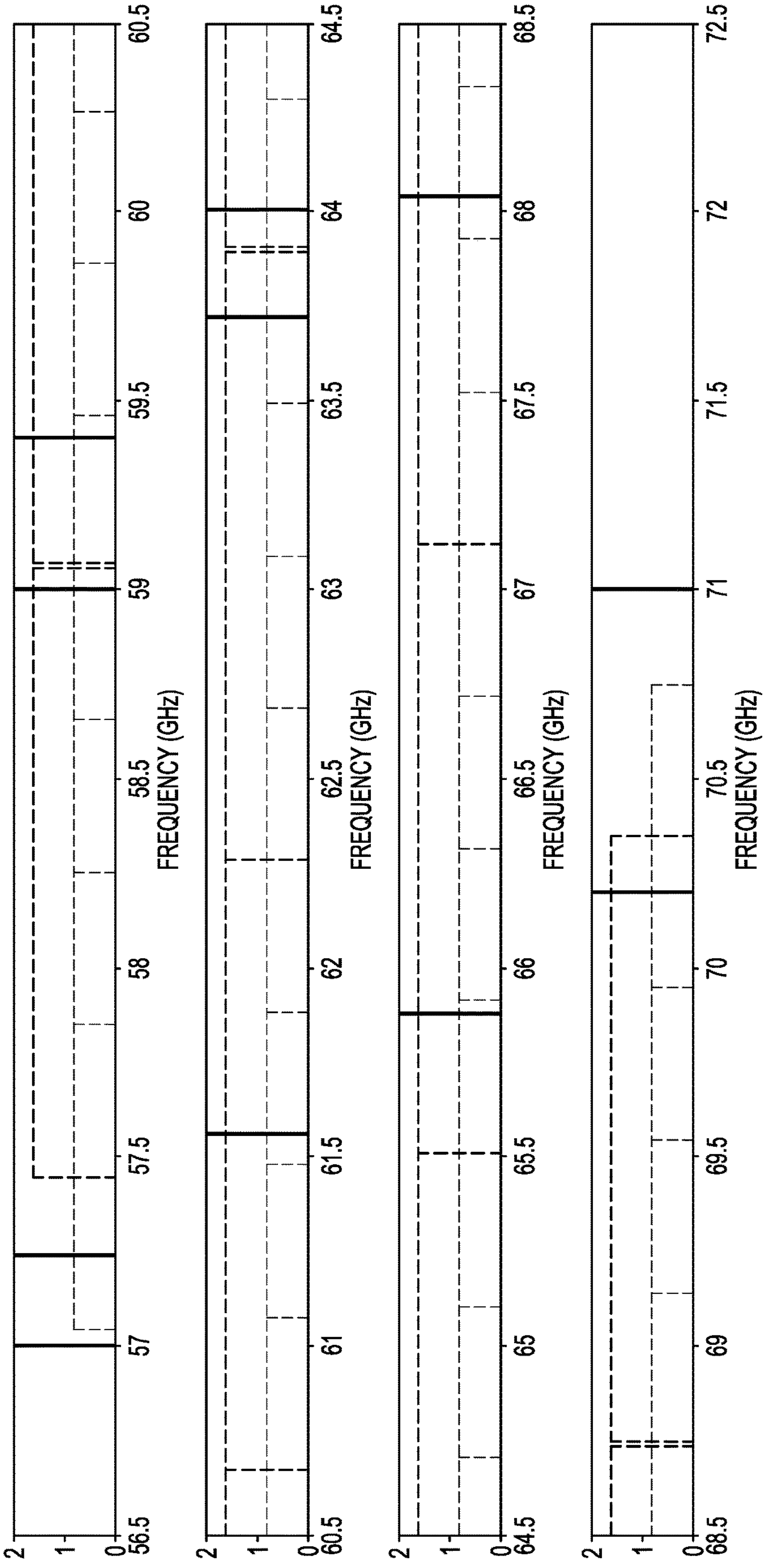
FIG. 7B illustrates supported 1600 MHz channels for 480 kHz SCS in the 57-71 GHz band which are optimized for coexistence, in accordance with some embodiments.

FIG. 7B illustrates supported 1600 MHz channels for 480 kHz SCS in the 57-71 GHz band which are optimized for coexistence, in accordance with some embodiments. The large, dashed block represents the CBW of the 1600 MHz channel consisting of four 400 MHz channels. The selection of the 1600 MHz channels is shifted by 403.2 MHz (four 100 MHz channels) to maximize the spectrum utilization in the 57-71 GHz band and the 59-64 GHz band. 8 channels of 1600 MHz can be accommodated in the 57-71 GHz spectrum and 3 channels of 1600 MHz in the 59-64 GHz band.

Example set of channel raster and SS raster entries in the 57-71 GHz band for 480 kHz SCS, 1600 MHz CBW, SU=86% that is shifted by 403.2 MHz is shown in Table 22. The ARFCN and GSCN entries for each of the 1600 MHz CBW for 480 kHz SCS can be equivalently expressed as $N_{REF}$={2583403+N*1680*16, N=0, 1, . . . , 7} and GSCN={24192+N*93+floor((N)/3), N=0, 1, . . . , 7}, respectively.

TABLE 22

| Data SCS [kHz] | BW [MHz] | NR Chn Raster [kHz] | NR-ARFCN | N_PRB | SS Raster [kHz] | GSCN |
|---|---|---|---|---|---|---|
| 480 | 1600 | 58254240 | 2583403 | 240 | 57704160 | 24192 |
| 480 | 1600 | 59867040 | 2610283 | 240 | 59311200 | 24285 |
| 480 | 1600 | 61479840 | 2637163 | 240 | 60918240 | 24378 |
| 480 | 1600 | 63092640 | 2664043 | 240 | 62542560 | 24472 |
| 480 | 1600 | 64705440 | 2690923 | 240 | 64149600 | 24565 |
| 480 | 1600 | 66318240 | 2717803 | 240 | 65756640 | 24658 |
| 480 | 1600 | 67931040 | 2744683 | 240 | 67380960 | 24752 |
| 480 | 1600 | 69543840 | 2771563 | 240 | 68988000 | 24845 |

Example set of channel raster and SS raster entries in the 57-71 GHz band for 480 kHz SCS, 1600 MHz CBW, SU=89% that is shifted by 403.2 MHz is shown in Table 23. The ARFCN and GSCN entries for each of the 1600 MHz CBW for 480 kHz SCS can be equivalently expressed as $N_{REF}$={2583403+N*1680*16, N=0, 1, . . . , 7} and GSCN={24192+N*93+floor((N)/3), N=0, 1, . . . , 7}, respectively.

TABLE 23

| Data SCS [kHz] | BW [MHz] | NR Chn Raster [kHz] | NR-ARFCN | N_PRB | SS Raster [kHz] | GSCN |
|---|---|---|---|---|---|---|
| 480 | 1600 | 58254240 | 2583403 | 248 | 57704160 | 24192 |
| 480 | 1600 | 59867040 | 2610283 | 248 | 59311200 | 24285 |
| 480 | 1600 | 61479840 | 2637163 | 248 | 60918240 | 24378 |
| 480 | 1600 | 63092640 | 2664043 | 248 | 62542560 | 24472 |
| 480 | 1600 | 64705440 | 2690923 | 248 | 64149600 | 24565 |
| 480 | 1600 | 66318240 | 2717803 | 248 | 65756640 | 24658 |
| 480 | 1600 | 67931040 | 2744683 | 248 | 67380960 | 24752 |
| 480 | 1600 | 69543840 | 2771563 | 248 | 68988000 | 24845 |

Figure 7C:
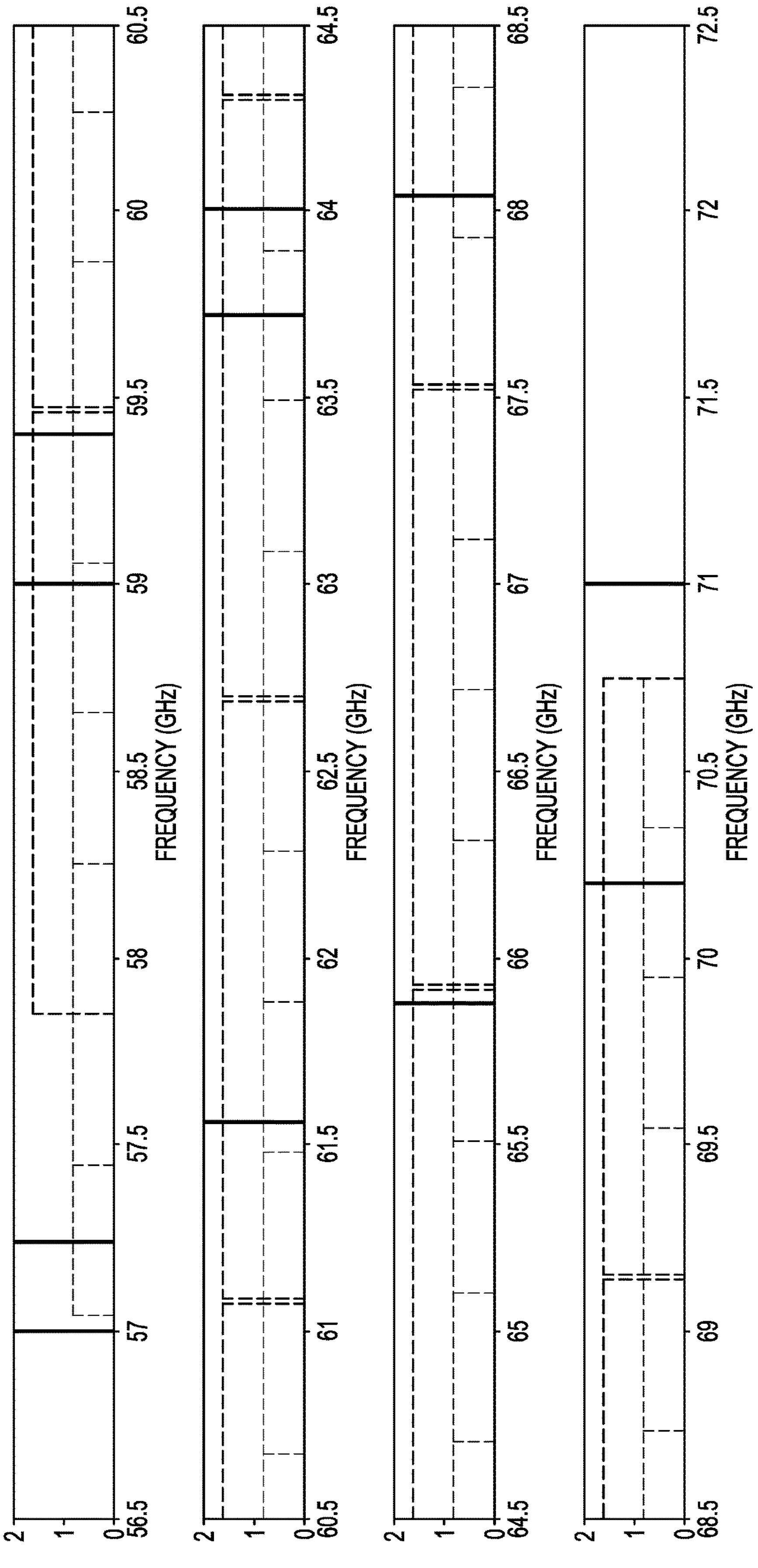
FIG. 7C illustrates supported additional 1600 MHz channels for 480 kHz SCS in the 57-71 GHz band which are optimized for coexistence represented by the larger blocks, in accordance with some embodiments.

FIG. 7C illustrates supported additional 1600 MHz channels for 480 kHz SCS in the 57-71 GHz band which are optimized for coexistence represented by the larger blocks, in accordance with some embodiments. The smaller blocks represent the CBW of the 400 MHz channel. The selection of the 1600 MHz channels is shifted by 806.4 MHz (eight 100 MHz channels) to maximize the spectrum utilization in the 57-71 GHz band and the 59-64 GHz band.

Example set of channel raster and SS raster entries in the 57-71 GHz band for 480 kHz SCS, 1600 MHz CBW, SU=86% that is shifted by 806.4 MHz is shown in Table 24. The ARFCN and GSCN entries for each of the 1600 MHz CBW for 480 kHz SCS can be equivalently expressed as $N_{REF}$={2590123+N*1680*16, N=0, 1, . . . , 7} and GSCN={24215+N*93+floor((N+1)/3), N=0, 1, . . . , 7}, respectively.

TABLE 24

| Data SCS [kHz] | BW [MHz] | NR Chn Raster [kHz] | NR-ARFCN | N_PRB | SS Raster [kHz] | GSCN |
|---|---|---|---|---|---|---|
| 480 | 1600 | 58657440 | 2590123 | 240 | 58101600 | 24215 |
| 480 | 1600 | 60270240 | 2617003 | 240 | 59708640 | 24308 |
| 480 | 1600 | 61883040 | 2643883 | 240 | 61332960 | 24402 |
| 480 | 1600 | 63495840 | 2670763 | 240 | 62940000 | 24495 |
| 480 | 1600 | 65108640 | 2697643 | 240 | 64547040 | 24588 |
| 480 | 1600 | 66721440 | 2724523 | 240 | 66171360 | 24682 |
| 480 | 1600 | 68334240 | 2751403 | 240 | 67778400 | 24775 |
| 480 | 1600 | 69947040 | 2778283 | 240 | 69385440 | 24868 |

Example set of channel raster and SS raster entries in the 57-71 GHz band for 480 kHz SCS, 1600 MHz CBW, SU=89% that is shifted by 806.4 MHz is shown in Table 24.

The ARFCN and GSCN entries for each of the 1600 MHz CBW for 480 kHz SCS can be equivalently expressed as $N_{REF}$={2590123+N*1680*16, N=0, 1, . . . , 7} and GSCN={24215+N*93+floor((N+1)/3), N=0, 1, . . . , 7}, respectively.

TABLE 25

| Data SCS [kHz] | BW [MHz] | NR Chn Raster [kHz] | NR-ARFCN | N_PRB | SS Raster [kHz] | GSCN |
|---|---|---|---|---|---|---|
| 480 | 1600 | 58657440 | 2590123 | 248 | 58101600 | 24215 |
| 480 | 1600 | 60270240 | 2617003 | 248 | 59708640 | 24308 |
| 480 | 1600 | 61883040 | 2643883 | 248 | 61332960 | 24402 |
| 480 | 1600 | 63495840 | 2670763 | 248 | 62940000 | 24495 |
| 480 | 1600 | 65108640 | 2697643 | 248 | 64547040 | 24588 |
| 480 | 1600 | 66721440 | 2724523 | 248 | 66171360 | 24682 |
| 480 | 1600 | 68334240 | 2751403 | 248 | 67778400 | 24775 |
| 480 | 1600 | 69947040 | 2778283 | 248 | 69385440 | 24868 |

960 kHz SCS, 400 MHz CBW

Figure 8:
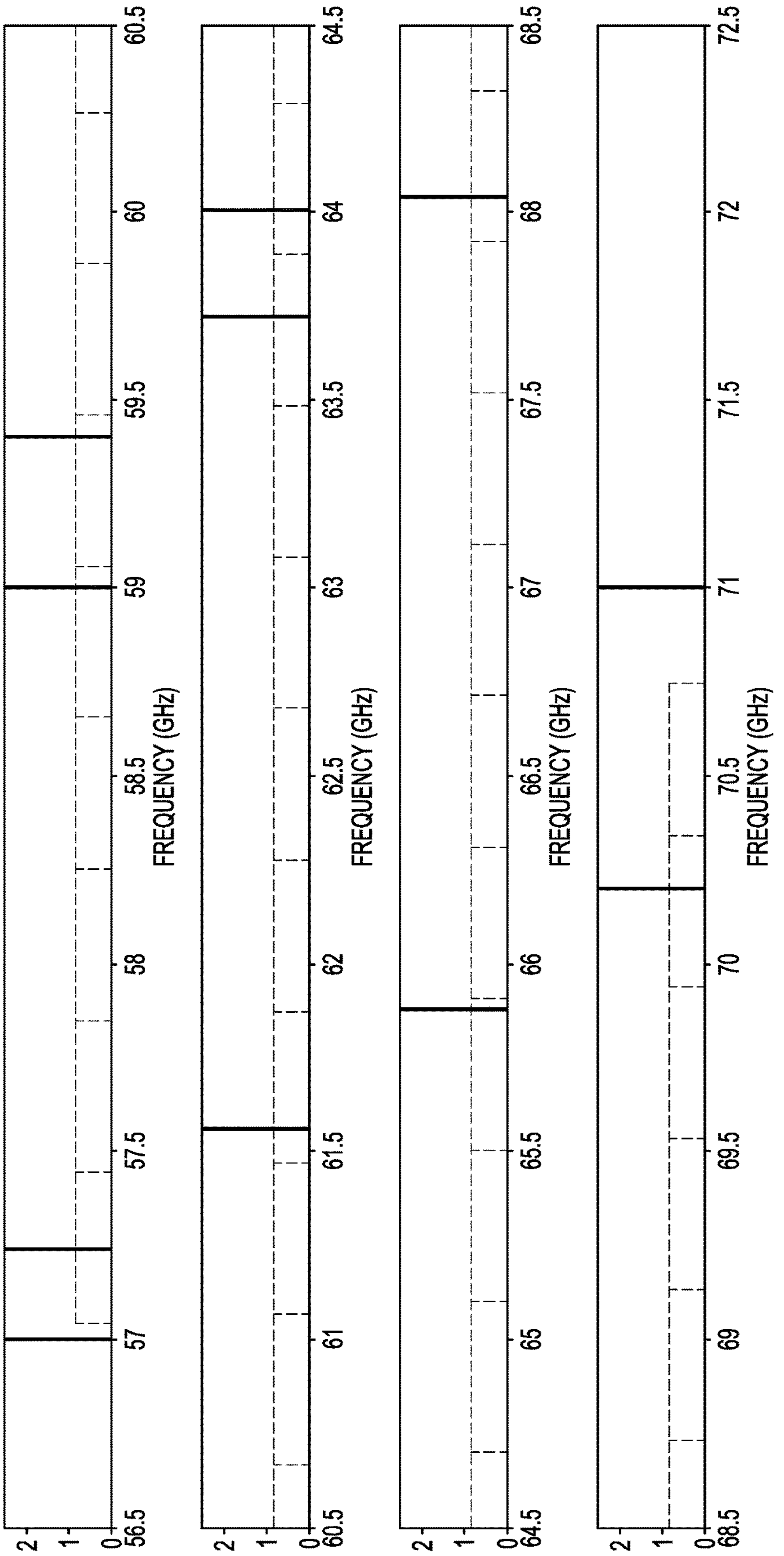
FIG. 8 illustrates supported 400 MHz channels for 960 kHz SCS in the 57-71 GHz band which are optimized for spectrum utilization, in accordance with some embodiments.

FIG. 8 illustrates supported 400 MHz channels for 960 kHz SCS in the 57-71 GHz band which are optimized for spectrum utilization, in accordance with some embodiments. The dotted blocks represent the CBW of the 400 MHz channel consisting of four 100 MHz channels. 34 channels of 400 MHz can be accommodated in the 57-71 GHz spectrum and 11 channels of 400 MHz in the 59-64 GHz band. The selected 400 MHz blocks in the figure is one example of potential grouping of 100 MHz channels. Different combinations of 100 MHz channels can be selected to further optimize the number of 400 MHz channels available in the boundaries defined by 802.11 channels or for better spectrum utilization in 59-64 GHz (China spectrum).

Example set of channel raster and SS raster entries in the 57-71 GHz band for 960 kHz SCS, 400 MHz CBW, SU=86% is shown in Table 26. The ARFCN and GSCN entries for each of the 400 MHz CBW for 960 kHz SCS can be equivalently expressed as $N_{REF}$={2566603+N*1680*4, N=0, 1, . . . , 33} and GSCN={24168+N*23+floor(N+2/3), N=0, 1, . . . , 33}, respectively.

TABLE 26

| Data SCS [kHz] | BW [MHz] | NR Chn Raster [kHz] | NR-ARFCN | N_PRB | SS Raster [kHz] | GSCN |
|---|---|---|---|---|---|---|
| 960 | 400 | 57246240 | 2566603 | 30 | 57289440 | 24168 |
| 960 | 400 | 57649440 | 2573323 | 30 | 57704160 | 24192 |
| 960 | 400 | 58052640 | 2580043 | 30 | 58101600 | 24215 |
| 960 | 400 | 58455840 | 2586763 | 30 | 58499040 | 24238 |
| 960 | 400 | 58859040 | 2593483 | 30 | 58913760 | 24262 |
| 960 | 400 | 59262240 | 2600203 | 30 | 59311200 | 24285 |
| 960 | 400 | 59665440 | 2606923 | 30 | 59708640 | 24308 |
| 960 | 400 | 60068640 | 2613643 | 30 | 60123360 | 24332 |
| 960 | 400 | 60471840 | 2620363 | 30 | 60520800 | 24355 |
| 960 | 400 | 60875040 | 2627083 | 30 | 60918240 | 24378 |
| 960 | 400 | 61278240 | 2633803 | 30 | 61332960 | 24402 |
| 960 | 400 | 61681440 | 2640523 | 30 | 61730400 | 24425 |
| 960 | 400 | 62084640 | 2647243 | 30 | 62127840 | 24448 |
| 960 | 400 | 62487840 | 2653963 | 30 | 62542560 | 24472 |
| 960 | 400 | 62891040 | 2660683 | 30 | 62940000 | 24495 |
| 960 | 400 | 63294240 | 2667403 | 30 | 63337440 | 24518 |
| 960 | 400 | 63697440 | 2674123 | 30 | 63752160 | 24542 |
| 960 | 400 | 64100640 | 2680843 | 30 | 64149600 | 24565 |
| 960 | 400 | 64503840 | 2687563 | 30 | 64547040 | 24588 |
| 960 | 400 | 64907040 | 2694283 | 30 | 64961760 | 24612 |
| 960 | 400 | 65310240 | 2701003 | 30 | 65359200 | 24635 |
| 960 | 400 | 65713440 | 2707723 | 30 | 65756640 | 24658 |
| 960 | 400 | 66116640 | 2714443 | 30 | 66171360 | 24682 |
| 960 | 400 | 66519840 | 2721163 | 30 | 66568800 | 24705 |
| 960 | 400 | 66923040 | 2727883 | 30 | 66966240 | 24728 |
| 960 | 400 | 67326240 | 2734603 | 30 | 67380960 | 24752 |
| 960 | 400 | 67729440 | 2741323 | 30 | 67778400 | 24775 |
| 960 | 400 | 68132640 | 2748043 | 30 | 68175840 | 24798 |
| 960 | 400 | 68535840 | 2754763 | 30 | 68590560 | 24822 |
| 960 | 400 | 68939040 | 2761483 | 30 | 68988000 | 24845 |
| 960 | 400 | 69342240 | 2768203 | 30 | 69385440 | 24868 |
| 960 | 400 | 69745440 | 2774923 | 30 | 69800160 | 24892 |
| 960 | 400 | 70148640 | 2781643 | 30 | 70197600 | 24915 |
| 960 | 400 | 70551840 | 2788363 | 30 | 70595040 | 24938 |

Example set of channel raster and SS raster entries in the 57-71 GHz band for 960 kHz SCS, 400 MHz CBW, SU=89% is shown in Table 27. The ARFCN and GSCN entries for each of the 400 MHz CBW for 960 kHz SCS can be equivalently expressed as $N_{REF}$={2566603+N*1680*4, N=0, 1, . . . , 33} and GSCN={24168+N*23+floor(N+2/3), N=0, 1, . . . , 33}, respectively.

TABLE 27

| Data SCS [kHz] | BW [MHz] | NR Chn Raster [kHz] | NR-ARFCN | N_PRB | SS Raster [kHz] | GSCN |
|---|---|---|---|---|---|---|
| 960 | 400 | 57246240 | 2566603 | 31 | 57289440 | 24168 |
| 960 | 400 | 57649440 | 2573323 | 31 | 57704160 | 24192 |
| 960 | 400 | 58052640 | 2580043 | 31 | 58101600 | 24215 |
| 960 | 400 | 58455840 | 2586763 | 31 | 58499040 | 24238 |
| 960 | 400 | 58859040 | 2593483 | 31 | 58913760 | 24262 |
| 960 | 400 | 59262240 | 2600203 | 31 | 59311200 | 24285 |
| 960 | 400 | 59665440 | 2606923 | 31 | 59708640 | 24308 |
| 960 | 400 | 60068640 | 2613643 | 31 | 60123360 | 24332 |
| 960 | 400 | 60471840 | 2620363 | 31 | 60520800 | 24355 |
| 960 | 400 | 60875040 | 2627083 | 31 | 60918240 | 24378 |
| 960 | 400 | 61278240 | 2633803 | 31 | 61332960 | 24402 |
| 960 | 400 | 61681440 | 2640523 | 31 | 61730400 | 24425 |
| 960 | 400 | 62084640 | 2647243 | 31 | 62127840 | 24448 |
| 960 | 400 | 62487840 | 2653963 | 31 | 62542560 | 24472 |
| 960 | 400 | 62891040 | 2660683 | 31 | 62940000 | 24495 |
| 960 | 400 | 63294240 | 2667403 | 31 | 63337440 | 24518 |
| 960 | 400 | 63697440 | 2674123 | 31 | 63752160 | 24542 |
| 960 | 400 | 64100640 | 2680843 | 31 | 64149600 | 24565 |
| 960 | 400 | 64503840 | 2687563 | 31 | 64547040 | 24588 |
| 960 | 400 | 64907040 | 2694283 | 31 | 64961760 | 24612 |
| 960 | 400 | 65310240 | 2701003 | 31 | 65359200 | 24635 |
| 960 | 400 | 65713440 | 2707723 | 31 | 65756640 | 24658 |
| 960 | 400 | 66116640 | 2714443 | 31 | 66171360 | 24682 |
| 960 | 400 | 66519840 | 2721163 | 31 | 66568800 | 24705 |
| 960 | 400 | 66923040 | 2727883 | 31 | 66966240 | 24728 |
| 960 | 400 | 67326240 | 2734603 | 31 | 67380960 | 24752 |
| 960 | 400 | 67729440 | 2741323 | 31 | 67778400 | 24775 |
| 960 | 400 | 68132640 | 2748043 | 31 | 68175840 | 24798 |
| 960 | 400 | 68535840 | 2754763 | 31 | 68590560 | 24822 |
| 960 | 400 | 68939040 | 2761483 | 31 | 68988000 | 24845 |
| 960 | 400 | 69342240 | 2768203 | 31 | 69385440 | 24868 |
| 960 | 400 | 69745440 | 2774923 | 31 | 69800160 | 24892 |
| 960 | 400 | 70148640 | 2781643 | 31 | 70197600 | 24915 |
| 960 | 400 | 70551840 | 2788363 | 31 | 70595040 | 24938 |

960 kHz SCS, 800 MHz CBW

Figure 9A:
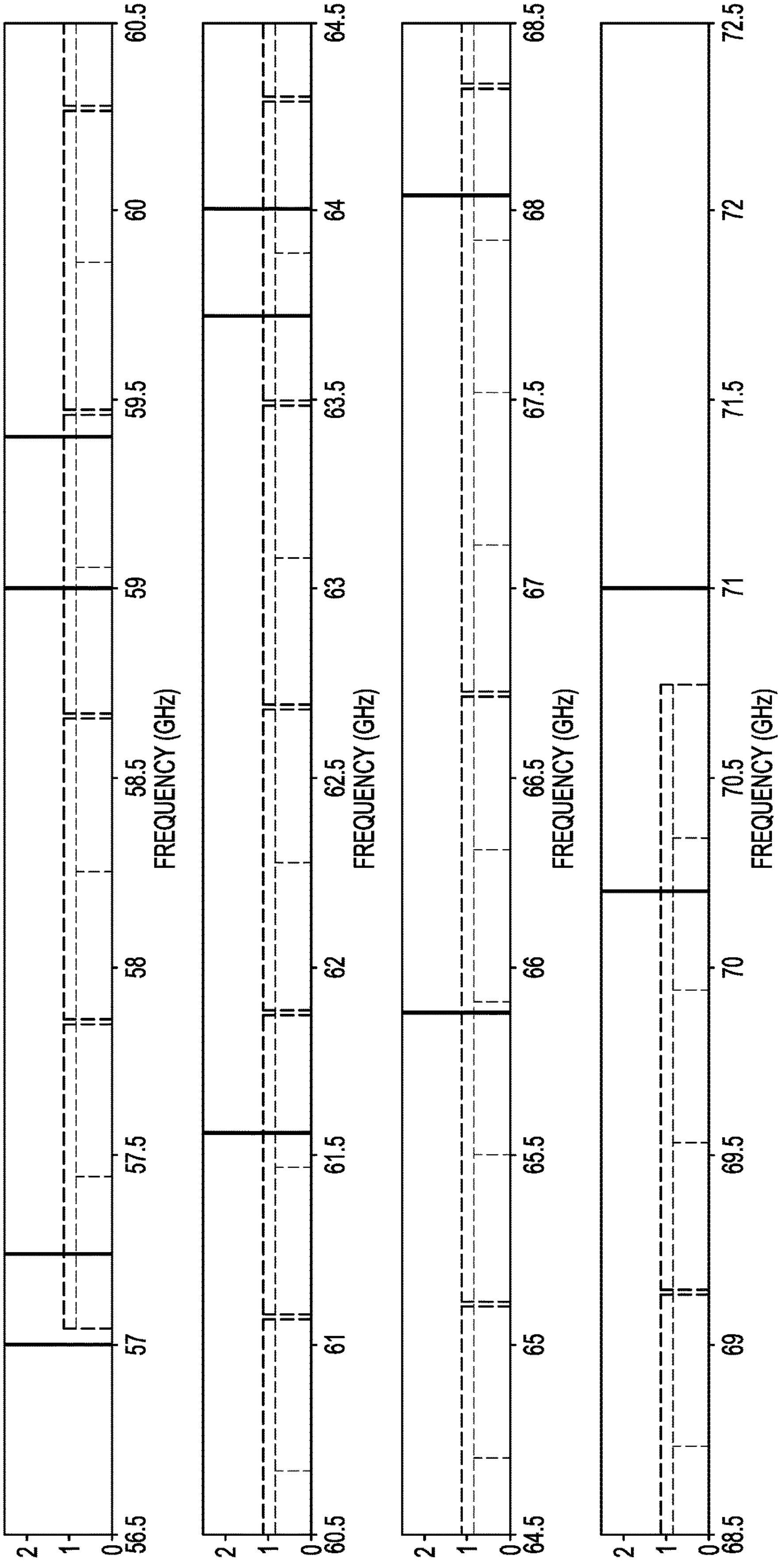
FIG. 9A illustrates supported 800 MHz channels for 960 kHz SCS in the 57-71 GHz band which are optimized for spectrum utilization, in accordance with some embodiments.

FIG. 9A illustrates supported 800 MHz channels for 960 kHz SCS in the 57-71 GHz band which are optimized for spectrum utilization, in accordance with some embodiments. The large, dotted block represents the CBW of the 800 MHz channel consisting of two 400 MHz channels. 17 channels of 800 MHz can be accommodated in the 57-71 GHz spectrum and 5 channels of 800 MHz in the 59-64 GHz band Example set of channel raster and SS raster entries in the 57-71 GHz band for 960 kHz SCS, 800 MHz CBW, SU=86% is shown in Table 28. The ARFCN and GSCN entries for each of the 800 MHz CBW for 960 kHz SCS can be equivalently expressed as $N_{REF}$={2569963+N*1680*8, N=0, 1, . . . , 16} and GSCN={24168+N*47−floor(N/3), N=0, 1, . . . , 16}, respectively.

TABLE 28

| Data SCS [kHz] | BW [MHz] | NR Chn Raster [kHz] | NR-ARFCN | N_PRB | SS Raster [kHz] | GSCN |
|---|---|---|---|---|---|---|
| 960 | 800 | 57447840 | 2569963 | 60 | 57289440 | 24168 |
| 960 | 800 | 58254240 | 2583403 | 60 | 58101600 | 24215 |
| 960 | 800 | 59060640 | 2596843 | 60 | 58913760 | 24262 |
| 960 | 800 | 59867040 | 2610283 | 60 | 59708640 | 24308 |
| 960 | 800 | 60673440 | 2623723 | 60 | 60520800 | 24355 |
| 960 | 800 | 61479840 | 2637163 | 60 | 61332960 | 24402 |
| 960 | 800 | 62286240 | 2650603 | 60 | 62127840 | 24448 |
| 960 | 800 | 63092640 | 2664043 | 60 | 62940000 | 24495 |
| 960 | 800 | 63899040 | 2677483 | 60 | 63752160 | 24542 |
| 960 | 800 | 64705440 | 2690923 | 60 | 64547040 | 24588 |
| 960 | 800 | 65511840 | 2704363 | 60 | 65359200 | 24635 |
| 960 | 800 | 66318240 | 2717803 | 60 | 66171360 | 24682 |
| 960 | 800 | 67124640 | 2731243 | 60 | 66966240 | 24728 |
| 960 | 800 | 67931040 | 2744683 | 60 | 67778400 | 24775 |
| 960 | 800 | 68737440 | 2758123 | 60 | 68590560 | 24822 |
| 960 | 800 | 69543840 | 2771563 | 60 | 69385440 | 24868 |
| 960 | 800 | 70350240 | 2785003 | 60 | 70197600 | 24915 |

Example set of channel raster and SS raster entries in the 57-71 GHz band for 960 kHz SCS, 800 MHz CBW, SU=89% is shown in Table 29. The ARFCN and GSCN entries for each of the 800 MHz CBW for 960 kHz SCS can be equivalently expressed as $N_{REF}$={2569963+N*1680*8, N=0, 1, 169 and GSCN=824168+N*47−floor(N/35), N=0, 1 . . . , 16}, respectively.

TABLE 29

| Data SCS [kHz] | BW [MHz] | NR Chn Raster [kHz] | NR-ARFCN | N_PRB | SS Raster [kHz] | GSCN |
|---|---|---|---|---|---|---|
| 960 | 800 | 57447840 | 2569963 | 62 | 57289440 | 24168 |
| 960 | 800 | 58254240 | 2583403 | 62 | 58101600 | 24215 |
| 960 | 800 | 59060640 | 2596843 | 62 | 58913760 | 24262 |
| 960 | 800 | 59867040 | 2610283 | 62 | 59708640 | 24308 |
| 960 | 800 | 60673440 | 2623723 | 62 | 60520800 | 24355 |
| 960 | 800 | 61479840 | 2637163 | 62 | 61332960 | 24402 |
| 960 | 800 | 62286240 | 2650603 | 62 | 62127840 | 24448 |
| 960 | 800 | 63092640 | 2664043 | 62 | 62940000 | 24495 |
| 960 | 800 | 63899040 | 2677483 | 62 | 63752160 | 24542 |
| 960 | 800 | 64705440 | 2690923 | 62 | 64547040 | 24588 |
| 960 | 800 | 65511840 | 2704363 | 62 | 65359200 | 24635 |
| 960 | 800 | 66318240 | 2717803 | 62 | 66171360 | 24682 |
| 960 | 800 | 67124640 | 2731243 | 62 | 66966240 | 24728 |
| 960 | 800 | 67931040 | 2744683 | 62 | 67778400 | 24775 |
| 960 | 800 | 68737440 | 2758123 | 62 | 68590560 | 24822 |
| 960 | 800 | 69543840 | 2771563 | 62 | 69385440 | 24868 |
| 960 | 800 | 70350240 | 2785003 | 62 | 70197600 | 24915 |

Figure 9B:
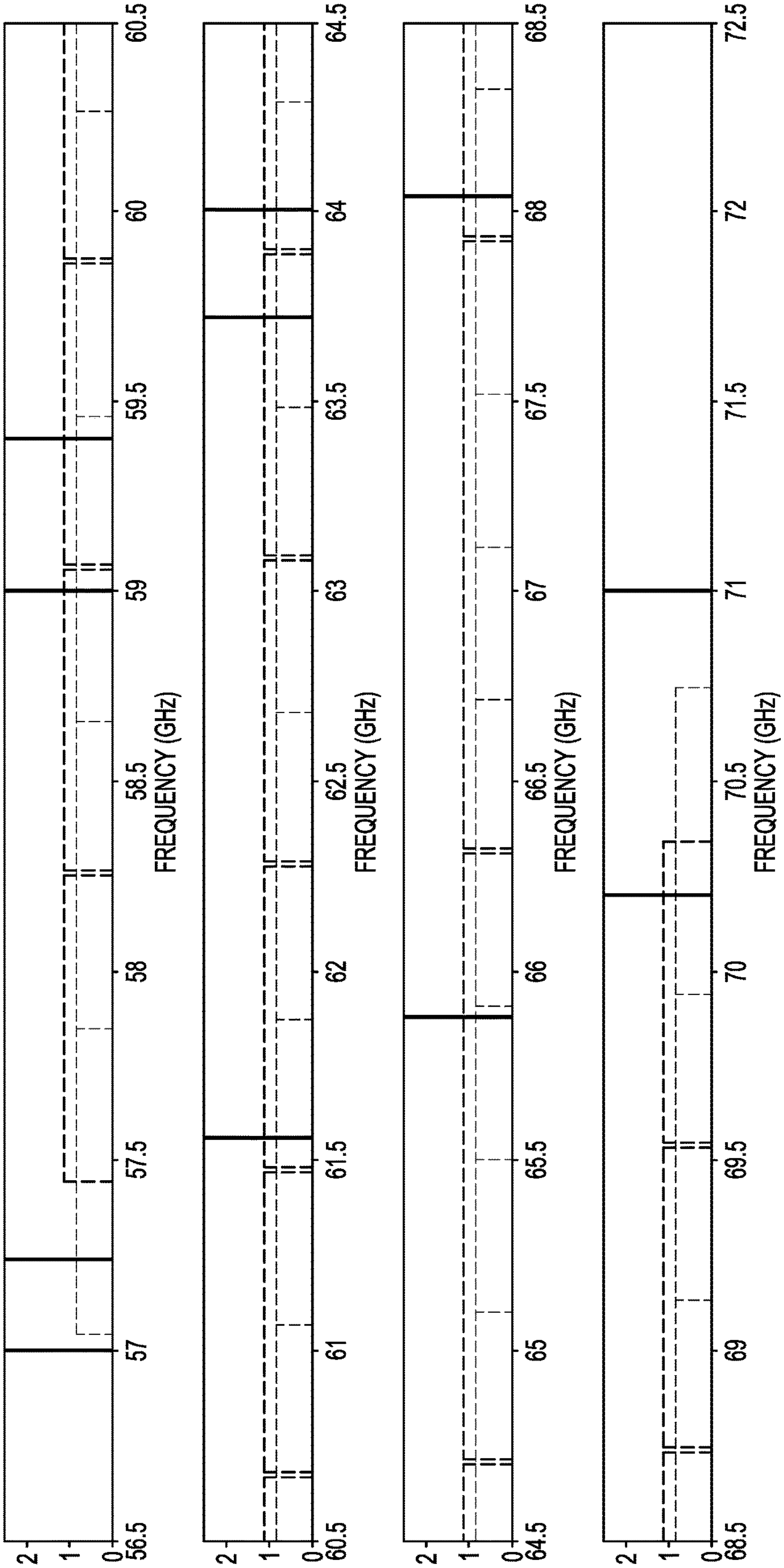
FIG. 9B illustrates supported additional 800 MHz channels for 960 kHz SCS in the 57-71 GHz band which are optimized for co-existence represented by the larger blocks, in accordance with some embodiments.

FIG. 9B illustrates supported additional 800 MHz channels for 960 kHz SCS in the 57-71 GHz band which are optimized for co-existence represented by the larger blocks, in accordance with some embodiments. The smaller blocks represent the CBW of the 400 MHz channel. The selection of the 800 MHz channels is shifted by 403.2 MHz (four 100 MHz channels) to maximize the spectrum utilization in the 59-64 GHz band and to improve coexistence and ensure each 802.11 ad/ay channels can support at least 2 channels of 800 MHz.

Example set of channel raster and SS raster entries in the 57-71 GHz band for 960 kHz SCS, 800 MHz CBW, SU=86% that are shifted by 403.2 MHz is shown in Table 30. The ARFCN and GSCN entries for each of the 800 MHz CBW for 960 kHz SCS can be equivalently expressed as $N_{REF}$={2576683+N*1680*8, N=0, 1, . . . , 15} and GSCN={24192+N*47−floor((N+2)/3), N=0, 1, . . . , 15}, respectively.

TABLE 30

| Data SCS [kHz] | BW [MHz] | NR Chn Raster [kHz] | NR-ARFCN | N_PRB | SS Raster [kHz] | GSCN |
|---|---|---|---|---|---|---|
| 960 | 800 | 57851040 | 2576683 | 60 | 57704160 | 24192 |
| 960 | 800 | 58657440 | 2590123 | 60 | 58499040 | 24238 |
| 960 | 800 | 59463840 | 2603563 | 60 | 59311200 | 24285 |
| 960 | 800 | 60270240 | 2617003 | 60 | 60123360 | 24332 |
| 960 | 800 | 61076640 | 2630443 | 60 | 60918240 | 24378 |
| 960 | 800 | 61883040 | 2643883 | 60 | 61730400 | 24425 |
| 960 | 800 | 62689440 | 2657323 | 60 | 62542560 | 24472 |
| 960 | 800 | 63495840 | 2670763 | 60 | 63337440 | 24518 |
| 960 | 800 | 64302240 | 2684203 | 60 | 64149600 | 24565 |
| 960 | 800 | 65108640 | 2697643 | 60 | 64961760 | 24612 |
| 960 | 800 | 65915040 | 2711083 | 60 | 65756640 | 24658 |
| 960 | 800 | 66721440 | 2724523 | 60 | 66568800 | 24705 |
| 960 | 800 | 67527840 | 2737963 | 60 | 67380960 | 24752 |
| 960 | 800 | 68334240 | 2751403 | 60 | 68175840 | 24798 |
| 960 | 800 | 69140640 | 2764843 | 60 | 68988000 | 24845 |
| 960 | 800 | 69947040 | 2778283 | 60 | 69800160 | 24892 |

Example set of channel raster and SS raster entries in the 57-71 GHz band for 960 kHz SCS, 800 MHz CBW, SU=89% that are shifted by 403.2 MHz is shown in Table 31. The ARFCN and GSCN entries for each of the 800 MHz CBW for 960 kHz SCS can be equivalently expressed as $N_{RFF}$={2576683+N*1680*8, N=0, 1, . . . , 15} and GSCN={24192+N*47−floor((N+2)/3), N=0, 1, . . . , 15}, respectively.

TABLE 31

| Data SCS [kHz] | BW [MHz] | NR Chn Raster [kHz] | NR-ARFCN | N_PRB | SS Raster [kHz] | GSCN |
|---|---|---|---|---|---|---|
| 960 | 800 | 57851040 | 2576683 | 62 | 57704160 | 24192 |
| 960 | 800 | 58657440 | 2590123 | 62 | 58499040 | 24238 |
| 960 | 800 | 59463840 | 2603563 | 62 | 59311200 | 24285 |
| 960 | 800 | 60270240 | 2617003 | 62 | 60123360 | 24332 |
| 960 | 800 | 61076640 | 2630443 | 62 | 60918240 | 24378 |
| 960 | 800 | 61883040 | 2643883 | 62 | 61730400 | 24425 |
| 960 | 800 | 62689440 | 2657323 | 62 | 62542560 | 24472 |
| 960 | 800 | 63495840 | 2670763 | 62 | 63337440 | 24518 |
| 960 | 800 | 64302240 | 2684203 | 62 | 64149600 | 24565 |
| 960 | 800 | 65108640 | 2697643 | 62 | 64961760 | 24612 |
| 960 | 800 | 65915040 | 2711083 | 62 | 65756640 | 24658 |
| 960 | 800 | 66721440 | 2724523 | 62 | 66568800 | 24705 |
| 960 | 800 | 67527840 | 2737963 | 62 | 67380960 | 24752 |
| 960 | 800 | 68334240 | 2751403 | 62 | 68175840 | 24798 |
| 960 | 800 | 69140640 | 2764843 | 62 | 68988000 | 24845 |
| 960 | 800 | 69947040 | 2778283 | 62 | 69800160 | 24892 |

960 kHz SCS, 1600 MHz CBW

Figure 10A:
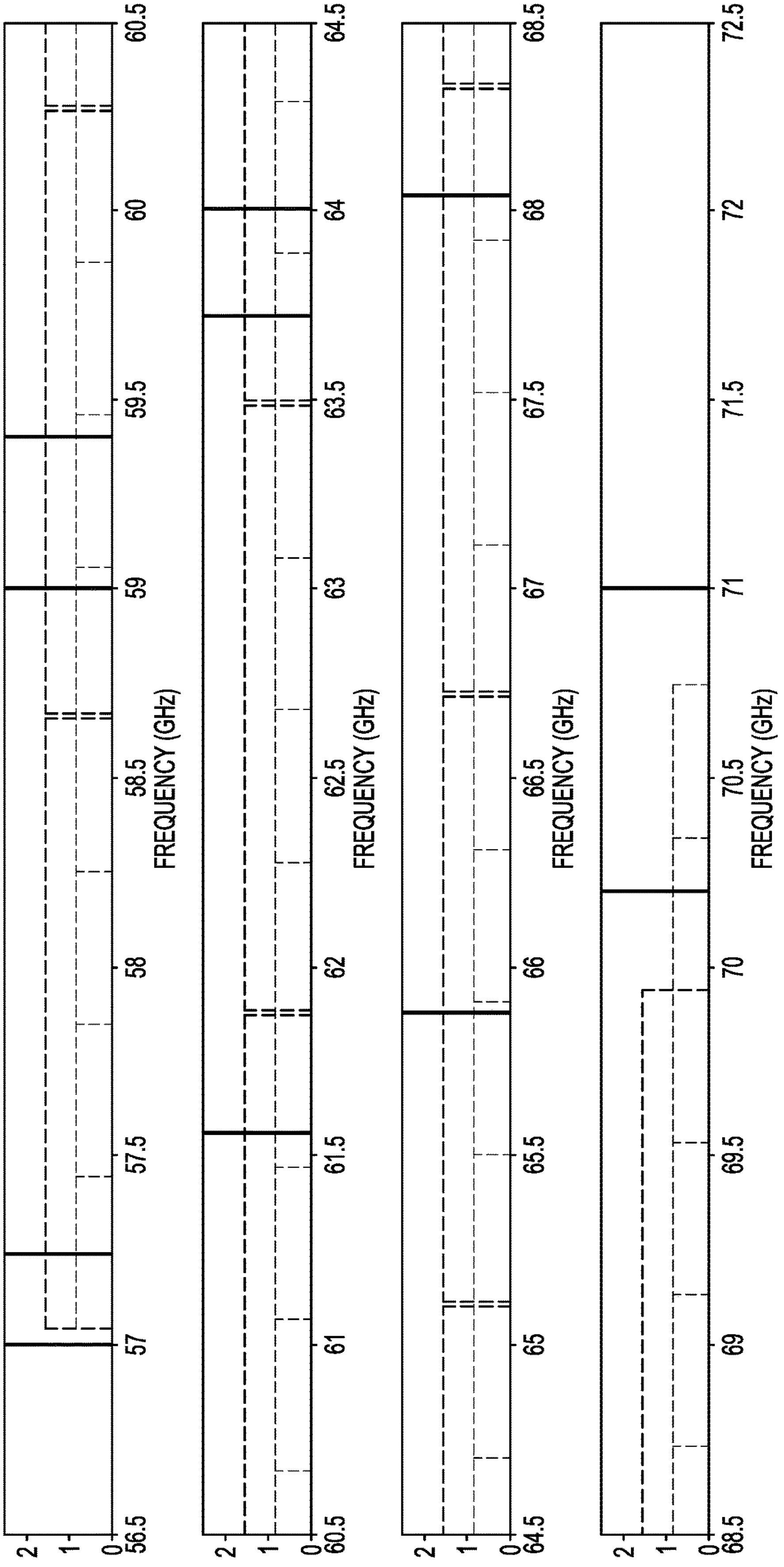
FIG. 10A illustrates supported 1600 MHz channels for 960 kHz SCS in the 57-71 GHz band which are optimized for spectrum utilization, in accordance with some embodiments.

FIG. 10A illustrates supported 1600 MHz channels for 960 kHz SCS in the 57-71 GHz band which are optimized for spectrum utilization, in accordance with some embodiments. The large block represents the CBW of the 1600 MHz channel consisting of four 400 MHz channels. 8 channels of 1600 MHz can be accommodated in the 57-71 GHz spectrum.

Example set of channel raster and SS raster entries in the 57-71 GHz band for 960 kHz SCS, 1600 MHz CBW, SU=86% is shown in Table 32. The ARFCN and GSCN entries for each of the 1600 MHz CBW for 960 kHz SCS can be equivalently expressed as $N_{REF}$={2576683+N*1680*16, N=0, 1, . . . , 7} and GSCN={24168+N*93+floor((N+2)/3), N=0, 1, . . . , 7}, respectively.

TABLE 32

| Data SCS [kHz] | BW [MHz] | NR Chn Raster [kHz] | NR-ARFCN | N_PRB | SS Raster [kHz] | GSCN |
|---|---|---|---|---|---|---|
| 960 | 1600 | 57851040 | 2576683 | 120 | 57289440 | 24168 |
| 960 | 1600 | 59463840 | 2603563 | 120 | 58913760 | 24262 |
| 960 | 1600 | 61076640 | 2630443 | 120 | 60520800 | 24355 |
| 960 | 1600 | 62689440 | 2657323 | 120 | 62127840 | 24448 |
| 960 | 1600 | 64302240 | 2684203 | 120 | 63752160 | 24542 |
| 960 | 1600 | 65915040 | 2711083 | 120 | 65359200 | 24635 |
| 960 | 1600 | 67527840 | 2737963 | 120 | 66966240 | 24728 |
| 960 | 1600 | 69140640 | 2764843 | 120 | 68590560 | 24822 |

Example set of channel raster and SS raster entries in the 57-71 GHz band for 960 kHz SCS, 1600 MHz CBW, SU=89% is shown in Table 33. The ARFCN and GSCN entries for each of the 1600 MHz CBW for 960 kHz SCS can be equivalently expressed as $N_{REF}$={2576683+N*1680*16, N=0, 1, . . . , 7} and GSCN={24168+N*93+floor((N+2)/3), N=0, 1, . . . , 7}, respectively.

TABLE 33

| Data SCS [kHz] | BW [MHz] | NR Chn Raster [kHz] | NR-ARFCN | N_PRB | SS Raster [kHz] | GSCN |
|---|---|---|---|---|---|---|
| 960 | 1600 | 57851040 | 2576683 | 124 | 57289440 | 24168 |
| 960 | 1600 | 59463840 | 2603563 | 124 | 58913760 | 24262 |
| 960 | 1600 | 61076640 | 2630443 | 124 | 60520800 | 24355 |
| 960 | 1600 | 62689440 | 2657323 | 124 | 62127840 | 24448 |
| 960 | 1600 | 64302240 | 2684203 | 124 | 63752160 | 24542 |
| 960 | 1600 | 65915040 | 2711083 | 124 | 65359200 | 24635 |
| 960 | 1600 | 67527840 | 2737963 | 124 | 66966240 | 24728 |
| 960 | 1600 | 69140640 | 2764843 | 124 | 68590560 | 24822 |

Figure 10B:
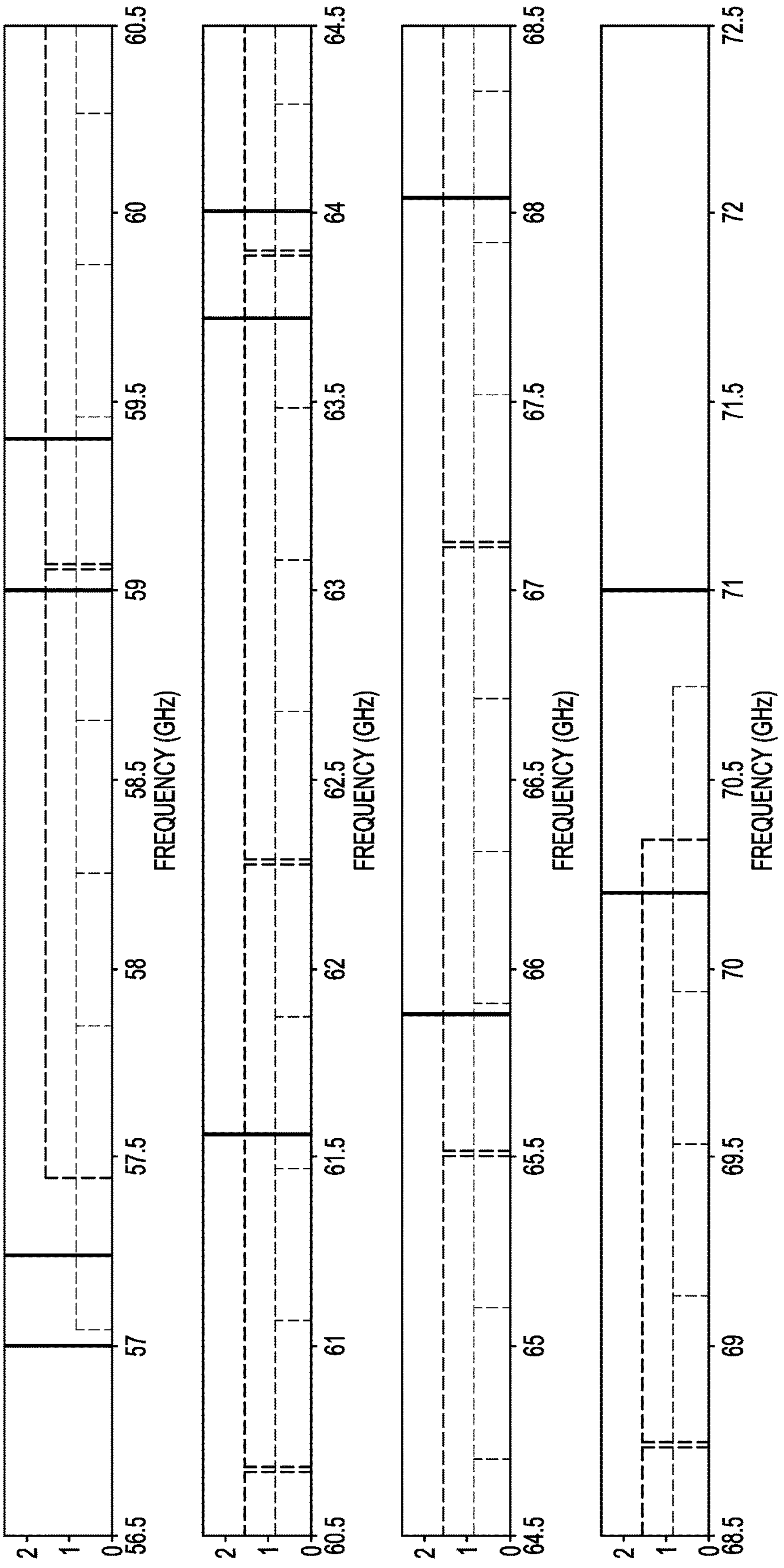
FIG. 10B illustrates supported 1600 MHz channels for 960 kHz SCS in the 57-71 GHz band which are optimized for coexistence, in accordance with some embodiments.

FIG. 10B illustrates supported 1600 MHz channels for 960 kHz SCS in the 57-71 GHz band which are optimized for coexistence, in accordance with some embodiments. The large, dashed block represents the CBW of the 1600 MHz channel consisting of four 400 MHz channels. The selection of the 1600 MHz channels is shifted by 403.2 MHz (four 100 MHz channels) to maximize the spectrum utilization in the 57-71 GHz band and the 59-64 GHz band. 8 channels of 1600 MHz can be accommodated in the 57-71 GHz spectrum and 3 channels of 1600 MHz in the 59-64 GHz band.

Example set of channel raster and SS raster entries in the 57-71 GHz band for 960 kHz SCS, 1600 MHz CBW, SU=86% that is shifted by 403.2 MHz is shown in Table 34. The ARFCN and GSCN entries for each of the 1600 MHz CBW for 480 kHz SCS can be equivalently expressed as $N_{REF}$={2583403+N*1680*16, N=0, 1, . . . , 7} and GSCN={24192+N*93+floor((N)/3), N=0, 1, . . . , 7}, respectively.

TABLE 34

| Data SCS [kHz] | BW [MHz] | NR Chn Raster [kHz] | NR-ARFCN | N_PRB | SS Raster [kHz] | GSCN |
|---|---|---|---|---|---|---|
| 960 | 1600 | 58254240 | 2583403 | 120 | 57704160 | 24192 |
| 960 | 1600 | 59867040 | 2610283 | 120 | 59311200 | 24285 |
| 960 | 1600 | 61479840 | 2637163 | 120 | 60918240 | 24378 |
| 960 | 1600 | 63092640 | 2664043 | 120 | 62542560 | 24472 |
| 960 | 1600 | 64705440 | 2690923 | 120 | 64149600 | 24565 |
| 960 | 1600 | 66318240 | 2717803 | 120 | 65756640 | 24658 |
| 960 | 1600 | 67931040 | 2744683 | 120 | 67380960 | 24752 |
| 960 | 1600 | 69543840 | 2771563 | 120 | 68988000 | 24845 |

Example set of channel raster and SS raster entries in the 57-71 GHz band for 960 kHz SCS, 1600 MHz CBW, SU=89% that is shifted by 403.2 MHz is shown in Table 35. The ARFCN and GSCN entries for each of the 1600 MHz CBW for 480 kHz SCS can be equivalently expressed as $N_{REF}$={2583403+N*1680*16, N=0, 1, . . . , 7} and GSCN={24192+N*93+floor((N)/3), N=0, 1, . . . , 7}, respectively.

TABLE 35

| Data SCS [kHz] | BW [MHz] | NR Chn Raster [kHz] | NR-ARFCN | N_PRB | SS Raster [kHz] | GSCN |
|---|---|---|---|---|---|---|
| 960 | 1600 | 58254240 | 2583403 | 124 | 57704160 | 24192 |
| 960 | 1600 | 59867040 | 2610283 | 124 | 59311200 | 24285 |
| 960 | 1600 | 61479840 | 2637163 | 124 | 60918240 | 24378 |
| 960 | 1600 | 63092640 | 2664043 | 124 | 62542560 | 24472 |
| 960 | 1600 | 64705440 | 2690923 | 124 | 64149600 | 24565 |
| 960 | 1600 | 66318240 | 2717803 | 124 | 65756640 | 24658 |
| 960 | 1600 | 67931040 | 2744683 | 124 | 67380960 | 24752 |
| 960 | 1600 | 69543840 | 2771563 | 124 | 68988000 | 24845 |

Figure 10C:
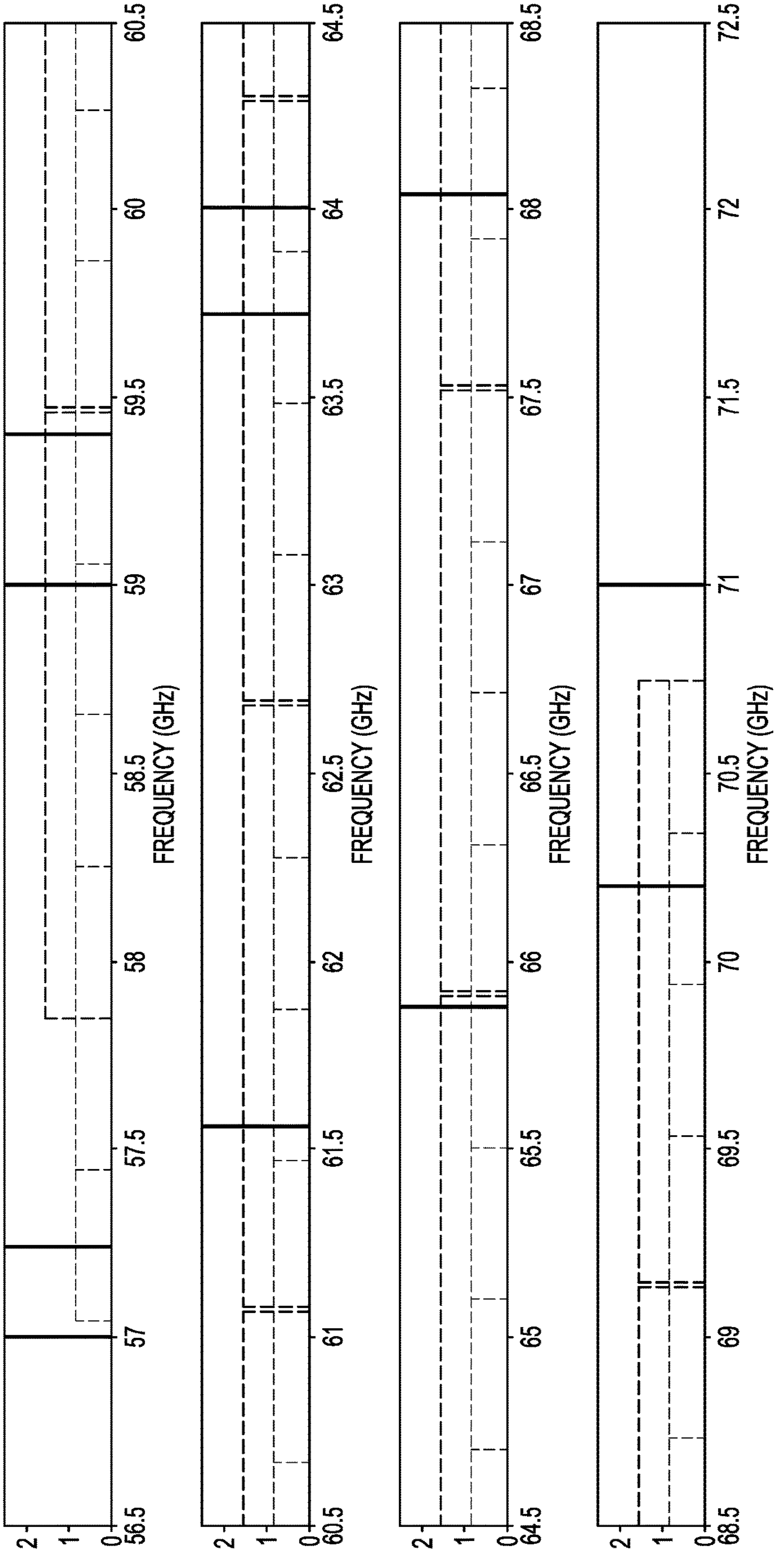
FIG. 10C illustrates supported additional 1600 MHz channels for 960 kHz SCS in the 57-71 GHz band which are optimized for coexistence represented by the larger blocks, in accordance with some embodiments.

FIG. 10C illustrates supported additional 1600 MHz channels for 960 kHz SCS in the 57-71 GHz band which are optimized for coexistence represented by the larger blocks, in accordance with some embodiments. The smaller blocks represent the CBW of the 400 MHz channel. The selection of the 1600 MHz channels is shifted by 806.4 MHz (eight 100 MHz channels) to maximize the spectrum utilization in the 57-71 GHz band and the 59-64 GHz band.

Example set of channel raster and SS raster entries in the 57-71 GHz band for 960 kHz SCS, 1600 MHz CBW, SU=86% that is shifted by 806.4 MHz is shown in Table 36. The ARFCN and GSCN entries for each of the 1600 MHz CBW for 960 kHz SCS can be equivalently expressed as $N_{REF}$={2590123+N*1680*16, N=0, 1, . . . , 7} and GSCN={24215+N*93+floor((N+1)/3), N=0, 1, . . . , 7}, respectively.

TABLE 36

| Data SCS [kHz] | BW [MHz] | NR Chn Raster [kHz] | NR-ARFCN | N_PRB | SS Raster [kHz] | GSCN |
|---|---|---|---|---|---|---|
| 960 | 1600 | 58657440 | 2590123 | 120 | 58101600 | 24215 |
| 960 | 1600 | 60270240 | 2617003 | 120 | 59708640 | 24308 |
| 960 | 1600 | 61883040 | 2643883 | 120 | 61332960 | 24402 |
| 960 | 1600 | 63495840 | 2670763 | 120 | 62940000 | 24495 |
| 960 | 1600 | 65108640 | 2697643 | 120 | 64547040 | 24588 |
| 960 | 1600 | 66721440 | 2724523 | 120 | 66171360 | 24682 |
| 960 | 1600 | 68334240 | 2751403 | 120 | 67778400 | 24775 |
| 960 | 1600 | 69947040 | 2778283 | 120 | 69385440 | 24868 |

Example set of channel raster and SS raster entries in the 57-71 GHz band for 960 kHz SCS, 1600 MHz CBW, SU=89% that is shifted by 806.4 MHz is shown in Table 37. The ARFCN and GSCN entries for each of the 1600 MHz CBW for 960 kHz SCS can be equivalently expressed as $N_{REF}$={2590123+N*1680*16, N=0, 1, . . . , 7} and GSCN={24215+N*93+floor((N+1)/3), N=0, 1, . . . , 7},

TABLE 37

| Data SCS [kHz] | BW [MHz] | NR Chn Raster [kHz] | NR-ARFCN | N_PRB | SS Raster [kHz] | GSCN |
|---|---|---|---|---|---|---|
| 960 | 1600 | 58657440 | 2590123 | 124 | 58101600 | 24215 |
| 960 | 1600 | 60270240 | 2617003 | 124 | 59708640 | 24308 |
| 960 | 1600 | 61883040 | 2643883 | 124 | 61332960 | 24402 |

TABLE 37-continued

| Data SCS [kHz] | BW [MHz] | NR Chn Raster [kHz] | NR-ARFCN | N_PRB | SS Raster [kHz] | GSCN |
|---|---|---|---|---|---|---|
| 960 | 1600 | 63495840 | 2670763 | 124 | 62940000 | 24495 |
| 960 | 1600 | 65108640 | 2697643 | 124 | 64547040 | 24588 |
| 960 | 1600 | 66721440 | 2724523 | 124 | 66171360 | 24682 |
| 960 | 1600 | 68334240 | 2751403 | 124 | 67778400 | 24775 |
| 960 | 1600 | 69947040 | 2778283 | 124 | 69385440 | 24868 |

960 kHz SCS, 2000 MHz CBW

Figure 11:
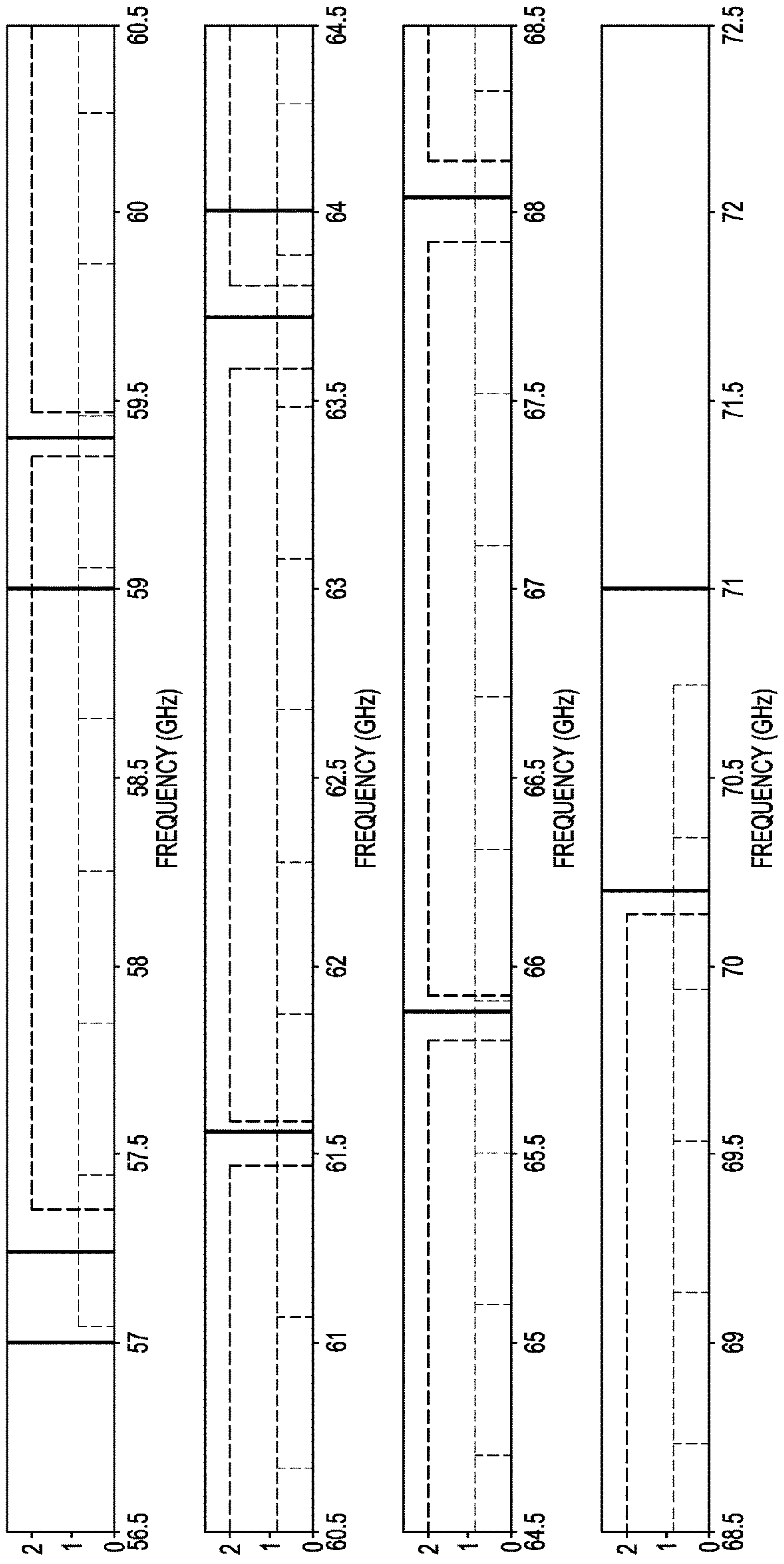
FIG. 11 illustrates supported 2000 MHz channels for 960 kHz SCS in the 57-71 GHz band which are optimized for coexistence, in accordance with some embodiments.

FIG. 11 illustrates supported 2000 MHz channels for 960 kHz SCS in the 57-71 GHz band which are optimized for coexistence, in accordance with some embodiments. The large, dotted block represents the CBW of the 2000 MHz channel consisting of five 400 MHz channels.

Example set of channel raster and SS raster entries in the 57-71 GHz band for 960 kHz SCS, 2000 MHz CBW, SU=86%

TABLE 38

| Data SCS [kHz] | BW [MHz] | NR Chn Raster [kHz] | NR-ARFCN | N_PRB | SS Raster [kHz] | GSCN |
|---|---|---|---|---|---|---|
| 960 | 2000 | 58355040 | 2585083 | 150 | 57704160 | 24192 |
| 960 | 2000 | 60471840 | 2620363 | 150 | 60123360 | 24332 |
| 960 | 2000 | 62588640 | 2655643 | 150 | 62127840 | 24448 |
| 960 | 2000 | 64806240 | 2692603 | 150 | 64149600 | 24565 |
| 960 | 2000 | 66923040 | 2727883 | 150 | 66568800 | 24705 |
| 960 | 2000 | 69140640 | 2764843 | 150 | 68590560 | 24822 |

Example set of channel raster and SS raster entries in the 57-71 GHz band for 960 kHz SCS, 2000 MHz CBW, SU=89%

TABLE 39

| Data SCS [kHz] | BW [MHz] | NR Chn Raster [kHz] | NR-ARFCN | N_PRB | SS Raster [kHz] | GSCN |
|---|---|---|---|---|---|---|
| 960 | 2000 | 58355040 | 2585083 | 155 | 57704160 | 24192 |
| 960 | 2000 | 60471840 | 2620363 | 155 | 60123360 | 24332 |
| 960 | 2000 | 62588640 | 2655643 | 155 | 62127840 | 24448 |
| 960 | 2000 | 64705440 | 2690923 | 155 | 64149600 | 24565 |
| 960 | 2000 | 66923040 | 2727883 | 155 | 66568800 | 24705 |
| 960 | 2000 | 69140640 | 2764843 | 155 | 68590560 | 24822 |

FIGS. 3, 4, 5, 6-A, 6B, 7A, 7B, 7C, 8, 9A, 9B, 9C, 10A, 10B, 11 illustrate the potential channel positions for 100 MHz, 200 MHz, 400 MHz, 800 MHz, 1600 MHz, and 2000 MHz.

The applicable ARFCN for 100 MHz channel bandwidth are NREF={2564083+1680*N, N=0:137}. The applicable ARFCN for 400 MHz channel bandwidth are NREF={2566603+1680*N*4, N=0:33}.

The applicable ARFCN for 800 MHz channel bandwidth are NREF={2569963+1680*$N_1$*8, $N_1$=0:16; 2576683+1680*$N_2$*8, $N_2$=0: 15}. The applicable ARFCN for 1600 MHz channel bandwidth are NREF={2576683+N*1680*16, 2583403+N*1680*16, 2590123+N*1680*16, N=0:7} The applicable ARFCN for 2000 MHz channel bandwidth are NREF={2585083, 2620363, 2655643, 2692603, 2727883, 2764843}. The applicable GSCN for 120 kHz are GSCN={24157+N*6−floor((N+4)/6, N=0: 137}. The applicable GSCN for 480 kHz are GSCN={24168+N*23+floor((N+2)/3), N=0:33}. The applicable GSCN for 960 kHz are GSCN={24168+N*23+floor ((N+2)/3), N=0:33}.

Alternative applicable GSCN for 120 kHz are GSCN={24156+6*N−3*floor((N+4)/18), N=0:137} Alternative applicable GSCN for 480 kHz are GSCN={24162+N*24−12*floor((N+4)/18), N=0:33} or {24162+N*24−12*(floor((N−14)/18)+1), N=0:33}

TABLE 40

| Number of raster entries between 57-71 GHz | | | | | |
|---|---|---|---|---|---|
| | CBW | | | | |
| SCS | 100 MHz | 400 MHz | 800 MHz | 1600 MHz | 2000 MHz |
| 120 kHz | 138 | 34 | N/A | N/A | N/A |
| 480 kHz | N/A | | 33 | 24 | N/A |
| 960 kHz | N/A | | | | 6 |

These embodiments are designed such that all the sync raster entries are a subset of the sync raster defined for 120 kHz SCS and 100 MHz CBW. Also, within a particular SCS, the sync raster for the higher CBW is a subset of the sync raster for the lowest CBW. For example, for 480 kHz SCS, the sync raster entries for 800 MHz are a subset of the sync raster for 400 MHz. With the ARFCN reference values for channel and GSCN values for synchronization signal disclosed herein, the total number of raster entries for initial access is equal to 172, where 138 entries are from 120 kHz and 34 entries are from 480 kHz.

With the ARFCN reference values and GSCN values disclosed herein, the required RB offset between CORESET #0 and synchronization signal block (SSB) using multiplexing pattern 1 are as follows:

For 120 kHz subcarrier spacing (SCS)
- with 24 or 96 RBs, the RB offset between CORESET #0 and SSB is 0,
- and with 48 RBs, the RB offset between CORESET #0 and SSB is 14.
- For 480 and 960 kHz SCS
- With 24, 48, or 96 RBs, the RB offset between CORESET #0 and SSB is 0.

With the ARFCN reference values and GSCN values disclosed herein, the required RB offset between CORESET #0 and SSB using for multiplexing pattern 3 is either −20 or −21, depending on $k_{SSB}$ parameter.

Proposal 2—Floating Raster

In some alternate embodiments, we have non-overlapping 100 MHz channel bandwidth (CBW) defined for channelization of 100 MHz. Next, 400 MHz, 800 MHz, 1600 MHz, and 2000 MHz CBWs were selected by choosing the center frequency of contiguous shifted channels of 100 MHz CBW. The wider bandwidth channels can be shifted in units of 100.80 MHz, 201.6 MHz, or 403.2 MHz.

In one embodiment, the applicable ARFCN for 100 MHz channel bandwidth are NREF={$N_1$+1680*N}, where N=0: 137. $N_1$ is the starting ARFCN value of the 100 MHz channel bandwidth within the unlicensed band. One example of starting ARFCN is $N_1$=2564083.

For wider bandwidths, such as 400 MHz, 800 MHz, 1600 MHz, and 2000 MHz, the applicable ARFCN are given as follows:

- For 400 MHz CBW, applicable ARFCN values are $N_{REF}$={$N_2$+1680*N}, where N=0:M:134. One example of starting ARFCN is $N_2$=$N_1$+1680×1.5=$N_1$+2520.
- The applicable ARFCN for 800 MHz channel bandwidth are $N_{REF}$={$N_3$+1680*N}, where N=0:M:130. One example of starting ARFCN is $N_3$=$N_1$+1680×3.5=$N_1$+5880.

The applicable ARFCN for 1600 MHz channel bandwidth are $N_{REF}$={$N_4$+1680*N}, where N=0:M:122. One example of starting ARFCN is $N_4$=$N_1$+1680×7.5=$N_1$+12600.

The applicable ARFCN for 2000 MHz channel bandwidth are $N_{REF}$={N5+1680*N}, where N=0:M:118. One example of starting ARFCN is $N_5$=$N_1$+1680×9.5=$N_1$+15960.

The value range enumeration 0:M:134, refers to series of numbers starting from 0 and taking every M values until 134. For example, 0:1:10 refers to {0,1,2,3,4,5,6,7,8,9,10} and 0:2:10 refers to {0,2,4,6,8,10}. The value of M in the above ARFCN value refer the channel bandwidth shifting unit of the wider channel bandwidth. For example, M=1 provides collection of ARFCN values for 400 MHz, 800 MHz, 1600 MHz, and 2000 MHz CBW all shifted in units of 100.8 MHz, M=2 provides collection of ARFCN values for 400 MHz, 800 MHz, 1600 MHz, and 2000 MHz CBW all shifted in units of 201.6 MHz, and M=4 provides collection of ARFCN values for 400 MHz, 800 MHz, 1600 MHz, and 2000 MHz CBW all shifted in units of 403.2 MHz.

The allowed GSCN values for 120 kHz, when ARFCN values of 100 MHz CBW are $N_{REF}$={$N_1$+1680*N}, with $N_1$=2564083 and N={0, 1, . . . }, are GSCN={24157+6*N−floor((N−2)/6)−1} with N={0:M:137}.

Proposal 2 Option 1 (Optimized to Minimize the RB Offset)

In order to generally achieve RB offset between CORESET #0 and SSB of 0 for the majority of the cases, synchronization raster was chosen such that SSB are selected closest to the center of each 100 MHz channel bandwidth (CBW). These selected synchronization raster entries are chosen as valid entries for 120 kHz. From the subset of synchronization raster entries (selected for each 100 MHz CBW), the first raster instance among valid SSB candidate positions within the 400 MHz CBW were selected for valid synchronization raster for 480 kHz.

The allowed GSCN values for 480 kHz, when ARFCN values of 100 MHz CBW are NREF={$N_1$+1680*N}, with $N_1$=2564083 and N={0:M:134}, are GSCN={24163+6*N−floor((N−1)/6)−1} with N={0:M:134}. These GSCN values are a sub-set of GSCN value for 120 kHz with GSCN={24157+6*N−floor((N−2)/6)−1} formulation.

In summary Proposal 2 option 1 suggest the following combination of ARFCN and GSCN values.

- ARFCN values
  - for 100 MHz CBW are NREF={$N_1$+1680*N},
  - for 400 MHz CBW are NREF={$N_1$+1680*1.5+1680*N},
  - for 800 MHz CBW are NREF={$N_1$+1680*3.5+1680*N},
  - for 1600 MHz CBW are NREF={$N_1$+1680*7.5+1680*N},
  - for 2000 MHz CBW are NREF={$N_1$+1680*9.5+1680*N},
  - with $N_1$=2564083
- GSCN values
  - For 120 kHz are GSCN={24157+6*N−floor((N−2)/6)−1},
  - For 480 kHz are GSCN={24163+6*N−floor((N−1)/6)−1}.

With such ARFCN and GSCN value combination, we can derive the required RB offset between CORESET #0 and SSB for various RB sizes for multiplexing pattern 1 and 3. The following two tables 41 and 42 provide RB offset between CORESET #0 and SSB with proposal 2 option 1 ARFCN and GSCN value combinations.

TABLE 41

Set of resource blocks and slot symbols of CORESET for Type0-PDCCH search space set when {SS/PBCH block, PDCCH} SCS is {120, 120} kHz for FR2-2

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 48 | 1 | 14 |
| 2 | 1 | 48 | 2 | 14 |
| 3 | 1 | 96 | 1 | 0 |
| 4 | 1 | 96 | 2 | 0 |
| 5 | 3 | 24 | 2 | −20 if k_ssb = 0<br>−21 if k_ssb > 0 |
| 6 | 3 | 48 | 2 | −20 if k_ssb = 0<br>−21 if k_ssb > 0 |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |

TABLE 42

Set of resource blocks and slot symbols of CORESET for Type0-PDCCH search space set when {SS/PBCH block, PDCCH} SCS is {480, 480} and {960, 960} kHz for FR2-2

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 48 | 1 | 0 |
| 2 | 1 | 48 | 2 | 0 |
| 3 | 1 | 96 | 1 | 0 |
| 4 | 1 | 96 | 2 | 0 |
| 5 | 3 | 24 | 2 | −20 if k_ssb = 0<br>−21 if k_ssb > 0 |
| 6 | 3 | 48 | 2 | −20 if k_ssb = 0<br>−21 if k_ssb > 0 |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |

When Proposal 2 option 1 utilized with wider channel bandwidths being shifted in units of multiple of 100.8 MHz (approximately 100 MHz), tables 43, 44 and 45 show the total number of channel entries for each SCS and CBW combination.

TABLE 43

Number of channel entries for each SCS and CBW combination when Proposal 2 option 1 with wider bandwidth shifts in unit of 100.8 MHz (M = 1) is utilized

| | CBW | | | | |
|---|---|---|---|---|---|
| SCS | 100 MHz | 400 MHz | 800 MHz | 1600 MHz | 2000 MHz |
| 120 kHz | 138 | 135 | N/A | N/A | N/A |
| 480 kHz | N/A | | 131 | 123 | N/A |
| 960 kHz | N/A | | | | 119 |

TABLE 44

Number of channel entries for each SCS and CBW combination when Proposal 2 option 1 with wider bandwidth shifts in unit of 201.6 MHz (M = 2) is utilized

| | CBW | | | | |
|---|---|---|---|---|---|
| SCS | 100 MHz | 400 MHz | 800 MHz | 1600 MHz | 2000 MHz |
| 120 kHz | 138 | 68 | N/A | N/A | N/A |
| 480 kHz | N/A | | 66 | 62 | N/A |
| 960 kHz | N/A | | | | 60 |

TABLE 45

Number of channel entries for each SCS and CBW combination when Proposal 2 option 1 with wider bandwidth shifts in unit of 403.2 MHz (M = 4) is utilized.

| | CBW | | | | |
|---|---|---|---|---|---|
| SCS | 100 MHz | 400 MHz | 800 MHz | 1600 MHz | 2000 MHz |
| 120 kHz | 138 | 34 | N/A | N/A | N/A |
| 480 kHz | N/A | | 33 | 31 | N/A |
| 960 kHz | N/A | | | | 30 |

Proposal 2 Option 2 (Optimized to Minimize the GSCN Entries)

Instead of selecting the first sync raster instance for each NR channel raster (as in Proposal 2 option 1). The same sync raster of lower CBW can be reused as much as possible for multiple wider CBW raster entries. This will minimize the total number of GSCN entries but may result in needing to additional RB offsets between CORESET #0 and SSB While the applicable ARFCN values for Proposal 2 option 1 and option 2 would be identical and applicable GSCN values for 120 kHz for Proposal 2 option 1 and option 2 would be identical, the allowed GSCN values for 480 kHz are different. For Proposal 2 option 2, fewer number of entries are needed for 480 kHz SSB.

The allowed GSCN values for 480 kHz, when ARFCN values of 100 MHz CBW are NREF={$N_1$+1680*N}, with $N_1$=2564083 and N={0:134}, are GSCN={24163+12*N−floor((N−1)/3)−1} with N={0:67}. These GSCN values are a sub-set of GSCN value for 120 kHz with GSCN={24157+6*N−floor((N−2)/6)−1} formulation.

In summary Proposal 2 option 2 suggest the following combination of ARFCN and GSCN values.

ARFCN values for 100 MHz CBW are NREF={$N_1$+1680*N}, for 400 MHz CBW are NREF={$N_1$+1680*1.5+1680*N}, for 800 MHz CBW are NREF={$N_1$+1680*3.5+1680*N}, for 1600 MHz CBW are NREF={$N_1$+1680*7.5+1680*N}, for 2000 MHz CBW are NREF={$N_1$+1680*9.5+1680*N}, with $N_1$=2564083.

GSCN values

For 120 kHz are GSCN={24157+6*N−floor((N−2)/6)−1},

For 480 kHz are GSCN={24163+12*N−floor((N−1)/3)−1}.

With such ARFCN and GSCN value combination, we can derive the required RB offset between CORESET #0 and SSB for various RB sizes for multiplexing pattern 1 and 3. The following two tables 46 and 47 provide RB offset between CORESET #0 and SSB with proposal 2 option 2 ARFCN and GSCN value combinations. It should be noted that it may be possible to use a subset of the entries listed for table 46 and 47.

TABLE 46

Set of resource blocks and slot symbols of CORESET for Type0-PDCCH search space set when {SS/PBCH block, PDCCH} SCS is {120, 120} kHz for FR2-2

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 48 | 1 | 0 |
| 3 | 1 | 48 | 2 | 0 |
| 4 | 1 | 48 | 1 | 14 |
| 5 | 1 | 48 | 2 | 14 |
| 6 | 1 | 48 | 1 | 28 |
| 7 | 1 | 48 | 2 | 28 |
| 8 | 1 | 96 | 1 | 0 |
| 9 | 1 | 96 | 2 | 0 |
| 10 | 1 | 96 | 1 | 76 |
| 11 | 1 | 96 | 2 | 76 |
| 12 | 3 | 24 | 2 | −20 if k_ssb = 0 −21 if k_ssb > 0 |
| 13 | 3 | 24 | 2 | 24 |
| 14 | 3 | 48 | 2 | −20 if k_ssb = 0 −21 if k_ssb > 0 |
| 15 | 3 | 48 | 2 | 48 |

TABLE 47

Set of resource blocks and slot symbols of CORESET for Type0-PDCCH search space set when {SS/PBCH block, PDCCH} SCS is {480, 480} kHz or {960, 960} kHz for FR2-2

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 48 | 1 | 0 |
| 2 | 1 | 48 | 2 | 0 |
| 3 | 1 | 48 | 1 | 14 |
| 4 | 1 | 48 | 2 | 14 |
| 5 | 1 | 48 | 1 | 28 |
| 6 | 1 | 48 | 2 | 28 |
| 7 | 1 | 96 | 2 | 0 |
| 8 | 1 | 96 | 2 | 38 |
| 9 | 1 | 96 | 2 | 76 |
| 10 | 3 | 24 | 2 | −20 if k_ssb = 0 −21 if k_ssb > 0 |

TABLE 47-continued

Set of resource blocks and slot symbols of CORESET for Type0-PDCCH search space set when {SS/PBCH block, PDCCH} SCS is {480, 480} kHz or {960, 960} kHz for FR2-2

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 11 | 3 | 24 | 2 | 24 |
| 12 | 3 | 48 | 2 | −20 if k_ssb = 0 −21 if k_ssb > 0 |
| 13 | 3 | 48 | 2 | 48 |
| 14 | | | | |
| 15 | | | | |

Alternatively, if the allowed GSCN values for 480 kHz, when ARFCN values of 100 MHz CBW are NREF={$N_1$+1680*N1, with $N_1$=2564083 and N=10:1341, are GSCN=1 24168+12*N−floor((N)/3)} with N=10:671. This results in ARFCN and GSCN value combinations as follows:

ARFCN values
- for 100 MHz CBW are NREF={$N_1$+1680*N},
- for 400 MHz CBW are NREF={$N_1$+1680*1.5+1680*N},
- for 800 MHz CBW are NREF={$N_1$+1680*3.5+1680*N},
- for 1600 MHz CBW are NREF={$N_1$+1680*7.5+1680*N},
- for 2000 MHz CBW are NREF={$N_1$+1680*9.5+1680*N},
- with $N_1$=2564083.

GSCN values
- For 120 kHz are GSCN={24157+6*N−floor((N−2)/6)−1},
- For 480 kHz are GSCN={24168+12*N−floor((N)/3)}.

With such ARFCN and GSCN value combination, we can derive the required RB offset between CORESET #0 and SSB for various RB sizes for multiplexing pattern 1 and 3. The following two tables 48 and 49 provide RB offset between CORESET #0 and SSB with proposal 2 option 2 ARFCN and GSCN value combinations. It should be noted that it may be possible to use a subset of the entries listed for tables 48 and 49.

TABLE 48

Set of resource blocks and slot symbols of CORESET for Type0-PDCCH search space set when {SS/PBCH block, PDCCH} SCS is {120, 120} kHz for FR2-2

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 48 | 1 | 0 |
| 3 | 1 | 48 | 2 | 0 |
| 4 | 1 | 48 | 1 | 14 |
| 5 | 1 | 48 | 2 | 14 |
| 6 | 1 | 48 | 1 | 28 |
| 7 | 1 | 48 | 2 | 28 |
| 8 | 1 | 96 | 1 | 0 |
| 9 | 1 | 96 | 2 | 0 |
| 10 | 1 | 96 | 1 | 76 |
| 11 | 1 | 96 | 2 | 76 |
| 12 | 3 | 24 | 2 | −20 if k_ssb = 0 −21 if k_ssb > 0 |

TABLE 48-continued

Set of resource blocks and slot symbols of CORESET for Type0-PDCCH search space set when {SS/PBCH block, PDCCH} SCS is {120, 120} kHz for FR2-2

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 13 | 3 | 24 | 2 | 24 |
| 14 | 3 | 48 | 2 | −20 if k_ssb = 0 −21 if k_ssb > 0 |
| 15 | 3 | 48 | 2 | 48 |

TABLE 49

Set of resource blocks and slot symbols of CORESET for Type0-PDCCH search space set when {SS/PBCH block, PDCCH} SCS is {480, 480} kHz or {960, 960} kHz for FR2-2.

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 48 | 1 | 0 |
| 2 | 1 | 48 | 2 | 0 |
| 3 | 1 | 48 | 1 | 14 |
| 4 | 1 | 48 | 2 | 14 |
| 5 | 1 | 48 | 1 | A value between {15~27}, for example 26 |
| 6 | 1 | 48 | 2 | A value between {15~27}, for example 26 |
| 7 | 1 | 48 | 1 | 28 |
| 8 | 1 | 48 | 2 | 28 |
| 9 | 1 | 96 | 2 | 0 |
| 10 | 1 | 96 | 2 | 38 |
| 11 | 1 | 96 | 2 | 76 |
| 12 | 3 | 24 | 2 | −20 if k_ssb = 0 −21 if k_ssb > 0 |
| 13 | 3 | 24 | 2 | 24 |
| 14 | 3 | 48 | 2 | −20 if k_ssb = 0 −21 if k_ssb > 0 |
| 15 | 3 | 48 | 2 | 48 |

TABLE 50

Alternate Set of resource blocks and slot symbols of CORESET for Type0-PDCCH search space set when {SS/PBCH block, PDCCH} SCS is {480, 480} kHz or {960, 960} kHz for FR2-2.

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 48 | 1 | 0 |
| 2 | 1 | 48 | 2 | 0 |
| 3 | 1 | 48 | 1 | 2 |
| 4 | 1 | 48 | 2 | 2 |
| 5 | 1 | 48 | 1 | 14 |
| 6 | 1 | 48 | 2 | 14 |
| 7 | 1 | 48 | 1 | 26 |

TABLE 50-continued

Alternate Set of resource blocks and slot symbols of CORESET for Type0-PDCCH search space set when {SS/PBCH block, PDCCH} SCS is {480, 480} kHz or {960, 960} kHz for FR2-2.

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 8 | 1 | 48 | 2 | 26 |
| 9 | 1 | 96 | 2 | 0 |
| 10 | 1 | 96 | 2 | 38 |
| 11 | 1 | 96 | 2 | 76 |
| 12 | 3 | 24 | 2 | −20 if k_ssb = 0 −21 if k_ssb > 0 |
| 13 | 3 | 24 | 2 | 24 |
| 14 | 3 | 48 | 2 | −20 if k_ssb = 0 −21 if k_ssb > 0 |
| 15 | 3 | 48 | 2 | 48 |

TABLE 51

Set of resource blocks and slot symbols of CORESET for Type0-PDCCH search space set when {SS/PBCH block, PDCCH} SCS is {120, 120} kHz for FR2-2.

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 48 | 1 | 0 |
| 2 | 1 | 48 | 1 | 14 |
| 3 | 1 | 48 | 1 | 28 |
| 4 | 1 | 48 | 2 | 0 |
| 5 | 1 | 48 | 2 | 14 |
| 6 | 1 | 48 | 2 | 28 |
| 7 | 1 | 96 | 1 | 0 |
| 8 | 1 | 96 | 2 | 0 |
| 9 | 3 | 24 | 2 | −20 if k_ssb = 0 −21 if k_ssb > 0 |
| 10 | 3 | 48 | 2 | −20 if k_ssb = 0 −21 if k_ssb > 0 |
| 11 | | | | |
| 12 | | | | |
| 13 | | | | |
| 14 | | | | |
| 15 | | | | |

TABLE 52

Set of resource blocks and slot symbols of CORESET for Type0-PDCCH search space set when {SS/PBCH block, PDCCH} SCS is {480, 480} kHz for FR2-2.

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 48 | 1 | 0 |
| 2 | 1 | 48 | 1 | 14 |
| 3 | 1 | 48 | 1 | 28 |
| 4 | 1 | 48 | 2 | 0 |
| 5 | 1 | 48 | 2 | 14 |
| 6 | 1 | 48 | 2 | 28 |
| 7 | 1 | 96 | 1 | 0 |
| 8 | 1 | 96 | 1 | 38 |

TABLE 52-continued

Set of resource blocks and slot symbols of CORESET for Type0-PDCCH search space set when {SS/PBCH block, PDCCH} SCS is {480, 480} kHz for FR2-2.

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 9 | 1 | 96 | 2 | 0 |
| 10 | 1 | 96 | 2 | 38 |
| 11 | 3 | 24 | 2 | −20 if k_ssb = 0 −21 if k_ssb > 0 |
| 12 | 3 | 48 | 2 | −20 if k_ssb = 0 −21 if k_ssb > 0 |
| 13 | | | | |
| 14 | | | | |
| 15 | | | | |

TABLE 53

Set of resource blocks and slot symbols of CORESET for Type0-PDCCH search space set when {SS/PBCH block, PDCCH} SCS is {960, 960} kHz for FR2-2.

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 48 | 1 | 0 |
| 3 | 1 | 48 | 2 | 0 |
| 4 | 1 | 96 | 1 | 0 |
| 5 | 1 | 96 | 2 | 0 |
| 6 | 3 | 24 | 2 | −20 if k_ssb = 0 −21 if k_ssb > 0 |
| 7 | 3 | 48 | 2 | −20 if k_ssb = 0 −21 if k_ssb > 0 |
| 8 | | | | |
| 9 | | | | |
| 10 | | | | |
| 11 | | | | |
| 12 | | | | |
| 13 | | | | |
| 14 | | | | |
| 15 | | | | |

Alternate GSCN Entries for Unlicensed and Licensed Operation

To provide deployment flexibility for licensed operation, we can assume the GSCN entries for 120 kHz SSB are sub-sampled by 3 such that adjacent valid GSCN entries are spaced apart by 3×17.28 MHz=51.84 MHz. In this case, we can define valid GSCN entries for unlicensed operation as:

For 120 kHz are GSCN={$N_A$+6*N−3*floor((N+NB)/18)}, where N is integer value (0, 1, . . . , 137), $N_A$ and $N_B$ (a value between 0-17) are constant parameters selected such that valid GSCN entries can exist for the given channelization positions (such as those presented above). This results in GSCN pattern periodicity of 105×17.28 MHz.

The above equation can be equivalently expressed as {$N_A$+6*N−3*(floor((N−$N_{B'}$)/18)+1)}, where $N_{B'}$=18−$N_B$ For 480 kHz are GSCN={$N_C$+12*N}, where N is integer value (0, 1, . . . , 68), $N_C$ is a constant parameter selected such that valid GSCN entries can exist for the given channelization positions (such as those shown above). Alternatively, GSCN for 480 kHz can be also GSCN={$N_D$+24*N−12*floor((N+$N_E$)/18)} or equivalently GSCN={$N_D$+24*N−12*(floor((N−$N_F$)/18)+1)}, where N is integer value (0, 1, . . . , 33), where $N_F$=18−$N_E$.

Some potential values for $N_A$ and $N_B$ are

{$N_A$=24156 and $N_B$=5} or {$N_A$=24156 and $N_B$=4} or {$N_A$=24156 and $N_B$=3} or {$N_A$=24157 and $N_B$=11} or {$N_A$=24157 and $N_B$=10} or {$N_A$=24157 and $N_B$=9} or {$N_A$=24158 and $N_B$=17} or {$N_A$=24158 and $N_B$=16} or {$N_A$=24158 and $N_B$=15}

Some potential values for $N_C$ are any value from 24159 to 24172.

Some potential values for $N_D$ and $N_E$ are

{$N_D$=24160 and $N_E$=−1} or {$N_D$=24160 and $N_E$=0} or {$N_D$=24160 and $N_E$=1}

{$N_D$=24161 and $N_E$=1} or {$N_D$=24161 and $N_E$=2} or {$N_D$=24161 and $N_E$=3}

{$N_D$=24162 and $N_E$=2} or {$N_D$=24162 and $N_E$=3} or {$N_D$=24162 and $N_E$=4}

{$N_D$=24163 and $N_E$=4} or {$N_D$=24163 and $N_E$=5} or {$N_D$=24163 and $N_E$=6}

Figure 12:
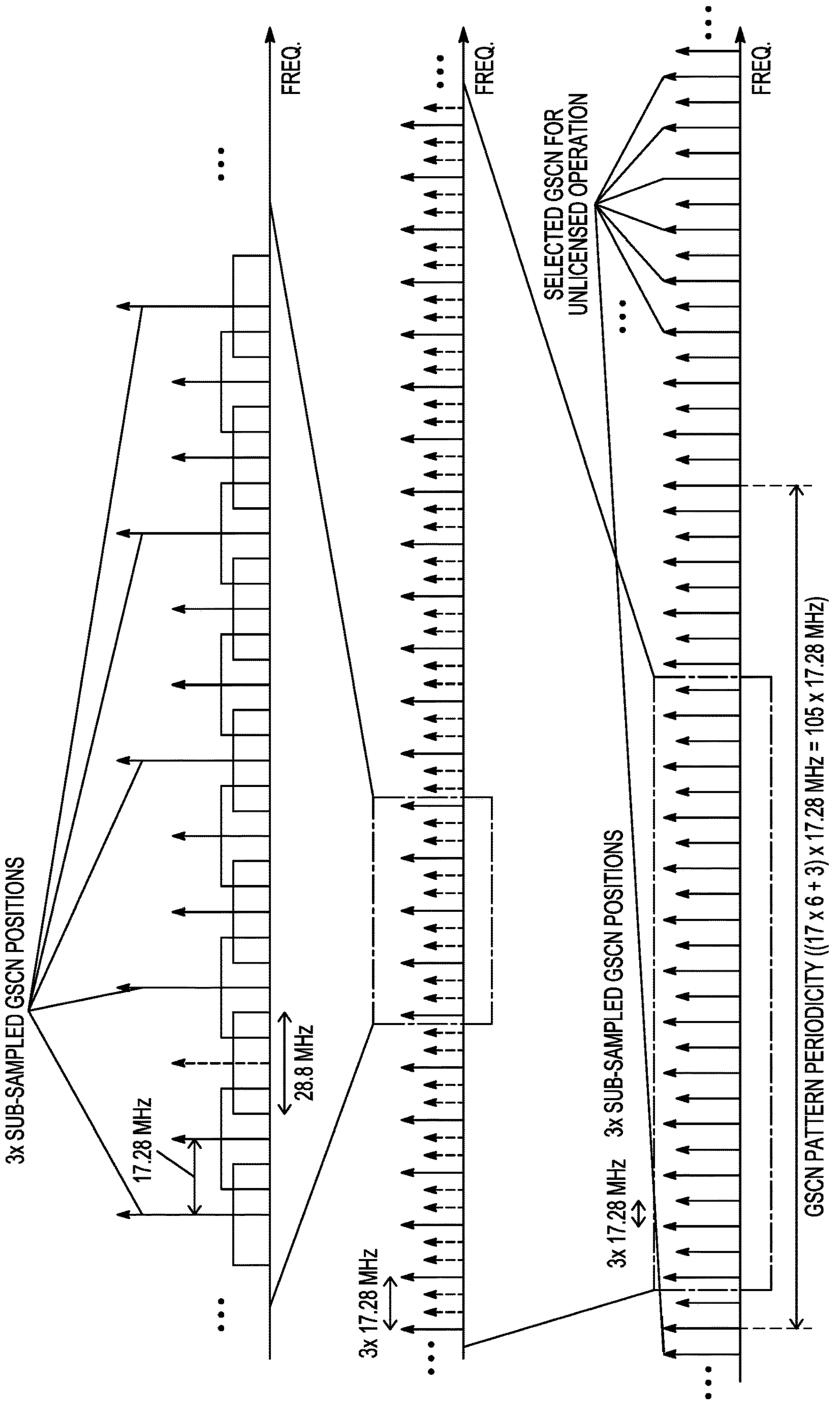
FIG. 12 shows an illustration of some alternate GSCN entries for unlicensed operation, in accordance with some embodiments.

FIG. 12 shows an illustration of alternate GSCN entries for unlicensed operation, in accordance with some embodiments. The top illustration of FIG. 12 shows the potential GSCN entries with 17.28 MHz gap between entries. From the potential GSCN entries every $3^{rd}$ entries are selected as candidates for 120 kHz synchronization signal available for licensed operation. Among the selected candidates for licensed operation, GSCN candidates for unlicensed are further subsampled from the potential licensed operation such that 17 candidate entries have frequency gap of 6×17.28 MHz and 1 candidate has a frequency gap of 3×17.28 MHz within GSCN pattern periodicity of 105×17.28 MHz.

Figure 13:
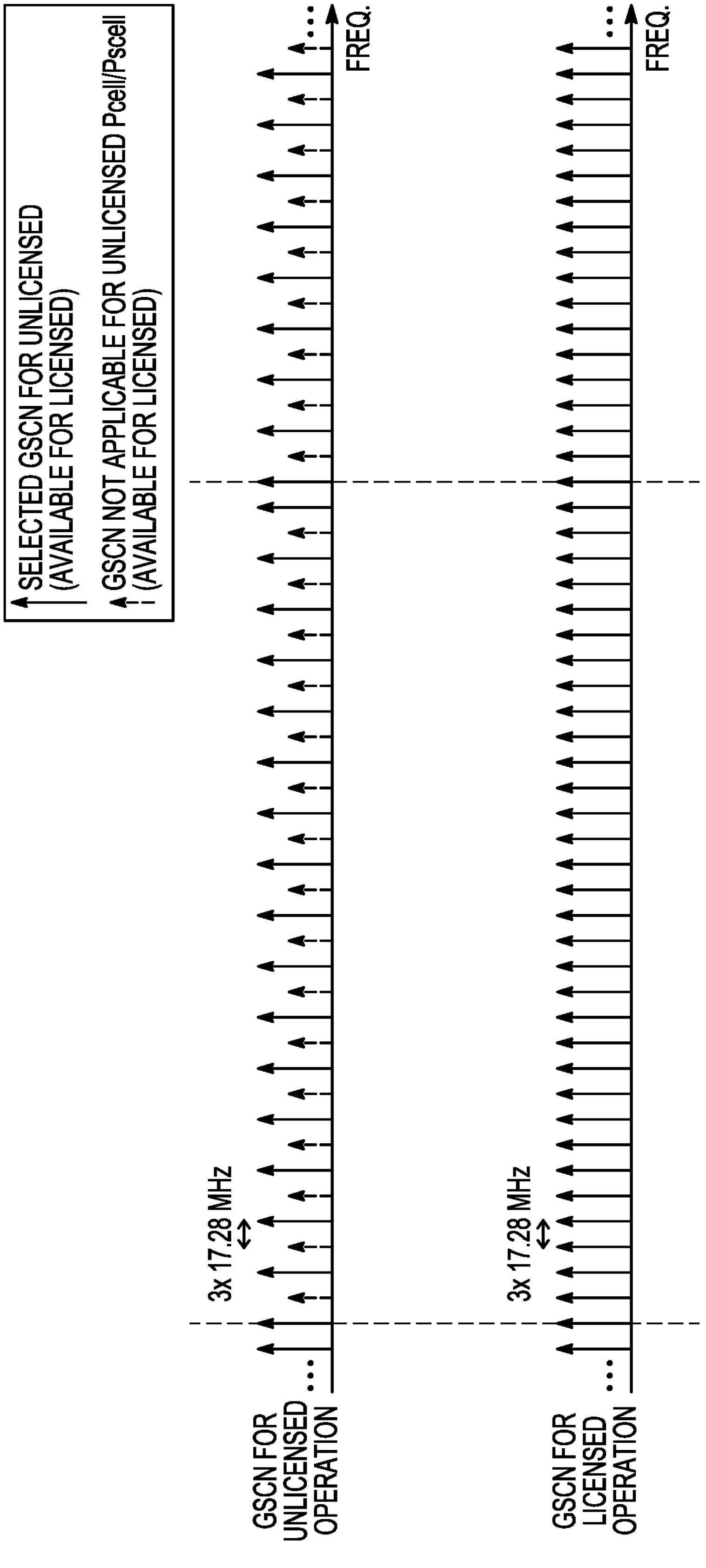
FIG. 13 illustrates potential valid GSCN entries for unlicensed operation and licensed operation where unlicensed operation is a strict sub-set of licensed operation GSCN entries, in accordance with some embodiments.

As further variations of GSCN entries for licensed and unlicensed operation, if we assume licensed operation will use 3× sub-sampled GSCN entries, and unlicensed operation will use pattern of {6,6,6,6,6, 6,6,6,6,6, 6,6,6,6,6, 6,6, 3} gaps (or a re-ordered version of the pattern gap) between selected GSCN entries within a periodicity of 105×17.28 MHz, then it is possible to make sure the GSCN entries selected for unlicensed is strictly a sub-set of GSCN entries selected for licensed and that those GSCN are overlapping. This is illustrated in FIG. 13. FIG. 13 illustrates potential valid GSCN entries for unlicensed operation and licensed operation where unlicensed operation is a strict sub-set of licensed operation GSCN entries, in accordance with some embodiments.

Figure 14:
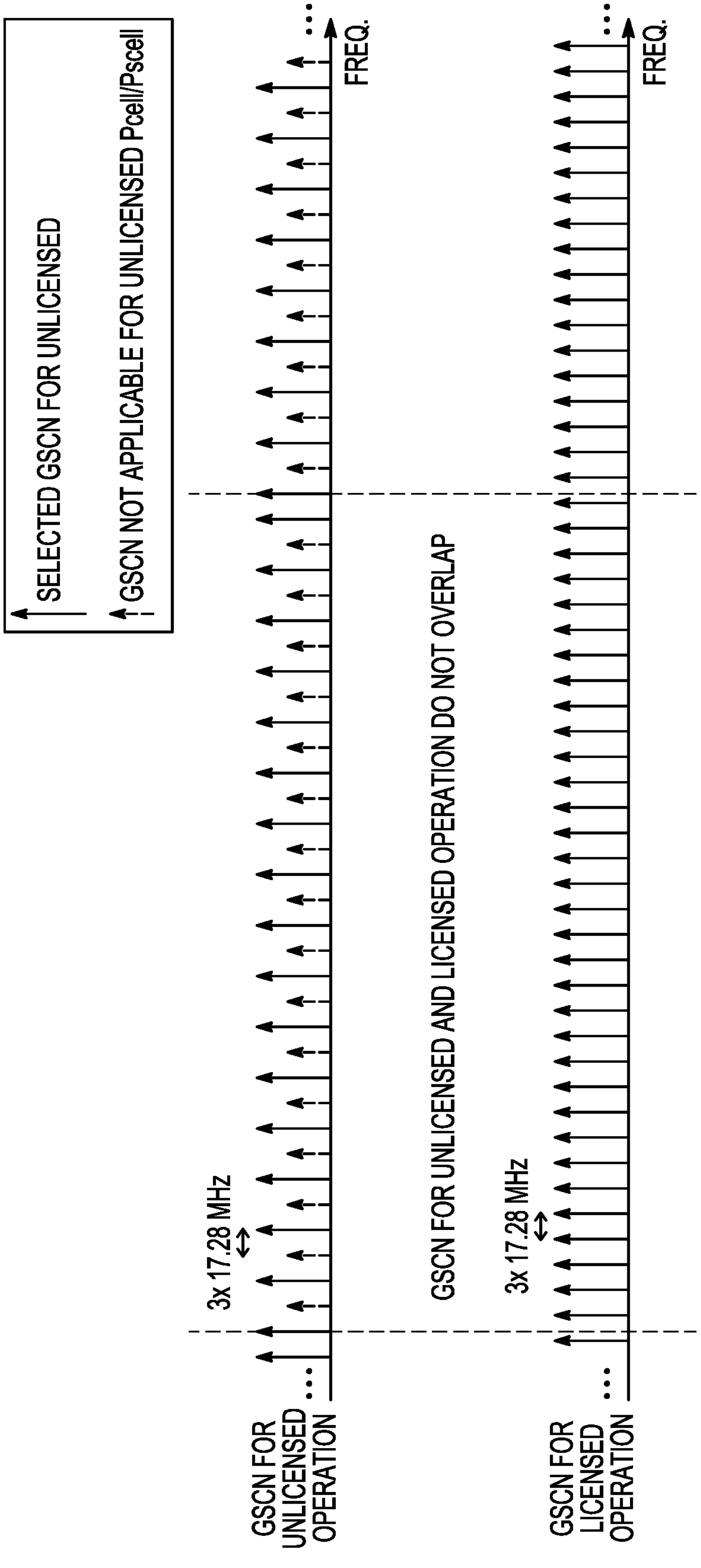
FIG. 14 illustrates potential valid GSCN entries for unlicensed operation and licensed operation where unlicensed operation GSCN and licensed operation GSCN do not overlap, in accordance with some embodiments.

It is also possible to define strictly non-overlapping GSCN entries by using the same GSCN selection pattern for unlicensed operation and using shifted version of the 3× subsampled GSCN pattern for licensed. An example of such case is illustrated in FIG. 14. In this case, the GSCN entries for licensed and unlicensed will not overlap. FIG. 14 illustrates potential valid GSCN entries for unlicensed operation and licensed operation where unlicensed operation GSCN and licensed operation GSCN do not overlap, in accordance with some embodiments.

Figure 15:
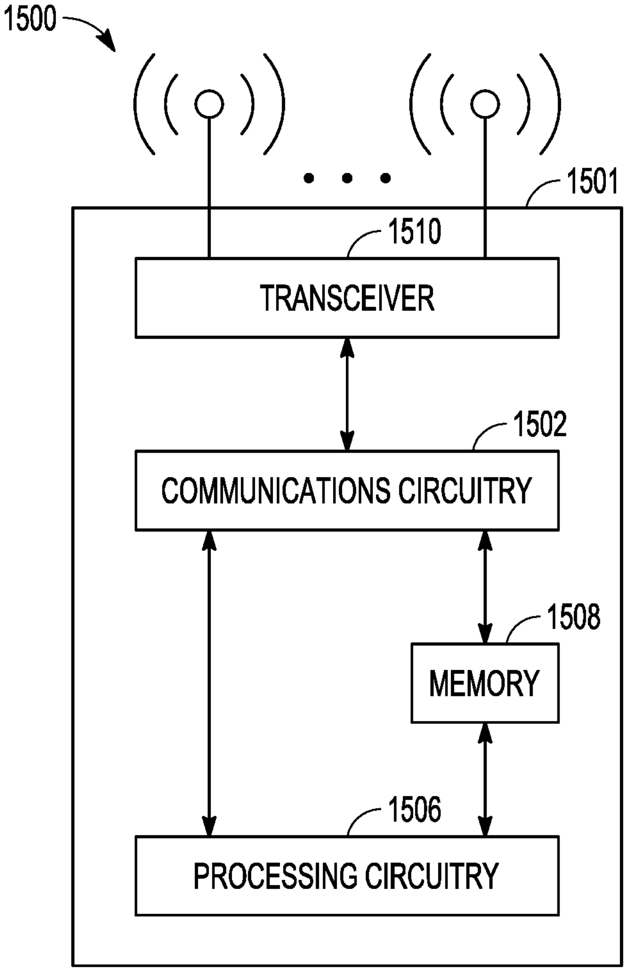
FIG. 15 illustrates a functional block diagram of a wireless communication device, in accordance with some embodiments.

FIG. 15 illustrates a functional block diagram of a wireless communication device, in accordance with some embodiments. Wireless communication device 1500 may be suitable for use as a UE or gNB configured for operation in a 5G NR network. The communication device 1500 may include communications circuitry 1502 and a transceiver 1510 for transmitting and receiving signals to and from other communication devices using one or more antennas 1501. The communications circuitry 1502 may include circuitry that can operate the physical layer (PHY) communications and/or medium access control (MAC) communications for controlling access to the wireless medium, and/or any other communications layers for transmitting and receiving signals. The communication device 1500 may also include processing circuitry 1506 and memory 1508 arranged to perform the operations described herein. In some embodiments, the communications circuitry 1502 and the processing circuitry 1506 may be configured to perform operations detailed in the above figures, diagrams, and flows.

In accordance with some embodiments, the communications circuitry 1502 may be arranged to contend for a wireless medium and configure frames or packets for communicating over the wireless medium. The communications circuitry 1502 may be arranged to transmit and receive signals. The communications circuitry 1502 may also include circuitry for modulation/demodulation, upconversion/downconversion, filtering, amplification, etc. In some embodiments, the processing circuitry 1506 of the communication device 1500 may include one or more processors. In other embodiments, two or more antennas 1501 may be coupled to the communications circuitry 1502 arranged for sending and receiving signals. The memory 1508 may store information for configuring the processing circuitry 1506 to perform operations for configuring and transmitting message frames and performing the various operations described herein. The memory 1508 may include any type of memory, including non-transitory memory, for storing information in a form readable by a machine (e.g., a computer). For example, the memory 1508 may include a computer-readable storage device, read-only memory (ROM), random-access memory (RAM), magnetic disk storage media, optical storage media, flash-memory devices and other storage devices and media.

In some embodiments, the communication device 1500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 1500 may include one or more antennas 1501. The antennas 1501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 1500 may include one or more of a keyboard, a display, a non-volatile memory port, multiple antennas, a graphics processor, an application processor, speakers, and other mobile device elements. The display may be an LCD screen including a touch screen.

Although the communication device 1500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 1500 may refer to one or more processes operating on one or more processing elements.

Some embodiments are directed to a user equipment (UE) configured for operating in a fifth-generation (5G) new radio (NR) system. In these embodiments, the UE may search for a 5G NR cell at Synchronization Signal (SS) block frequency positions associated with synchronization signal (SS) raster values. The UE may also detect a Synchronization Signal Block (SSB) at one of the SS block frequency positions. In these embodiments, the UE may also determine a cell ID of the 5G NR cell based on synchronization signals of the detected SSB, and decode a physical broadcast channel (PBCH) of the detected SSB based on the cell ID. In these embodiments, the UE may also derive a cell reference frequency corresponding to a NR Absolute Radio Frequency Channel Number (NR ARFCN) value for the 5G NR cell from system information including a channel bandwidth. In these embodiments, for frequency-range two (FR2) operating band n263, the frequency positions associated with the SS raster values are based on one or more Global Synchronization Channel Number (GSCN) values. In these embodiments, the GSCN values comprise 24156+6*N−3*floor((N+5)/18) where N=0:137, for a 120 KHz subcarrier spacing (SCS), 24162+24*N−12*floor((N+4)/18) where N=0:33, for a 480 KHz SCS, and 24162 to 24954 with a step size of six for a 960 kHz SCS. In some embodiments, the UE may store information for determining the SSB frequency positions. These embodiments as well as others are discussed in more detail below.

In these embodiments, the notation N=0:137 indicates that N can take values from 0 to 137 in increments of 1 and the notation N=0:33 indicates that N can take values ranging from 0 to 33 in increments of 1. In these embodiments, 138 SS raster values are used for the 120 kHz SCS (i.e. N=0 to N=137), 34 SS raster values are used the 480 KHz SCS (i.e., N=0 to N=33), and 133 SS raster values are used for the 960 kHz SCS (i.e. ((24954−24162)/6)+1). Since the UE does not know the SCS used by the cell, the raster values for each of the SCSs may be used.

In some embodiments, the UE may be configured to connect the UE with the 5G NR cell using the cell reference frequency. In these embodiments, the FR2 operating band n263 comprises unlicensed spectrum from 57 GHz to 71 GHz, and the SSB frequency positions comprise only (i.e., are restricted to) frequency positions within the FR2 operating band n263. In these embodiments, when the UE is not connected with a cell (i.e., at least not connected with a cell that can be used as anchor cell for carrier aggregation or dual connectivity), the UE uses the GSCN values to obtain the start frequency location of the SSB. On the other hand, when the UE has a connection to an anchor cell (at least for carrier aggregation or dual connectivity), the UE does not need to use the GSCN values to obtain the start frequency location of the SSB or the cell reference frequency since that information is provided by the anchor cell, including (direct and explicit) frequency location of SSB, (direct and explicit) starting frequency value of the (occupied) channel, and channel bandwidth.

In some embodiments, an SSB frequency position for each SS raster value comprises 24250.08 MHz+M*17.28 MHz, where M is a GSCN raster value minus the value 22256. In these embodiments, the frequency position for each SS raster value for operating band n263 will be within the range of 57 GHz to 71 GHz. In these embodiments, the UE only would need to search 138 SSB frequency positions for the 120 kHz SCS, 34 SSB frequency positions for the 480 kHz SCS and 133 SSB frequency positions for the 960 kHz SCS. This is unlike conventional systems that may have up to 4384 (N=0 to N=4383) SS block positions from 24.250 GHz to 100 GHz for each SCS.

In some embodiments, the information for determining the SSB frequency positions comprises at least one of: the GSCN values for the FR2 operating band n263, the raster values for the FR2 operating band n263 for each SCS (i.e., 120, 480 and 960 kHz) and the SSB frequency positions for the FR2 operating band n263. In some embodiments, for the FR2 operating band n263 (and for the 120 kHz SCS, the 480 kHz SCS and/or the 960 kHz SCS), the cell reference frequency corresponds to one of a plurality of NR ARFCN values comprising one of: 2564083+1680*N for N=0:137, when the channel bandwidth is 100 MHz, 2566603+6720*N for N=0:33, when the channel bandwidth is 400 MHz, 2569963+6720*N for N=0:32, when the channel bandwidth is 800 MHz, 2576683+6720*N for N=0:30 when the channel bandwidth is 1600 MHz, and 2580043+6720*N for N=0:29, and 2585083, 2655643, 2692603, 2764843, when the channel bandwidth is 2000 MHz.

In some embodiments, the cell reference frequency is based on an RF reference frequency ($F_{REF}$) on a channel raster that is determined from the following equation:

$$F_{REF} = F_{REF\text{-}Offs} + \Delta F_{Global}(N_{REF} - N_{REF\text{-}Offs}),$$

where $F_{REF\text{-}Offs}$ is 24250.08 MHz, $N_{REF\text{-}Offs}$ is 2016667, $N_{REF}$ is the NR ARFCN value, and $\Delta F_{Global}$ is 60 kHz.

In these embodiments, the cell reference frequency is restricted to frequencies of the FR2 operating band n263 comprising frequencies from 57 GHz to 71 GHz. In these embodiments, the RF reference frequency is used in signalling to identify the position of RF channels, SS blocks and other elements. The channel raster defines a subset of RF reference frequencies that can be used to identify the RF channel position in the uplink and downlink. The RF reference frequency for an RF channel maps to a resource element on the carrier. For each operating band, a subset of frequencies from the global frequency raster are applicable for that band and forms a channel raster with a granularity $\Delta F_{Rast}$er, which may be equal to or larger than $\Delta F_{Global}$.

In some embodiments, to identify an RF channel position associated with the cell reference frequency, the UE may be configured to determine a resource element on a carrier using the RF reference frequency ($F_{REF}$) based on a channel raster to resource element mapping.

In some embodiments, the UE may be configured to determine the channel bandwidth and the SCS from a system information block 1 (SIB1) for the 5G NR cell. In these embodiments, for the 120 kHz SCS, the UE may be configured to use one of the 100 MHz and 400 MHz channel bandwidths. In these embodiments, for the 480 kHz SCS, the UE may be configured to use one of the 400, 800 and 1600 MHz channel bandwidths. In these embodiments, for the 960 kHz SCS, the UE may be configured to use one of the 400, 800, 1600 and 2000 MHz channel bandwidths.

In some embodiments, based on the system information, the UE may be configured to perform a random access (RACH) procedure with the 5G NR cell by transmission of a RACH preamble on the carrier. In these embodiments, a SS block SCS of one of 120 kHz and 480 kHz is used for initial access. In these embodiments, the UE may be configured to refrain from using a SS Block SCS of 960 kHz for initial access (i.e., SS Block with a SCS of 960 kHz are not used for initial access). In these embodiments, a SS Block SCS of 960 kHz is not used for initial access. In some embodiments, since the FR2 operating band n263 comprises unlicensed spectrum, the UE may be configured to perform a listen-before-talk (LBT) process performed before transmitting the PRACH, depending on the regulatory domain. In these embodiments, the SIB1 may indicate whether the UE is to perform LBT, although the scope of the embodiments is not limited in this respect.

In some embodiments, the SIB1 may contain system information such as channel bandwidth, a relative offset to indicate the start of the occupied channel from start of SSB, RACH configurations, etc. The PBCH, on the other hand, contains the system frame number and some basic information on how to find and decode the PDCCH and the PDSCH that contains SIB1. In these embodiments, a Type0-PDCCH may schedule the PDSCH that contains SIB1. In these embodiments, the time and frequency locations in which Type0-PDCCH can be transmitted by the Base station is indicated in PBCH contents. This information is used to further decode SIB1. In these embodiments, the PBCH information content may be referred to as the master information block (MIB).

In some embodiments, for an FR2 operating band other than the FR2 operating band n263, a range of the GSCN values may be based on a step size one for the 120 kHz SCS and a step size of two for a 240 kHz SCS, although the scope of the embodiments are not limited in this respect.

Some embodiments are directed to a non-transitory computer-readable storage medium that stores instructions for execution by processing circuitry of a user equipment (UE) configured for operating in a fifth-generation (5G) new radio (NR) system. In these embodiments, the processing circuitry may configure the UE to search for a 5G NR cell at Synchronization Signal (SS) block frequency positions associated with synchronization signal (SS) raster values and detect a Synchronization Signal Block (SSB) at one of the SS block frequency positions. In these embodiments, the processing circuitry may determine a cell ID of the 5G NR cell based on synchronization signals of the detected SSB, and decode a physical broadcast channel (PBCH) of the detected SSB based on the cell ID. The processing circuitry may also derive a cell reference frequency corresponding to a NR Absolute Radio Frequency Channel Number (NR ARFCN) value for the 5G NR cell from system information including a channel bandwidth. In these embodiments, for frequency-range two (FR2) operating band n263, the frequency positions associated with the SS raster values are based on one or more Global Synchronization Channel Number (GSCN) values comprising 24156+6*N−3*floor((N+5)/18) where N=0:137, for a 120 KHz subcarrier spacing (SCS), 24162+24*N−12*floor((N+4)/18) where N=0:33, for a 480 KHz SCS, and 24162 to 24954 with a step size of six for a 960 kHz SCS.

Some embodiments are directed to a gNodeB (gNB) configured for operating in a 5G NR system. In these embodiments, the gNB may encode an Synchronization Signal Block (SSB) for transmission at a Synchronization Signal (SS) block frequency position associated with a Global Synchronization Channel Number (GSCN) value. The SSB may be configured to indicate an cell ID of a 5G NR cell. The SSB may also be encoded to include a physical broadcast channel (PBCH). In these embodiments, the gNB may transmit one or more channels associated with the 5G NR cell at a cell reference frequency. In these embodiments, the cell reference frequency may correspond to a NR Absolute Radio Frequency Channel Number (NR ARFCN) value of the operating channel. In these embodiments, for frequency-range two (FR2) operating band n263, the frequency position associated with one of a plurality of synchronization signal (SS) raster values are based on the GSCN value. In these embodiments, the GSCN value comprises one of: 24156+6*N−3*floor((N+5)/18) where N=0:137, for a 120 KHz subcarrier spacing (SCS), 24162+24*N−12*floor((N+4)/18) where N=0:33, for a 480 KHz SCS, and 24162 to 24954 with a step size of six for a 960 kHz SCS.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operating in a fifth-generation (5G) new radio (NR) system, the apparatus comprising:

processing circuitry; and memory, wherein the processing circuitry is to configure the UE to:

search for a 5G NR cell at Synchronization Signal Block (SSB) frequency positions associated with synchronization signal (SS) raster values; and detect a SSB for the 5G NR cell at one of the SSB frequency positions;

decode system information indicating an operating band for a cell reference frequency for the 5G NR cell corresponding to a NR Absolute Radio Frequency Channel Number (NR ARFCN) value for the 5G NR cell , wherein for frequency-range two (FR2) operating band n263, the SSB frequency positions associated with the SS raster values are based on one or more Global Synchronization Channel Number (GSCN) values comprising:

24156+6 * N−3 * floor ((N+5)/18) where N=0:137, for a 120 KHz subcarrier spacing (SCS);

24162+24 * N−12 * floor ((N+4)/18) where N=0:33, for a 480 KHz SCS; and 24162 to 24954 with a step size of six for a 960 kHz SCS, and wherein the memory is configured to store information for determining the SSB frequency positions.

2. The apparatus of claim 1, wherein the processing circuitry is further configured to connect the UE with the 5G NR cell using the cell reference frequency, wherein for the FR2 operating band n263, the processing circuitry is configured to determine a channel bandwidth based on the NR ARFCN, wherein the FR2 operating band n263 comprises spectrum from 57 GHz to 71 GHz, and wherein the SSB frequency positions are restricted to frequency positions within the FR2 operating band n263.

3. The apparatus of claim 2, wherein an SSB frequency position for each SS raster value comprises 24250.08 MHz +M * 17.28 MHz, where M is one of the GSCN values minus the value 22256.

4. The apparatus of claim 3, wherein the information for determining the SSB frequency positions comprises at least one of:

the GSCN values for the FR2 operating band n263;

the raster values for the FR2 operating band n263 for each SCS; and the SSB frequency positions for the FR2 operating band n263.

5. The apparatus of claim 3, wherein for the FR2 operating band n263, the cell reference frequency corresponds to one of a plurality of NR ARFCN values comprising one of:

2564083+1680 * N for N=0:137, when the channel bandwidth is 100 MHz;

2566603+6720 * N for N=0:33, when the channel bandwidth is 400 MHZ;

2569963+6720 * N for N=0:32, when the channel bandwidth is 800 MHZ;

2576683+6720 * N for N=0:30 when the channel bandwidth is 1600 MHZ; and

2580043+6720 * N for N=0:29, and 2585083, 2655643, 2692603, 2764843, when the channel bandwidth is 2000 MHz.

6. The apparatus of claim 5, wherein the cell reference frequency is based on an RF reference frequency (FREF) that is determined from the following equation:

$$FREF = FREF\text{-}Offs + \Delta FGlobal(NREF - NREF\text{-}Offs),$$

where FREF-Offs is 24250.08 MHZ, NREF-Offs is 2016667, NREF is the NR ARFCN value, and ΔFGlobal is 60 kHz; and wherein the cell reference frequency is restricted to frequencies of the FR2 operating band n263 comprising frequencies from 57 GHz to 71 GHz.

7. The apparatus of claim 6, wherein to identify an RF channel position associated with the cell reference frequency, the processing circuitry is configured to determine a resource element on a carrier using the RF reference frequency (FREF) based on a channel raster to resource element mapping.

8. The apparatus of claim 7, wherein for the 120 kHz SCS, the UE is configured to use one of the 100 MHz and 400 MHz channel bandwidths, wherein for the 480 kHz SCS, the UE is configured to use one of the 400, 800 and 1600 MHz channel bandwidths; and wherein for the 960 kHz SCS, the UE is configured to use one of the 400, 800, 1600 and 2000 MHz channel bandwidths.

9. The apparatus of claim 7, wherein based on the system information, the processing circuitry is to configure the UE to perform a random access (RACH) procedure with the 5G NR cell by transmission of a RACH preamble on the carrier, wherein a SSB SCS of one of 120 kHz and 480 kHz is used for initial access, wherein the processing circuitry is configured to refrain from using a SSB SCS of 960 kHz for initial access, and wherein for an FR2 operating band other than the FR2 operating band n263, a range of the GSCN values is based on a step size one for the 120 kHz SCS and a step size of two for a 240 kHz SCS.

10. The apparatus of claim 1, wherein the processing circuitry is further configured to:

detect a cell ID of the 5G NR cell based on synchronization signals of the detected SSB; and decode a physical broadcast channel (PBCH) of the detected SSB based on the cell ID.

11. A non-transitory computer-readable storage medium that stores instructions for execution by processing circuitry of a user equipment (UE) configured for operating in a fifth-generation (5G) new radio (NR) system, wherein the processing circuitry is to:

search for a 5G NR cell at Synchronization Signal Block (SSB) frequency positions associated with synchronization signal (SS) raster values; and detect a SSB for the 5G NR cell at one of the SSB frequency positions;

decode system information indicating an operating band for a cell reference frequency for the 5G NR cell corresponding to a NR Absolute Radio Frequency Channel Number (NR ARFCN) value for the 5G NR cell , wherein for frequency-range two (FR2) operating band n263, the SSB frequency positions associated with the SS raster values are based on one or more Global Synchronization Channel Number (GSCN) values comprising:

24156+6 * N−3 * floor ((N+5)/18) where N=0:137, for a 120 KHz subcarrier spacing (SCS);

24162+24 * N−12 * floor ((N+4)/18) where N−0:33, for a 480 KHz SCS; and 24162 to 24954 with a step size of six for a 960 kHz SCS.

12. The non-transitory computer-readable storage medium of claim 11, wherein the processing circuitry is further configured to connect the UE with the 5G NR cell using the cell reference frequency, wherein for the FR2 operating band n263, the processing circuitry is configured to determine a channel bandwidth based on the NR ARFCN, wherein the FR2 operating band n263 comprises spectrum from 57 GHz to 71 GHz, and wherein the SSB frequency positions are restricted to frequency positions within the FR2 operating band n263.

13. The non-transitory computer-readable storage medium of claim 12, wherein an SSB frequency position for each SS raster value comprises 24250.08 MHz+M * 17.28 MHz, where M is one of the GSCN values minus the value 22256.

14. The non-transitory computer-readable storage medium of claim 13, wherein the information for determining the SSB frequency positions comprises at least one of:

the GSCN values for the FR2 operating band n263;

the raster values for the FR2 operating band n263 for each SCS; and the SSB frequency positions for the FR2 operating band n263.

15. The non-transitory computer-readable storage medium of claim 13, wherein for the FR2 operating band n263, the cell reference frequency corresponds to one of a plurality of NR ARFCN values comprising one of:

2564083+1680 * N for N=0:137, when the channel bandwidth is 100 MHz;

2566603+6720 * N for N=0:33, when the channel bandwidth is 400 MHZ;

2569963+6720 * N for N=0:32, when the channel bandwidth is 800 MHZ;

2576683+6720 * N for N=0:30 when the channel bandwidth is 1600 MHZ; and

2580043+6720 * N for N=0:29, and 2585083, 2655643, 2692603, 2764843, when the channel bandwidth is 2000 MHz.

16. The non-transitory computer-readable storage medium of claim 15, wherein the cell reference frequency is based on an RF reference frequency (FREF) that is determined from the following equation:

$$FREF = FREF\text{-}Offs + \Delta FGlobal(NREF - NREF\text{-}Offs),$$

where FREF-Offs is 24250.08 MHZ, NREF-Offs is 2016667, NREF is the NR ARFCN value, and ΔFGlobal is 60 kHz; and wherein the cell reference frequency is restricted to frequencies of the FR2 operating band n263 comprising frequencies from 57 GHz to 71 GHz.

17. The non-transitory computer-readable storage medium of claim 12, wherein for the 120 kHz SCS, the UE is configured to use one of the 100 MHz and 400 MHz channel bandwidths, wherein for the 480 kHz SCS, the UE is configured to use one of the 400, 800 and 1600 MHz channel bandwidths; and wherein for the 960 kHz SCS, the UE is configured to use one of the 400, 800, 1600 and 2000 MHz channel bandwidths.

18. An apparatus of a gNodeB (gNB) configured for operating in a 5G NR system, the apparatus comprising: processing circuitry; and memory, wherein the processing circuitry is to:

encode a Synchronization Signal Block (SSB) for transmission at a SSB frequency position associated with a Global Synchronization Channel Number (GSCN) value, the SSB indicating an cell ID of a 5G NR cell, the SSB encoded to include a physical broadcast channel (PBCH);

transmit one or more channels associated with the 5G NR cell at a cell reference frequency, the cell reference frequency corresponding to a NR Absolute Radio Frequency Channel Number (NR ARFCN) value of the operating channel, wherein for frequency-range two (FR2) operating band n263, the frequency position are associated with one of a plurality of synchronization signal (SS) raster values that are based on the GSCN value, wherein the GSCN value comprises one of:

24156+6 * N−3 * floor ((N+5)/18) where N=0:137, for a 120 KHz subcarrier spacing (SCS);

24162+24 * N−12 * floor ((N+4)/18) where N−0:33, for a 480 KHz SCS; and 24162 to 24954 with a step size of six for a 960 kHz SCS, and wherein the memory is configured to store information for identifying the SSB frequency positions.

19. The apparatus of claim 18, wherein the FR2 operating band n263 comprises spectrum from 57 GHz to 71 GHz, wherein the SSB frequency position comprises a frequency position within the FR2 operating band n263, and wherein an SSB frequency position for each SS raster value comprises 24250.08 MHz+M * 17.28 MHz, where M is the GSCN value minus the value 22256.

20. The apparatus of claim 19, wherein for the FR2 operating band n263, the cell reference frequency corresponds to one of a plurality of NR ARFCN values comprising one of:

2564083+1680 * N for N=0:137, when a channel bandwidth is 100 MHz;

2566603+6720 * N for N=0:33, when the channel bandwidth is 400 MHZ;

2569963+6720 * N for N=0:32, when the channel bandwidth is 800 MHZ;

2576683+6720 * N for N=0:30 when the channel bandwidth is 1600 MHZ; and

2580043+6720 * N for N=0:29, and 2585083, 2655643, 2692603, 2764843, when the channel bandwidth is 2000 MHz, wherein the cell reference frequency is based on an RF reference frequency (FREF) on a channel raster that is determined from the following equation:

$$F_{REF} = F_{REF\text{-}Offs} + \Delta F_{Global}(N_{REF} - N_{REF\text{-}Offs}),$$

where $F_{REF\text{-}Offs}$ is 24250.08 MHZ, $N_{REF\text{-}Offs}$ is 2016667, $N_{REF}$ is the NR ARFCN value, and $\Delta F_{Global}$ is 60 kHz; and wherein the cell reference frequency is restricted to frequencies of the FR2 operating band n263 comprising frequencies from 57 GHz to 71 GHz.

* * * * *